(12) United States Patent
Minezawa et al.

(10) Patent No.: US 10,009,616 B2
(45) Date of Patent: Jun. 26, 2018

(54) IMAGE ENCODING DEVICE, IMAGE DECODING DEVICE, IMAGE ENCODING METHOD, AND IMAGE DECODING METHOD

(71) Applicant: Mitsubishi Electric Corporation, Tokyo (JP)

(72) Inventors: Akira Minezawa, Tokyo (JP); Kazuo Sugimoto, Tokyo (JP); Norimichi Hiwasa, Tokyo (JP); Shunichi Sekiguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 511 days.

(21) Appl. No.: 14/390,245

(22) PCT Filed: Apr. 3, 2013

(86) PCT No.: PCT/JP2013/060221
§ 371 (c)(1),
(2) Date: Oct. 2, 2014

(87) PCT Pub. No.: WO2013/154008
PCT Pub. Date: Oct. 17, 2013

(65) Prior Publication Data
US 2016/0021379 A1    Jan. 21, 2016

(30) Foreign Application Priority Data

Apr. 13, 2012  (JP) .................................. 2012-092038
Apr. 26, 2012  (JP) .................................. 2012-101227

(51) Int. Cl.
*H04N 19/463*    (2014.01)
*H04N 19/169*    (2014.01)
(Continued)

(52) U.S. Cl.
CPC ....... *H04N 19/1887* (2014.11); *H04N 19/124* (2014.11); *H04N 19/176* (2014.11);
(Continued)

(58) Field of Classification Search
None
See application file for complete search history.

(56) References Cited

U.S. PATENT DOCUMENTS 8,045,821 B2 * 10/2011 Tasaka ................. H04N 19/139
                                                                382/232
8,326,064 B2 * 12/2012 Yachida ............... H04N 19/159
                                                                382/239

(Continued)

FOREIGN PATENT DOCUMENTS

CN    101783965 A    7/2010
JP    2010-130522 A    6/2010

(Continued)

OTHER PUBLICATIONS

Fu et al., "Sample Adaptive Offset for HEVC," 2011 IEEE 13th International Workshop on Multimedia Signal Processing (MMSP), XP032027547, Oct. 17, 2011, 5 pages.

(Continued)

*Primary Examiner* — Jay Patel
*Assistant Examiner* — Shadan E Haghani
(74) *Attorney, Agent, or Firm* — Birch, Stewart, Kolasch & Birch, LLP

(57) ABSTRACT

A variable length encoding unit 13 variable-length-encodes an index indicating a classification method of carrying out a class classification on each coding block having a largest size, the classification method being determined by a loop filter unit 11, and also variable-length-encodes a parameter about an offset value for each class determined for each (Continued)

coding block having the largest size on the basis of a binarization process using a truncated unary code.

7 Claims, 25 Drawing Sheets

(51) Int. Cl.
*H04N 19/91* (2014.01)
*H04N 19/124* (2014.01)
*H04N 19/176* (2014.01)
*H04N 19/18* (2014.01)
*H04N 19/184* (2014.01)
*H04N 19/503* (2014.01)
*H04N 19/96* (2014.01)
*H04N 19/126* (2014.01)
*H04N 19/117* (2014.01)
*H04N 19/82* (2014.01)
*H04N 19/86* (2014.01)

(52) U.S. Cl.
CPC ........... *H04N 19/18* (2014.11); *H04N 19/184* (2014.11); *H04N 19/463* (2014.11); *H04N 19/503* (2014.11); *H04N 19/91* (2014.11); *H04N 19/117* (2014.11); *H04N 19/126* (2014.11); *H04N 19/82* (2014.11); *H04N 19/86* (2014.11); *H04N 19/96* (2014.11)

(56) References Cited

U.S. PATENT DOCUMENTS

| | | | | |
|---|---|---|---|---|
| 8,358,862 B2* | 1/2013 | Kondo | ................ | H04N 19/105 |
| | | | | 375/240.12 |
| 9,432,700 B2* | 8/2016 | Chen | ................ | H04N 19/176 |
| 9,497,455 B2* | 11/2016 | Yamazaki | .............. | H04N 19/70 |
| 9,565,453 B2* | 2/2017 | Park | .............. | H04N 19/44 |
| 2004/0190610 A1* | 9/2004 | Song | .................. | H04N 19/159 |
| | | | | 375/240.03 |
| 2007/0171985 A1 | 7/2007 | Kim et al. | | |
| 2009/0028427 A1 | 1/2009 | Yamada et al. | | |
| 2009/0290637 A1 | 11/2009 | Lai et al. | | |
| 2010/0086225 A1* | 4/2010 | Yachida | .............. | H04N 19/159 |
| | | | | 382/239 |
| 2010/0189181 A1* | 7/2010 | Zheng | .................. | H04N 19/70 |
| | | | | 375/240.24 |
| 2010/0266048 A1* | 10/2010 | Yang | .................. | H04N 19/597 |
| | | | | 375/240.24 |
| 2010/0322303 A1 | 12/2010 | Wada et al. | | |
| 2011/0038412 A1* | 2/2011 | Jung | .................. | H04N 19/146 |
| | | | | 375/240.12 |
| 2012/0087595 A1 | 4/2012 | Minezawa et al. | | |
| 2012/0177107 A1* | 7/2012 | Fu | .................. | H04N 19/61 |
| | | | | 375/240.03 |
| 2012/0269274 A1* | 10/2012 | Kim | .................. | H04N 19/176 |
| | | | | 375/240.24 |
| 2012/0321206 A1 | 12/2012 | Sato | | |
| 2013/0272413 A1* | 10/2013 | Seregin | .................. | H04N 19/52 |
| | | | | 375/240.16 |
| 2014/0140416 A1* | 5/2014 | Yamazaki | .............. | H04N 19/70 |
| | | | | 375/240.25 |

FOREIGN PATENT DOCUMENTS

| | | |
|---|---|---|
| JP | 2011-215476 A | 10/2011 |
| RU | 2010132652 A | 2/2012 |
| WO | WO 2011/125729 A1 | 10/2011 |
| WO | WO 2012/176910 A1 | 12/2012 |

OTHER PUBLICATIONS

Nguyen et al., "Reduced-Complexity Entropy Coding of Transform Coefficient Levels Using Truncated Golomb-Rice Codes in Video Compression," 2011 18th IEEE International Conference on Image Processing, XP032080600, Sep. 11, 2011, pp. 753-756.

Bross et al., "High efficiency video coding (HEVC) text specification draft 6," Joint Collaborative Team on Video Coding (JCT-VC) of ITU-T SG16 WP3 and ISO/IEC JTC1/SC29/WG11 8th Meeting: San Jose, CA, USA, Feb. 1-10, 2012, pp. 71-72.

Chong et al., "AHG6/AHG5: Fix and simplification for SAO type index", Joint Collaborative Team on Video Coding (JCT-VC) of ITU-T SG16 WP3 and ISO/IEC JTC1/SC29/WG11 10th Meeting, JCTVC-J0104, ITU-T, Jun. 29, 2012, pp. 1-4.

Fu et al., "CE13: Sample Adaptive Offset with LCU-Independent Decoding", Joint Collaborative Team on Video Coding (JCT-VC) of ITU-T SG16 WP3 and ISO/IEC JTC1/SC29/WG11 5th Meeting, JCTVC-E049, ITU-T, Mar. 10, 2011, pp. 1-6.

Fu et al., "CE8.A.3: SAO with LCU-based syntax", Joint Collaborative Team on Video Coding (JCT-VC) of ITU-T SG16 WP3 and ISO/IEC JTC1/SC29/WG11 8th Meeting, JCTVC-H0273, ITU-T, Jan. 20, 2012, pp. 1-8.

Fu et al., "CE8.e.1: Offset coding in SAO", Joint Collaborative Team on Video Coding (JCT-VC) of ITU-T SG16 WP3 and ISO/IEC JTC1/SC29/WG11 8th Meeting, JCTVC-H0276, ITU-T, Jan. 20, 2012, pp. 1-5.

Fuldseth et al., "Non-CE8.A.2: SAO with LCU-based syntax", Joint Collaborative Team on Video Coding (JCT-VC) of ITU-T SG16 WP3 and ISO/IEC JTC1/SC29/WG11 8th Meeting, JCTVC-H0067, ITU-T, Feb. 8, 2012, pp. 1-11.

ITU-T H.264, "Series H: Audiovisual and Multimedia Systems Infrastructure of audiovisual services—Coding of moving video", Advanced video coding for generic audiovisual services, Mar. 2010, pp. 1-676.

Kim et al , "CE8 Subset c: Necessity of Sign Bits for SAO Offsets", Joint Collaborative Team on Video Coding (JCT-VC) of ITU-T SG16 WP3 and ISO/IEC JTC1/SC29/WG11 8th Meeting; JCTVC-H0434, ITU-T, Feb. 5, 2012, pp. 1-10.

Minezawa et al., "Non-CE1: Improved edge offset coding for SAO" Joint Collaborative Team on Video Coding (JCT-VC) of ITU-T SG16 WP3 and ISO/IEC JTC1/SC29/WG11 9th Meeting, JCTVC-I0066_r2, ITU-T, Apr. 25, 2012, pp. 1-11.

Minoo et al., "CE8.e.4 Selection and Coding of SAO Parameters", Joint Collaborative Team on Video Coding (JCT-VC) of ITU-T SG16 WP3 and ISO/IEC JTC1/SC29/WG11 8th Meeting, JCTVC-H0557r1, ITU-T, Jan. 28, 2012, pp. 1-11.

Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, Document JCTVC-H1003, pp. 1-238 (252 pages total).

Taiwanese Office Action issued in corresponding Taiwanese Patent Application No. 106101353 dated Mar. 30, 2018.

* cited by examiner

| Intra Prediction Mode Index | Intra Prediction Mode |
|---|---|
| 0 | Planar Prediction |
| 1 | Vertical Prediction |
| 2 | Horizontal Prediction |
| 3 | Average (DC) Prediction |
| 4 ~ $N_I$-1 | Diagonal Prediction |

$N_I$:Number of Intra Prediction Modes

FIG.10

Classification Criteria in Each Class Classifying Method

| Class | Criterion |
|---|---|
| 1 | c < a && c < b |
| 2 | (c < a && c = b) \|\| (c < b && c = a) |
| 3 | (c > a && c = b) \|\| (c > b && c = a) |
| 4 | c > a && c > b |
| 0 | Other than Classes 1 to 4 | a, b, c: Brightness Value of Each Pixel

FIG.16

| Index | Class Classifying Method |
|---|---|
| 0 | No Offset Process |
| 1 | EO Method 1 |
| 2 | EO Method 2 |
| 3 | EO Method 3 |
| 4 | EO Method 4 |
| 5 | BO Method |

FIG.17

| Index | Offset Value | | | | |
| --- | --- | --- | --- | --- | --- |
| | Class 0 | Class 1 | Class 2 | Class 3 | Class 4 |
| 0 | 0 | 1 | 0 | 0 | -1 |
| 1 | 0 | 2 | 1 | -1 | -2 |
| 2 | 0 | 3 | 1 | -1 | -3 |
| 3 | 0 | 4 | 2 | -2 | -4 |

FIG.19

Bit Depth: 8

| Index | Offset Value | | | | |
|---|---|---|---|---|---|
| | Class 0 | Class 1 | Class 2 | Class 3 | Class 4 |
| 0 | 0 | 1 | 0 | 0 | -1 |

Bit Depth: 9

| Index | Offset Value | | | | |
|---|---|---|---|---|---|
| | Class 0 | Class 1 | Class 2 | Class 3 | Class 4 |
| 0 | 0 | 1 | 0 | 0 | -1 |
| 1 | 0 | 2 | 1 | -1 | -2 |

Bit Depth: 10

| Index | Offset Value | | | | |
|---|---|---|---|---|---|
| | Class 0 | Class 1 | Class 2 | Class 3 | Class 4 |
| 0 | 0 | 1 | 0 | 0 | -1 |
| 1 | 0 | 2 | 1 | -1 | -2 |
| 2 | 0 | 3 | 1 | -1 | -3 |
| 3 | 0 | 4 | 2 | -2 | -4 |

FIG.25

| Target Symbol to Be Encoded | Output Code Word | | | | |
|---|---|---|---|---|---|
| 0 | 0 | | | | |
| 1 | 1 | 0 | | | |
| 2 | 1 | 1 | 0 | | |
| 3 | 1 | 1 | 1 | 0 | |
| 4 | 1 | 1 | 1 | 1 | 0 |
| 5 | 1 | 1 | 1 | 1 | 1 |

FIG.26

| Target Symbol to Be Encoded | Output Code Word | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ⋮ | ⋮ | | | | | |

FIG.27

Index Indicating Group of Adaptive Parameter Set
→ Index of Adaptive Parameter Set

```
aps_group_id
aps_id
aps_scaling_list_data_present_flag  → Presence or Absence Flag of Quantization Matrix Parameter
if( aps_scaling_list_data_present_flag ) {
  [Encoding of Quantization Matrix Parameter]
}
aps_deblocking_filter_present_flag  → Presence or Absence Flag of Filter Parameter Associated with Deblocking Filtering Process
if(aps_deblocking_filter_present_flag) {
  [Encoding of Parameter Associated with Deblocking Filtering Process]
}
aps_sao_present_flag  → Presence or Absence Flag of Filter Parameter Associated with Pixel Adaptive Offset Process
if( aps_sao_present_flag ) {
  [Encoding of Parameter Associated with Pixel Adaptive Offset Process]
}
aps_adaptive_loop_filter_present_flag  → Presence or Absence Flag of Filter Parameter Associated with Adaptive Filtering Process
if( aps_adaptive_loop_filter_present_flag ) {
  [Encoding of Parameter Associated with Adaptive Filtering Process]
}
aps_extension_flag  → Presence or Absence Flag of Parameter Associated with Extension of Adaptive Parameter Set
if( aps_extension_flag ) {
  [Encoding of Parameter Associated with Extension of Adaptive Parameter Set]
}
```

\* Bold Letter Shows Syntax to Be Encoded

IMAGE ENCODING DEVICE, IMAGE DECODING DEVICE, IMAGE ENCODING METHOD, AND IMAGE DECODING METHOD

FIELD OF THE INVENTION

The present invention relates to an image encoding device for and an image encoding method of encoding a video with a high degree of efficiency, and an image decoding device for and an image decoding method of decoding a video which is encoded with a high degree of efficiency.

BACKGROUND OF THE INVENTION

Conventionally, in accordance with an international standard video encoding method, such as MPEG or ITU-T H.26x, after an inputted video frame is partitioned into macroblocks each of which consists of blocks of 16×16 pixels and a motion-compensated prediction is carried out on each of the macroblocks, information compression is carried out on the inputted video frame by carrying out orthogonal transformation and quantization on a prediction error signal on a per block basis. A problem is, however, that as the compression ratio becomes high, the compression efficiency is reduced because of degradation in the quality of a prediction reference image used when carrying out a motion-compensated prediction. To solve this problem, in accordance with an encoding method such as MPEG-4 AVC/H.264 (refer to nonpatent reference 1), by carrying out an in-loop deblocking filtering process, a block distortion occurring in a prediction reference image and caused by quantization of orthogonal transform coefficients is eliminated.

FIG. 21 is a block diagram showing a video encoding device disclosed in nonpatent reference 1. In this video encoding device, when receiving an image signal which is a target to be encoded, a block partitioning unit 101 partitions the image signal into macroblocks and outputs an image signal of each of the macroblocks to a prediction unit 102 as a partitioned image signal. When receiving the partitioned image signal from the block partitioning unit 101, the prediction unit 102 carries out an intra-frame or inter-frame prediction on the image signal of each color component in each of the macroblocks to determine a prediction error signal Particularly when carrying out a motion-compensated prediction between frames, a search for a motion vector is performed on each macroblock itself or each of subblocks into which each macroblock is further partitioned finely. Then, a motion-compensated prediction image is generated by carrying out a motion-compensated prediction on a reference image signal stored in a memory 107 by using the motion vector, and a prediction error signal is calculated by determining the difference between a prediction signal showing the motion-compensated prediction image and the partitioned image signal. Further, the prediction unit 102 outputs parameters for prediction signal generation which the prediction unit determines when acquiring the prediction signal to a variable length encoding unit 108. For example, the parameters for prediction signal generation includes an intra prediction mode indicating how a spatial prediction is carried out within a frame, and a motion vector indicating an amount of motion between frames.

When receiving the prediction error signal from the prediction unit 102, a compressing unit 103 removes a signal correlation by carrying out a DCT (discrete cosine transform) process on the prediction error signal, and then quantizes this prediction error signal to acquire compressed data. When receiving the compressed data from the compressing unit 103, a local decoding unit 104 calculates a prediction error signal corresponding to the prediction error signal outputted from the prediction unit 102 by inverse-quantizing the compressed data and then carrying out an inverse DCT process on the compressed data.

When receiving the prediction error signal from the local decoding unit 104, an adding unit 105 adds the prediction error signal and the prediction signal outputted from the prediction unit 102 to generate a local decoded image. A loop filter 106 eliminates a block distortion piggybacked onto a local decoded image signal showing the local decoded image generated by the adding unit 105, and stores the local decoded image signal from which the distortion is eliminated in a memory 107 as a reference image signal.

When receiving the compressed data from the compressing unit 103, a variable length encoding unit 108 entropy-encodes the compressed data and outputs a bitstream which is the encoded result. When outputting the bitstream, the variable length encoding unit 108 multiplexes the parameters for prediction signal generation outputted from the prediction unit 102 into the bitstream and outputs this bitstream.

In accordance with the method disclosed by nonpatent reference 1, the loop filter 106 determines a smoothing intensity for a neighboring pixel at a block boundary in DCT on the basis of information including the granularity of the quantization, the coding mode, the degree of variation in the motion vector, etc., thereby reducing distortions occurring at block boundaries. As a result, the quality of the reference image signal can be improved and the efficiency of the motion-compensated prediction in subsequent encoding processes can be improved.

In contrast, a problem with the method disclosed by nonpatent reference 1 is that the amount of high frequency components lost from the signal increases with increase in the compression rate, and this results in excessive smoothness in the entire screen and hence the video image becomes blurred. In order to solve this problem, nonpatent reference 2 proposes, as a loop filter 106, an adaptive offset process (pixel adaptive offset process) of partitioning a screen into a plurality of blocks, carrying out a class classification on each pixel within each of the blocks into which the screen is partitioned, and adding an offset value which minimizes a squared error distortion between an image signal which is an original image signal and which is a target to be encoded and a reference image signal corresponding to the image signal for each class.

RELATED ART DOCUMENT

Nonpatent Reference

Nonpatent reference 1: MPEG-4 AVC (ISO/IEC 14496-10)/H.ITU-T 264 standards

Nonpatent reference 2: "CE13: Sample Adaptive Offset with LCU-Independent Decoding", JCT-VC Document JCTVC-E049, March 2011, Geneva, CH.

SUMMARY OF THE INVENTION

Problems to be Solved by the Invention

Because the conventional video encoding device is constructed as above, this video encoding device needs to encode the offsets determined for several classes for each of the blocks into which the screen is partitioned. A problem is therefore that because a high-accuracy distortion compensation process is carried out during the pixel adaptive offset process, the code amount required to encode the offsets increases and hence the coding efficiency drops with increase in the fineness of partitioning of the screen into the blocks.

The present invention is made in order to solve the above-mentioned problem, and it is therefore an object of the present invention to provide an image encoding device, an image decoding device, an image encoding method, and an image decoding method capable of reducing the code amount required to encode offsets and hence improving the coding efficiency.

Means for Solving the Problem

In accordance with the present invention, there is provided an image encoding device in which a filter determines a classification method of carrying out a class classification on each coding block having a largest size, carries out a class classification on each pixel within each coding block having the largest size by using the above-mentioned classification method, calculates an offset value for each class for each coding block having the largest size, and carries out a pixel adaptive offset process of adding the offset value to the pixel value of a pixel belonging to a corresponding class, and a variable length encoder variable-length-encodes an index indicating the classification method of carrying out a class classification on each coding block having the largest size, the classification method being determined by the filter, and also variable-length-encodes a parameter about the offset value for each class determined for each coding block having the largest size on the basis of a binarization process using a truncated unary code.

Advantages of the Invention

Because the video encoding device according to the present invention is constructed in such a way that the filter determines a classification method of carrying out a class classification on each coding block having the largest size, carries out a class classification on each pixel within each coding block having the largest size by using the above-mentioned classification method, calculates the offset value for each class for each coding block having th largest size, and carries out the pixel adaptive offset process of adding the offset value to the pixel value of a pixel belonging to the corresponding class, and the variable length encoder variable-length-encodes the index indicating the classification method of carrying out a class classification on each coding block having the largest size, the classification method being determined by the filter, and also variable-length-encodes the parameter about the offset value for each class determined for each coding block having the largest size on the basis of the binarization process using a truncated unary code, there is provided an advantage of being able to reduce the code amount required to encode the offset and improve the coding efficiency.

BRIEF DESCRIPTION OF THE FIGURES

FIG. 10 is an explanatory drawing showing an example of a quantization matrix;

FIG. 16 is an explanatory drawing showing indexes indicating class classifying methods for use in the pixel adaptive offset process;

FIG. 17 is an explanatory drawing showing an example of a table showing combinations of offsets respectively determined for classes of the pixel adaptive offset process;

FIG. 19 is an explanatory drawing showing an example of changing the table showing combinations of offset values respectively determined for classes of the pixel adaptive offset process according to the bit depth;

FIG. 25 is an explanatory drawing showing a truncated unary code in a case in which the range of symbols to be encoded extends from 0 to 5;

FIG. 26 is an explanatory drawing showing a unary code;

FIG. 27 is an explanatory drawing showing an example of the syntax of an adaptation parameter set.

EMBODIMENTS OF THE INVENTION

Hereafter, in order to explain this invention in greater detail, the preferred embodiments of the present invention will be described with reference to the accompanying drawings.

Embodiment 1

Figure 1:
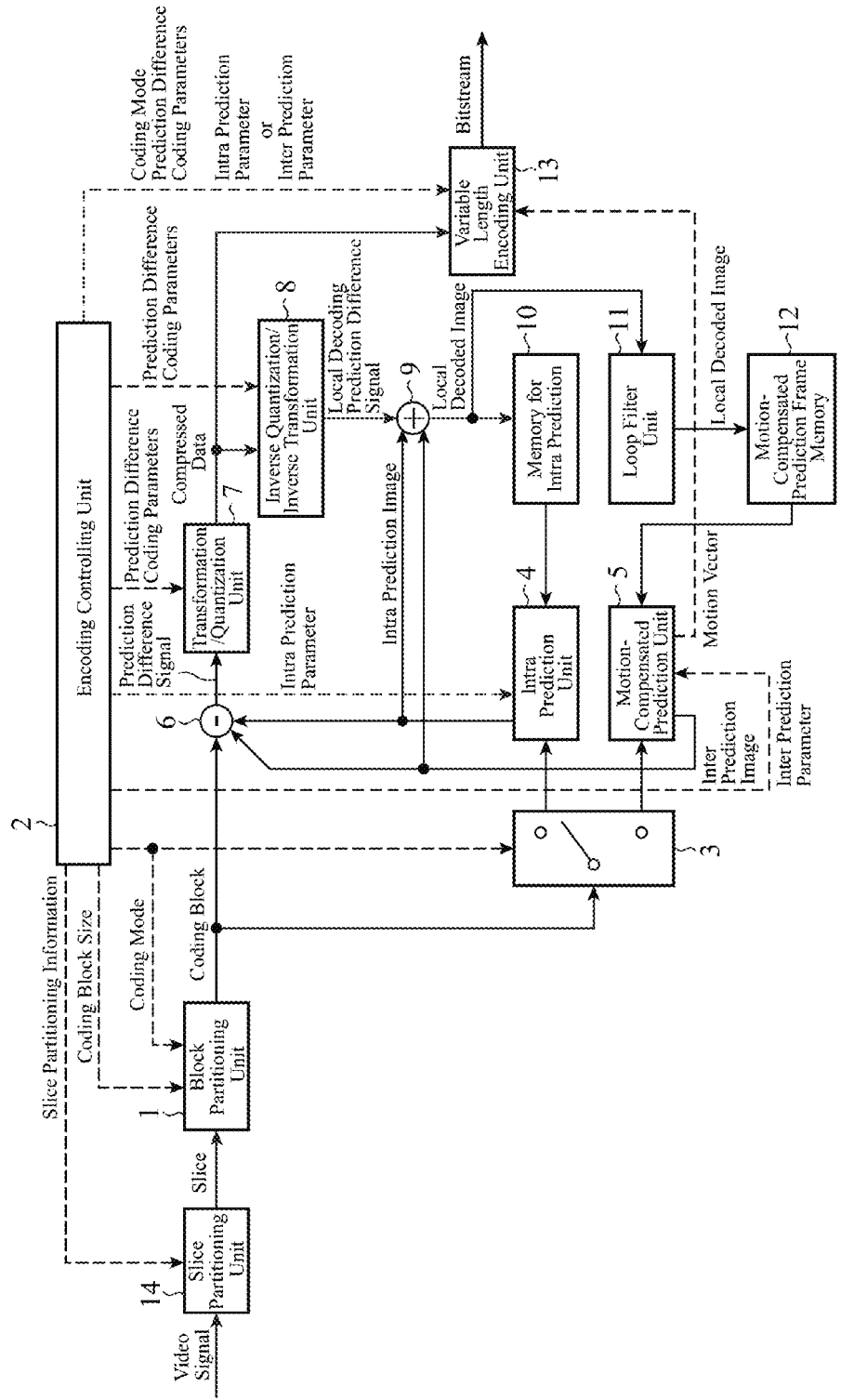
FIG. 1 is a block diagram showing a video encoding device in accordance with Embodiment 1 of the present invention.

FIG. 1 is a block diagram showing a video encoding device in accordance with Embodiment 1 of the present invention. Referring to FIG. 1, a slice partitioning unit 14 carries out a process of, when receiving a video signal as an inputted image, partitioning the inputted image into one or more part images, which are referred to as "slices", according to slice partitioning information determined by an encoding controlling unit 2. Each slice partitioned can be further partitioned into coding blocks which will be mentioned below. The slice partitioning unit 14 constructs a slice partitioner.

A block partitioning unit 1 carries out a process of, every time when receiving a slice partitioned by the slice partitioning unit 14, partitioning the slice into largest coding blocks each of which is a coding block having a largest size determined by the encoding controlling unit 2, and further partitioning each of the largest coding blocks into coding blocks hierarchically until the number of hierarchies reaches an upper limit on the number of hierarchies, the upper limit being determined by the encoding controlling unit 2. More specifically, the block partitioning unit 1 carries out a process of partitioning each slice into coding blocks according to partitioning which is determined by the encoding controlling unit 2, and outputting each of the coding blocks. Each of the coding blocks is further partitioned into one or more prediction blocks each of which is a unit for prediction process. The block partitioning unit 1 constructs a block partitioner.

The encoding controlling unit 2 carries out a process of determining the largest size of each of the coding blocks which is a unit to be processed at the time when a prediction process is carried out, and also determining the upper limit on the number of hierarchies at the time that each of the coding blocks having the largest size is hierarchically partitioned into blocks to determine the size of each of the coding blocks. The encoding controlling unit 2 also carries out a process of selecting a coding mode which is applied to each coding block outputted from the block partitioning unit 1 from one or more selectable coding modes (one or more intra coding modes in which the sizes or the like of prediction blocks each representing a unit for prediction process differ from one another, and one or more inter coding modes in which the sizes or the like of prediction blocks differ from one another). As an example of the selecting method, there is a method of selecting a coding mode having the highest coding efficiency for the coding block outputted from the block partitioning unit 1 from the one or more selectable coding modes.

The encoding controlling unit 2 further carries out a process of, when the coding mode having the highest coding efficiency is an intra coding mode, determining an intra prediction parameter which is used when carrying out an intra prediction process on the coding block in the intra coding mode for each prediction block which is a unit for prediction process, which is shown by the above-mentioned intra coding mode, and, when the coding mode having the highest coding efficiency is an inter coding mode, determining an inter prediction parameter which is used when carrying out an inter prediction process on the coding block in the inter coding mode for each prediction block which is a unit for prediction process, which is shown by the above-mentioned inter coding mode. The encoding controlling unit 2 further carries out a process of determining prediction difference coding parameters which the encoding controlling unit provides for a transformation/quantization unit 7 and an inverse quantization/inverse transformation unit 8. The prediction difference coding parameters include orthogonal transformation block partitioning information showing information about partitioning into orthogonal transformation blocks each of which is a unit for orthogonal transformation process in the coding block, and a quantization parameter defining a quantization step size at the time of quantizing transform coefficients. The encoding controlling unit 2 constructs a coding parameter determinator.

A select switch 3 carries out a process of, when the coding mode determined by the encoding controlling unit 2 is an intra coding mode, outputting the coding block outputted from the block partitioning unit 1 to an intra prediction unit 4, and, when the coding mode determined by the encoding controlling unit 2 is an inter coding mode, outputting the coding block outputted from the block partitioning unit 1 to a motion-compensated prediction unit 5.

The intra prediction unit 4 carries out a process of, when an intra coding mode is selected by the encoding controlling unit 2 as the coding mode corresponding to the coding block outputted from the select switch 3, performing an intra prediction process (intra-frame prediction process) using the intra prediction parameter determined by the encoding controlling unit 2 on each prediction block, which is a unit for prediction process at the time of performing a prediction process on the coding block, while referring to a local decoded image which is stored in a memory 10 for intra prediction, so as to generate an intra prediction image.

The motion-compensated prediction unit 5 carries out a process of, when an inter coding mode is selected by the encoding controlling unit 2 as the coding mode corresponding to the coding block outputted from the select switch 3, comparing the coding block with one or more frames of local decoded images stored in a motion-compensated prediction frame memory 12 for each prediction block which is a unit for prediction process so as to search for a motion vector, and carrying out an inter prediction process (motion-compensated prediction process) on each prediction block in the coding block by using both the motion vector and the inter prediction parameter, such as the number of a frame to be referred to, which is determined by the encoding controlling unit 2 so as to generate an inter prediction image. A predictor is comprised of the intra prediction unit 4, the memory 10 for intra prediction, the motion-compensated prediction unit 5, and the motion-compensated prediction frame memory 12.

A subtracting unit 6 carries out a process of subtracting the intra prediction image generated by the intra prediction unit 4 or the inter prediction image generated by the motion-compensated prediction unit 5 from the coding block outputted from the block partitioning unit 1, and outputting a prediction difference signal showing a difference image which is the result of the subtraction to the transformation/quantization unit 7. The subtracting unit 6 constructs a difference image generator. The transformation/quantization unit 7 carries out a process of carrying out an orthogonal transformation process (e.g., a DCT (discrete cosine transform), a DST (discrete sine transform), or an orthogonal transformation process, such as a KL transform, in which bases are designed for a specific learning sequence in advance) on each of the orthogonal transformation blocks in the prediction difference signal outputted from the subtracting unit 6 by referring to the orthogonal transformation block partitioning information included in the prediction difference coding parameters determined by the encoding controlling unit 2 so as to calculate transform coefficients, and also quantizing the transform coefficients of each of the orthogonal transformation blocks by referring to the quantization parameter included in the prediction difference coding parameters and then outputting compressed data which are the transform coefficients quantized thereby to the inverse quantization/inverse transformation unit 8 and a variable length encoding unit 13. The transformation/quantization unit 7 constructs an image compressor.

Figure 10:
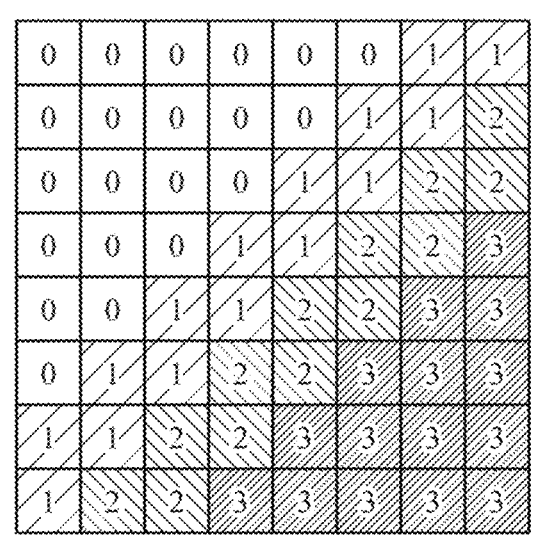

When quantizing the transform coefficients, the transformation/quantization unit 7 can carry out the process of quantizing the transform coefficients by using a quantization matrix for scaling the quantization step size determined from the above-mentioned quantization parameter for each of the transform coefficients. FIG. 10 is an explanatory drawing showing an example of the quantization matrix of an 8×8 DCT. Numerals shown in the figure represent scaling values for the quantization step sizes of the transform coefficients. Because a coefficient whose scaling value is 0 has a quantization step size of 0, the coefficient is equivalent to "no quantization." For example, by performing the scaling in such a way that a transform coefficient in a higher frequency band have a larger quantization step size in order to suppress the coding bit rate, as shown in FIG. 10, transform coefficients in high frequency bands which occur in a complicated image area or the like are reduced, thereby suppressing the code amount, while the encoding can be carried out without reducing information about coefficients in a low frequency band which exert a great influence upon the subjective quality. When it is desirable to control the quantization step size for each transform coefficient, what is necessary is just to use a quantization matrix.

Further, as the quantization matrix, a matrix which is independent for each chrominance signal and for each coding mode (intra coding or inter coding) at each orthogonal transformation size can be used, and whether or not to select, as an initial value of the quantization matrix, one quantization matrix from quantization matrices which are prepared in advance and in common between the video encoding device and the video decoding device and already-encoded quantization matrices, or whether or not to use, as an initial value of the quantization matrix, a new quantization matrix can be selected. Therefore, the transformation/quantization unit 7 sets, as a quantization matrix parameter to be encoded, flag information showing whether or not to use the new quantization matrix for each orthogonal transformation size for each chrominance signal or for each coding mode. In addition, when the new quantization matrix is used, each of the scaling values in the quantization matrix as shown in FIG. 10 is set as a quantization matrix parameter to be encoded. In contrast, when the new quantization matrix is not used, an index specifying a matrix to be used from the quantization matrix prepared, as an initial value, in advance and in common between the video encoding device and the video decoding device and the already-encoded quantization matrices is set as a quantization matrix parameter to be encoded. However, when no already-encoded quantization matrix which can be referred to exists, only the quantization matrix prepared in advance and in common between the video encoding device and the video decoding device can be selected. The transformation/quantization unit 7 then outputs the set quantization matrix parameters to the variable length encoding unit 13 as a part of an adaptation parameter set.

The inverse quantization/inverse transformation unit 8 carries out a process of inverse-quantizing the compressed data outputted from the transformation/quantization unit 7 and also carrying out an inverse orthogonal transformation process on the transform coefficients which are the compressed data inverse-quantized thereby for each of the orthogonal transformation blocks by referring to the quantization parameter and the orthogonal transformation block partitioning information which are included in the prediction difference coding parameters determined by the encoding controlling unit 2 so as to calculate a local decoded prediction difference signal corresponding to the prediction difference signal outputted from the subtracting unit 6. Also when carrying out the quantizing process by using the quantization matrix, the transformation/quantization unit 7 carries out a corresponding inverse quantization process by referring to the quantization matrix also at the time of carrying out an inverse quantization process. An adding unit 9 carries out a process of adding the local decoded prediction difference signal calculated by the inverse quantization/inverse transformation unit 8 and the intra prediction image generated by the intra prediction unit 4 or the inter prediction image generated by the motion-compensated prediction unit 5 so as to calculate a local decoded image corresponding to the coding block outputted from the block partitioning unit 1. A local decoded image generator is comprised of the inverse quantization/inverse transformation unit 8 and the adding unit 9.

The memory 10 for intra prediction is a recording medium for storing the local decoded image calculated by the adding unit 9. A loop filter unit 11 carries out a process of performing a predetermined filtering process on the local decoded image calculated by the adding unit 9 so as to output the local decoded image on which the filtering process is carried out. Concretely, the loop filter unit performs a filtering (deblocking filtering) process of reducing a distortion occurring at a boundary between orthogonal transformation blocks and a distortion occurring at a boundary between prediction blocks, a process (pixel adaptive offset process) of adaptively adding an offset on a per pixel basis, an adaptive filtering process of adaptively switching among linear filters, such as Wiener filters, so as to perform the filtering process, and so on.

Figure 11:
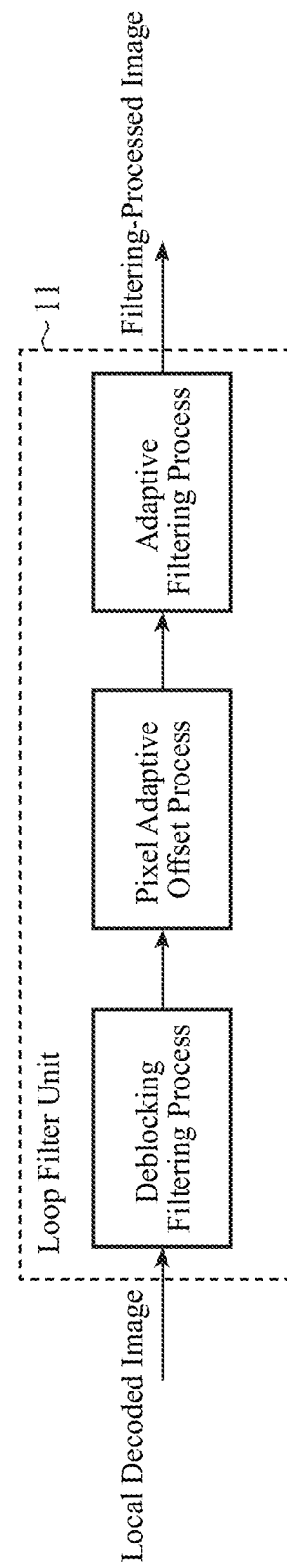
FIG. 11 is an explanatory drawing showing an example of the structure of a loop filter unit of the video encoding device in accordance with Embodiment 1 of the present invention in the case of using a plurality of loop filtering processes.

The loop filter unit 11 determines whether or not to carry out the process for each of the above-mentioned filtering processes including the deblocking filtering process, the pixel adaptive offset process, and the adaptive filtering process, and outputs an enable flag of each of the processes, as a part of the adaptation parameter set to be encoded and a part of a slice level header, to the variable length encoding unit 13. When using two or more of the above-mentioned filtering processes, the loop filter unit carries out the two or more filtering processes in order. FIG. 11 shows an example of the structure of the loop filter unit 11 in the case of using a plurality of filtering processes. In general, while the image quality is improved with increase in the number of types of filtering processes used, the processing load is increased with increase in the number of types of filtering processes used. More specifically, there is a trade-off between the image quality and the processing load. Further, an improvement effect of the image quality which is produced by each of the filtering processes differs depending upon the characteristics of the image which is the target for the filtering process. Therefore, what is necessary is just to determine the filtering processes to be used according to the processing load acceptable in the video encoding device and the characteristics of the image which is the target for the filtering process. The loop filter unit 11 constructs a filter.

In the deblocking filtering process, various parameters used for the selection of the intensity of a filter to be applied to a block boundary can be changed from their initial values. When changing a parameter, the parameter is outputted to the variable length encoding unit 13 as a part of the adaptation parameter set to be encoded. In the pixel adaptive offset process, the image is partitioned into a plurality of blocks first, a case of not carrying out the offset process is defined as one class classifying method for each of the coding blocks, and one class classifying method is selected from among a plurality of class classifying methods which are prepared in advance. Next, by using the selected class classifying method, each pixel included in the block is classified into one of classes, and an offset value for compensating for a coding distortion is calculated for each of the classes. Finally, a process of adding the offset value to the brightness value of the local decoded image is carried out, thereby improving the image quality of the local decoded image. Therefore, in the pixel adaptive offset process, the block partitioning information, an index indicating the class classifying method selected for each block, and offset information specifying the offset value calculated for each class determined on a per block basis are outputted to the variable length encoding unit 13 as a part of the adaptation parameter set to be encoded. In the pixel adaptive offset process, for example, the image can be always partitioned into blocks each having a fixed size, such as largest coding blocks, and a class classifying method can be selected for each of the blocks and the adaptive offset process for each class can be carried out. In this case, the above-mentioned block partitioning information becomes unnecessary, and the code amount can be reduced by the code amount required for the block partitioning information.

In the adaptive filtering process, a class classification is carried out on the local decoded image by using a predetermined method, a filter for compensating for a distortion piggybacked on the image is designed for each area (local decoded image) belonging to each class, and the filtering process of filtering the local decoded image is carried out by using the filter. The filter designed for each class is then outputted to the variable length encoding unit 13 as a part of the adaptation parameter set to be encoded. As the class classifying method, there are a simple method of partitioning the image into equal parts spatially and a method of performing a classification on a per block basis according to the local characteristics (a variance and so on) of the image.

Further, the number of classes used in the adaptive filtering process can be preset as a value common between the video encoding device and the video decoding device, or can be preset as a part of the adaptation parameter set to be encoded. The improvement effect of the image quality in the latter case is enhanced because the number of classes used in the latter case can be set freely as compared with that in the former case, while the code amount is increased by that required for the number of classes because the number of classes is encoded.

In addition, the class classification for the adaptive filtering process, and the filter design and the filtering process can be carried out on, instead of the entire image, each block having a fixed size, e.g., each largest coding block. More specifically, the class classification can be carried out on each set of plural small blocks, into which each block having a fixed size is partitioned, according to the local characteristics (a variance and so on) of the image and filter design and the filtering process can be carried out for each class, the filter of each class can be encoded, as a part of the adaptation parameter set, for each block having a fixed size. By doing this way, a high-accuracy filtering process according to the local characteristics can be implemented as compared with the case of carrying out the class classification, the filter design, and the filtering process on the entire image. Because it is necessary for the loop filter unit 11 to refer to the video signal when carrying out the pixel adaptive offset process and the adaptive filtering process, it is necessary to modify the video encoding device shown in FIG. 1 in such a way that the video signal is inputted to the loop filter unit 11.

Figure 15:
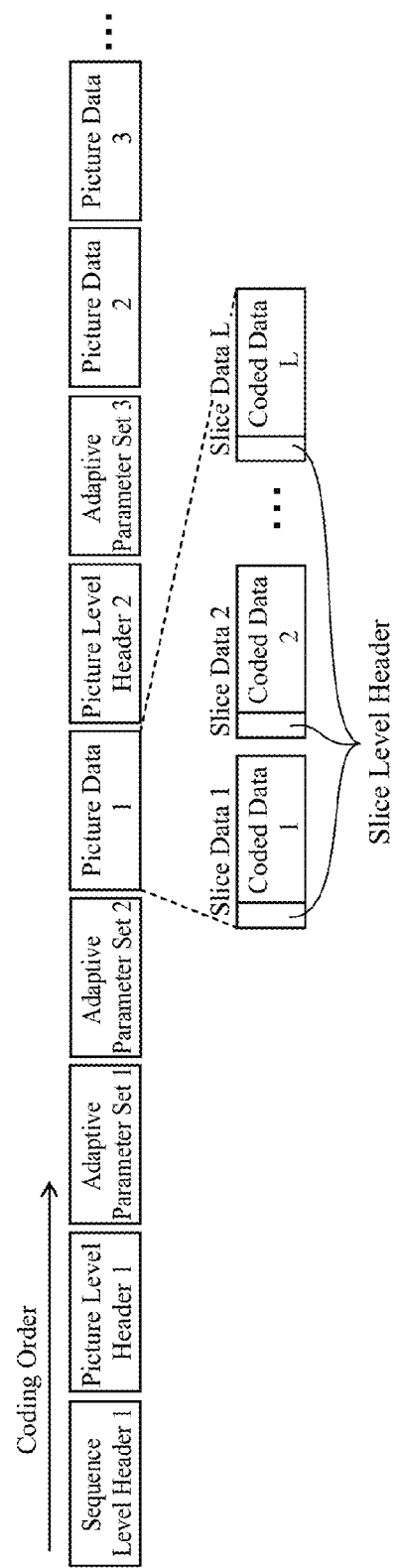
FIG. 15 is an explanatory drawing showing an example of a coded bitstream.

The motion-compensated prediction frame memory 12 is a recording medium that stores the local decoded image on which the filtering process is carried out by the loop filter unit 11. The variable length encoding unit 13 variable-length-encodes the compressed data outputted thereto from the transformation/quantization unit 7, the output signal of the encoding controlling unit 2 (the block partitioning information about the partitioning of each largest coding block, the coding mode, the prediction difference coding parameters, and the intra prediction parameter or the inter prediction parameter), and the motion vector outputted from the motion-compensated prediction unit 5 (when the coding mode is an inter coding mode) so as to generate coded data. The variable length encoding unit 13 also encodes sequence level headers, picture level headers, and adaptation parameter sets, as the header information of the coded bitstream, as illustrated in FIG. 15, so as to generate the coded bitstream as well as picture data. The variable length encoding unit 13 constructs a variable length encoding unit.

Picture data consists of one or more slice data, and each slice data is a combination of a slice level header and coded data as mentioned above in the corresponding slice. A sequence level header is a combination of pieces of header information which are typically common on a per sequence basis, the pieces of header information including the image size, the chrominance signal format, the bit depths of the signal values of the luminance signal and the color difference signals, and the enable flag information about each of the filtering processes (the adaptive filtering process, the pixel adaptive offset process, and the deblocking filtering process) which are carried out on a per sequence basis by the loop filter unit 11. A picture level header is a combination of pieces of header information which are set on a per picture basis, the pieces of header information including an index indicating a sequence level header to be referred to, the number of reference pictures at the time of motion compensation, and a probability table initialization flag for entropy encoding.

A slice level header is a combination of parameters which are set on a per slice basis, the parameters including position information showing at which position of the picture the corresponding slice exists, an index indicating which picture level header is to be referred to, the coding type of the slice (all intra coding, inter coding, or the like), an index indicating the adaptation parameter set which is used by the corresponding slice, and the flag information showing whether or not to carry out each of the filtering processes (the adaptive filtering process, the pixel adaptive offset process, and the deblocking filtering process) in the loop filter unit 11 using the adaptation parameter set indicated by the above-mentioned index. The adaptation parameter set has flags showing whether or not parameters (filter parameters) associated with the adaptive filtering process, the pixel adaptive offset process, and the deblocking filtering process and a parameter (quantization matrix parameter) associated with the quantization matrix exist respectively, and has parameters corresponding to only the parameters whose flags mentioned above are "enable." The adaptation parameter set also has indexes (aps_id) for identifying a plurality of adaptation parameter sets, which are multiplexed into the coded bitstream, respectively.

Figure 18:
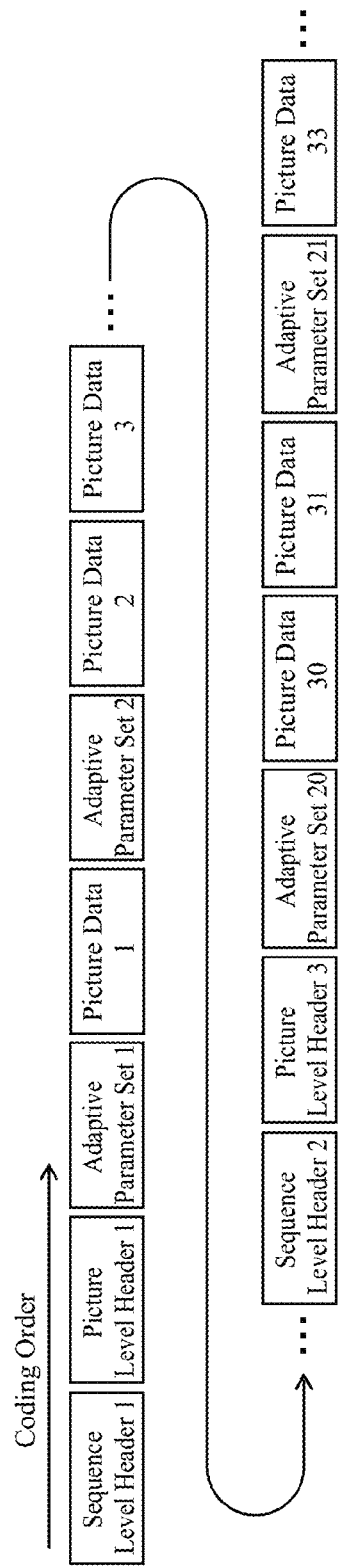
FIG. 18 is an explanatory drawing showing an example of the coded bitstream in which two or more sequence level headers are encoded.

In this case, when encoding a new sequence level header (sequence level header 2) at the time of a sequence change, as shown in FIG. 18, the variable length encoding unit 13 disables all the adaptation parameter sets which have been encoded before this sequence level header is encoded. Therefore, in the example shown in FIG. 18, a reference to any adaptation parameter set over a sequence level header, such as a reference to an adaptation parameter set 2 for encoding of picture data 30, is prohibited. More specifically, when a parameter in an adaptation parameter set is used for a picture to be processed after a new sequence level header (sequence level header 2) is encoded, it is necessary to encode the parameter as a new adaptation parameter set. Therefore, an adaptation parameter set which is encoded newly when a past adaptation parameter set cannot be used at all because the disabling process of disabling the above-mentioned adaptation parameter set or the like is carried out is the one in which a parameter, such as a quantization matrix, does not refer to the past adaptation parameter set, and all the parameters can be decoded by using only the adaptation parameter set in question. By initializing an adaptation parameter set by using a sequence level header at the time of a sequence change this way, when an error occurs in the coded bitstream before a new sequence level header is decoded, the video decoding device can avoid a decoding error caused by a reference to an adaptation parameter set in the stream and therefore can improve the error resistance. As an alternative, a sequence level header can be constructed in such a way as to have an initialization flag aps_reset_flag for an adaptation parameter set, thereby improving the error resistance. Concretely, only when the initialization flag aps_reset_flag is set to "enable", the adaptation parameter set is initialized, whereas when the initialization flag aps_reset_flag is set to "disable", the adaptation parameter set is not initialized. By providing an initialization flag for an adaptation parameter set as one of the parameters of a sequence level header this way, an adaptive initializing process can be carried out, and by carrying out the initialization only when it is necessary to improve the error resistance, reduction in the coding efficiency due to the initialization of an adaptation parameter set can be prevented.

Figure 22:
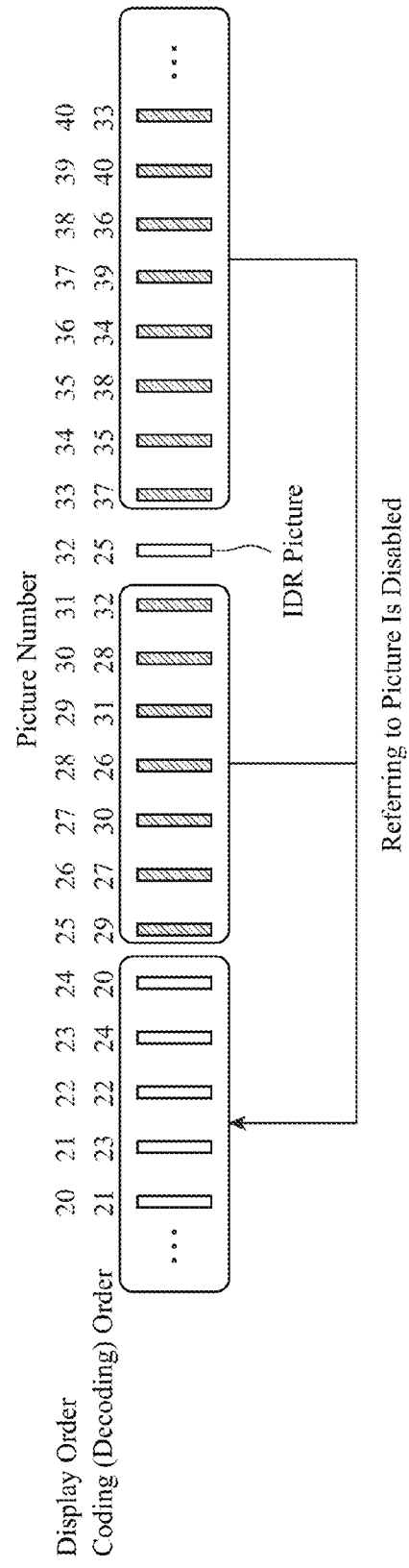
FIG. 22 is an explanatory drawing showing an example of a picture structure including an IDR picture.
Figure 23:
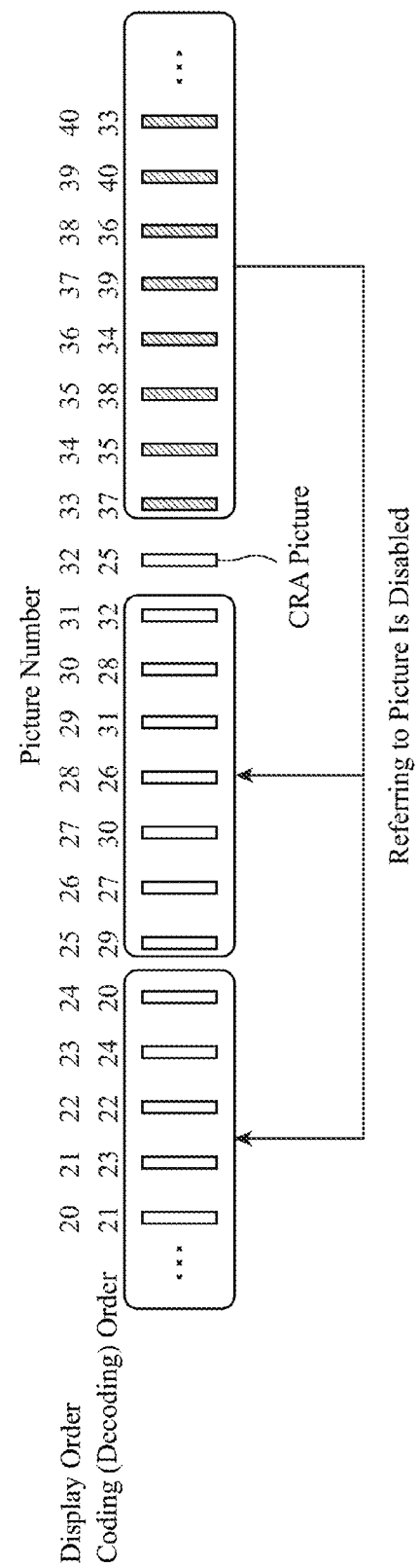
FIG. 23 is an explanatory drawing showing an example of a picture structure including a CRA picture.

In addition, as special pictures that guarantee the video decoding device to carry out a random access process of being able to correctly perform an image playback of a predetermined picture and subsequent pictures even if the video decoding device starts decoding from some midpoint in the coded bitstream, not from the head of the coded bitstream, there are IDR (instantaneous decoding refresh) pictures and CRA (clean random access) pictures. FIG. 22 shows an example of the picture structure including an IDR picture. In the example shown in FIG. 22, initial values showing the display order and the coding (decoding) order are set to 0. An IDR picture is an intra coded picture, and is the one which makes it possible to, even when the decoding is started from the IDR picture, always and correctly decode the IDR picture and pictures to be decoded after the IDR picture by imposing a limitation of reference pictures at the time of motion compensation shown in FIG. 22 on pictures (pictures gray-colored in FIG. 22) to be encoded after the IDR picture. Next, FIG. 23 shows an example of the picture structure including a CRA picture. In the example shown in FIG. 23, initial values showing the display order and the coding (decoding) order are set to 0. A CRA picture is an intra coded picture, and is the one which makes it possible to, even when the decoding is started from the CRA picture, always and correctly decode the CRA picture and pictures to be displayed after the CRA picture by imposing a limitation of reference pictures at the time of motion compensation shown in FIG. 23 on pictures (pictures gray-colored in FIG. 23) to be encoded after the CRA picture and to be displayed in order after the CRA picture, and by further prohibiting the existence of a picture to be encoded before the CRA picture and to be displayed in order after the CRA picture.

In this case, there is a possibility that, when random access according to an IDR picture or a CRA picture is carried out, a picture, which is assumed, as mentioned above, to be able to be correctly decoded according to the IDR picture or the CRA picture, cannot be correctly decoded (because there is a possibility that a picture which is assumed to be able to be correctly decoded refers to an adaptation parameter set which is encoded before the IDR picture or the CRA picture) when all the adaptation parameter sets encoded before the above-mentioned picture are not provided. Therefore, as the length of the part of the coded bitstream preceding the coded data about an IDR picture or a CRA picture increases, a larger number of adaptation parameter sets have to be decoded, and a reduction of the error resistance occurs, for example, an adaptation parameter set cannot be decoded due to an error occurring in the part of the coded bitstream preceding the coded data about the IDR picture or the CRA picture and hence a picture cannot be decoded correctly. To solve this problem, as a part of the parameters of each adaptation parameter set, a flag previous_aps_clear_flag for disabling already-encoded adaptation parameter sets is provided. When a previous_aps_clear_flag is set to "enable", the variable length encoding unit 13 disables the adaptation parameter sets encoded before the adaptation parameter set, whereas when a previous_aps_clear_flag is set to "disable", the variable length encoding unit 13 does not carry out the above-mentioned disabling process.

Figure 24:
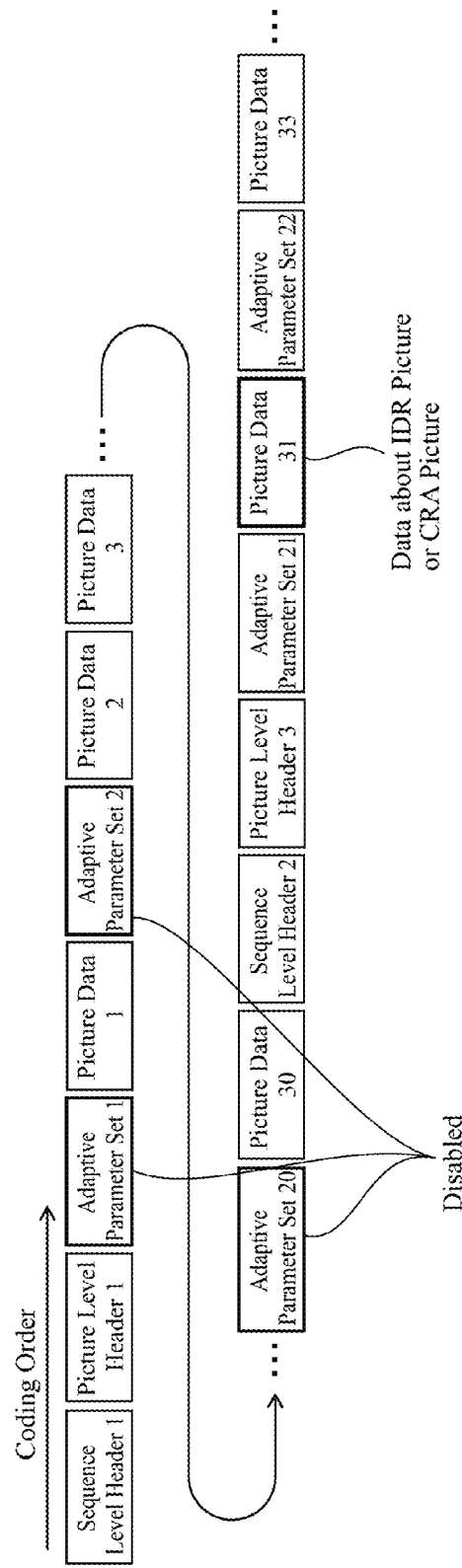
FIG. 24 is an explanatory drawing of a coded bitstream showing a process of disabling adaptation parameter sets in a decoding process starting from an IDR picture or a CRA picture.

FIG. 24 shows an example of the coded bitstream showing the disabling process of disabling some adaptation parameter sets. It is assumed that for picture data 31 shown in FIG. 24, an encoding (decoding) process is carried out by referring to a sequence level header 2, a picture level header 3, and an adaptation parameter set 21. In general, a unit for picture access which is a combination of picture data and the header information associated with the picture data, which is formed in the above-mentioned way, is referred to as an access unit. The adaptation parameter sets 1 to 20, which are included in the adaptation parameter sets shown in FIG. 24, are disabled by setting the flag previous_aps_clear_flag of only the adaptation parameter set 21 to "enable", a reference to any of the adaptation parameter sets 1 to 20 cannot be made for pictures to be encoded in order after the IDR picture or the CRA picture. Therefore, when carrying out random access according to the IDR picture or the CRA picture, what is necessary is just to carry out decoding from the sequence level header 2 shown in FIG. 24. On the other hand, when a high-speed decoding process at the time of random access and a high degree of error resistance are not required, what is necessary is just to always set the flag previous_aps_clear_flag to "disable" so as not to disable the adaptation parameter sets. Therefore, an adaptive process of disabling adaptation parameter sets by using a flag previous_aps_clear_flag can be implemented.

In the above-mentioned example, an adaptive process of disabling adaptation parameter sets for random access is implemented by using the flag previous_aps_clear_flag in an adaptation parameter set. As an alternative, an adaptive process of disabling adaptation parameter sets for random access can be implemented by providing a flag part_aps_clear_flag for disabling some adaptation parameter sets when encoding (decoding) an IDR picture or a CRA picture in a sequence level header or a unit referred to as a NAL unit. A NAL unit is the one in which slice data, a sequence level header, picture level headers, adaptive parameter headers, or the like as shown in FIG. 15 is stored, and has identification information for identifying whether data stored therein is slice data or header information. In a case in which data stored in a NAL unit is slice data, it can also be identified from this identification information that the picture is an IDR one or a CRA one.

Concretely, if a flag part_aps_clear_flag is set to "enable" when encoding an IDR picture or a CRA picture, the variable length encoding unit 13 implements an adaptive disabling process of disabling adaptation parameter sets for random access, which is the same as that in the case of using a flag previous_aps_clear_flag, by disabling the adaptation parameter sets preceding the picture data about the picture immediately preceding the IDR picture or the CRA picture. More specifically, in the example shown in FIG. 24, by setting the flag part_aps_clear_flag in the sequence level header 2 or the NAL unit of the picture data 31 to "enable", the adaptation parameter sets preceding the picture data 30 which is the one immediately preceding the picture data 31 are disabled when encoding the picture data 31. Therefore, for pictures to be encoded in order after the IDR picture or the CRA picture, a reference to any one of the adaptation parameter sets 1 to 20 cannot be made. More specifically, the adaptation parameter sets preceding the access unit including the picture data about the IDR picture or the CRA picture are disabled, and no reference can be made. Therefore, when carrying out random access according to the IDR picture or the CRA picture, what is necessary is just to carry out decoding from the sequence level header 2 shown in FIG. 24.

In the above-mentioned explanation, the disabling process of disabling adaptation parameter sets is carried out when a flag part_aps_clear_flag is set to "enable." As an alternative, instead of disposing a flag as mentioned above, the disabling process of disabling adaptation parameter sets can be always carried out when encoding an IDR picture or a CRA picture. By doing this way, the code amount is reduced by the code amount required to encode a flag as mentioned above. Further, the process of referring to a flag as mentioned above when performing the encoding process becomes unnecessary, and the video encoding device is simplified.

In addition, as another method of implementing the disabling process of disabling adaptation parameter sets according to an IDR picture or a CRA picture, there can be provided a method of constructing a video encoding device that provides a parameter aps_group_id in each adaptation parameter set. In the above-mentioned video encoding device, as shown in FIG. 27, the above-mentioned parameter is disposed in each adaptation parameter set, and, when encoding an IDR picture or a CRA picture, the variable length encoding unit 13 disables an adaptation parameter set having aps_group_id whose value differs from that of aps_group_id which another adaptation parameter set has, the other adaptation parameter set being referred to by the IDR picture or the CRA picture. For example, in the case shown in FIG. 24, by setting the parameters aps_group_id of the adaptation parameter sets 1 to 20 to zero, and also setting the parameters aps_group_id of the adaptation parameter set 21 and subsequent adaptation parameter sets to one, the variable length encoding unit disables the adaptation parameter sets 1 to 20 whose parameters aps_group_id (=0) differ from the parameter aps_group_id (=1) of the adaptation parameter set 21 when the adaptation parameter set 21 is referred to by the picture data 31 about the IDR picture or the CRA picture. Therefore, the adaptation parameter sets 1 to 20 are not referred to by the picture data 31 and subsequent picture data.

By thus carrying out the encoding in such a way as to change the value of the parameter aps_group_id of an adaptation parameter set according to an IDR picture or a CRA picture, the reference to adaptation parameter sets is limited, and the video decoding device is enabled to correctly decode a predetermined picture and subsequent pictures when starting the decoding from an access unit including the picture data about the IDR picture or the CRA picture. aps_group_id can be alternatively a flag having only a value of 0 or 1. In this case, a similar disabling process of disabling adaptation parameter sets can be implemented by switching the value of the above-mentioned flag which an adaptation parameter set has according to an IDR picture or a CRA picture from 0 to 1 or from 1 to 0.

Figure 28:
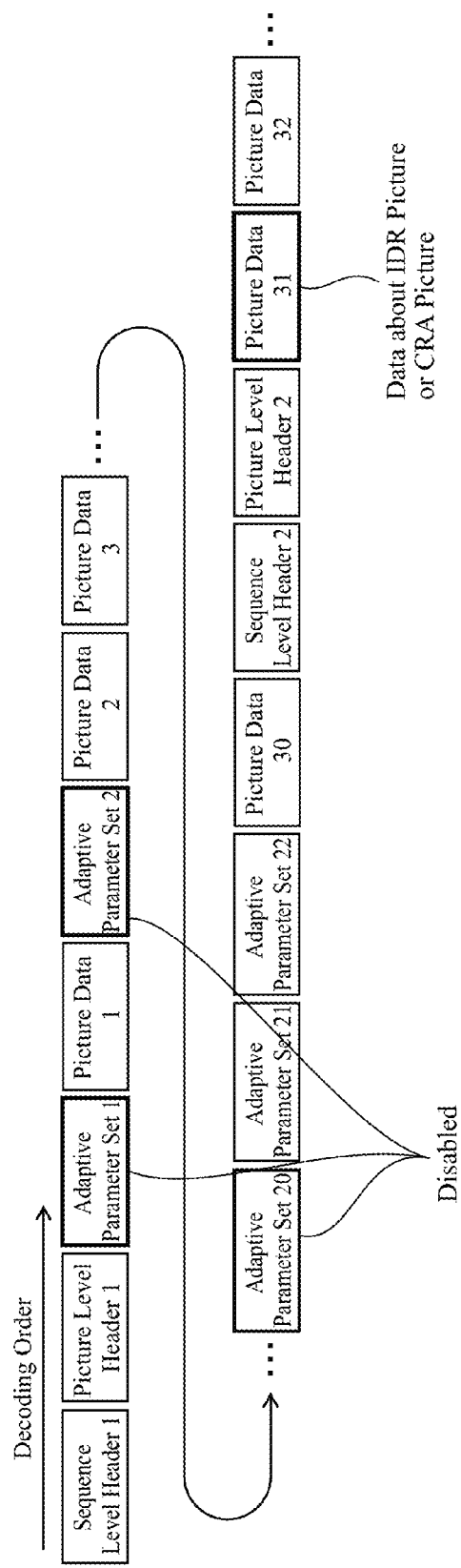
FIG. 28 is an explanatory drawing a case in which the order of data in the coded bitstream of FIG. 24 inputted to a decoding side is changed.

By using a method of introducing aps_group_id as mentioned above, the decoding can be carried out correctly even when the order of data in the coded bitstream which is received by the video decoding device has changed from the order of the data encoded by the video encoding device from the reason for transmitting the coded bitstream while distributing the coded bitstream among a plurality of lines, or the like. Concretely, even in a case in which the coded bitstream in which the data are encoded in the order of FIG. 24 has been changed to the one in which the adaptation parameter sets 21 and 22 are to be decoded before the picture data 30 when reaching the video decoding device, as shown in FIG. 28, the adaptation parameter sets 1 to 20 whose parameters aps_group_id (=0) differ from that of the adaptation parameter set 21 can be disabled appropriately when the adaptation parameter set 21 is referred to by the picture data 31 about the IDR picture or the CRA picture. In accordance with the method of introducing aps_group_id as mentioned above, when a higher priority is given to the coding efficiency than to the error resistance, the reduction in the coding efficiency due to restrictions imposed on adaptation parameter sets which can be referred to can be prevented because adaptation parameter sets do not need to be disabled by carrying out the encoding in such a way that the values of the parameters aps_group_id of the adaptation parameter sets are not changed according to an IDR picture or a CRA picture. Further, the video encoding device that has a parameter aps_group_id in each adaptation parameter set can be constructed in such a way as to disable an adaptation parameter set whose parameter aps_group_id has a value different from that of a parameter aps_group_id which is to be referred to also when a picture other than IDR pictures and CRA pictures is decoded. By doing this way, the video encoding device can carry out an adaptive disabling process of disabling adaptation parameter sets by arbitrarily setting the timing with which to change the parameter aps_group_id of an adaptation parameter set, and can implement an adaptive process having error resistance.

In addition, the video encoding device can be constructed in such a way that when encoding an IDR picture or a CRA picture, the variable length encoding unit 13 disables the adaptation parameter sets having indexes smaller than the index (aps_id) of an adaptation parameter which is to be referred to by the IDR picture or the CRA picture, as another method of implementing the disabling process of disabling adaptation parameter sets according to an IDR picture or a CRA picture. More specifically, in a case in which indexes are assigned to adaptation parameter sets in the order in which these adaptation parameter sets are encoded in the examples of FIGS. 24 and 28, when the adaptation parameter set 21 is referred to by the picture data 31 about an IDR picture or a CRA picture, the adaptation parameter sets 1 to 20 having indexes smaller than the index of the adaptation parameter set 21 are disabled. Therefore, the adaptation parameter sets 1 to 20 are not referred to by the picture data 31 and subsequent picture data, and the video decoding device can always and correctly decode a predetermined picture and subsequent pictures when starting the decoding from the access unit including the picture data 31 about the IDR picture or the CRA picture.

In addition, the variable length encoding unit 13 can be can be constructed in such a way as to, instead of encoding the quantization matrix parameter as an adaptation parameter set, encode the quantization matrix parameter in a picture level header as a parameter which can be changed on a per picture basis. By doing this way, the variable length encoding unit can encode the quantization matrix parameter and the filter parameters in independent units respectively. In this case, the same processes as the adaptation parameter set initializing process using a sequence level header and the disabling process of disabling adaptation parameter sets according to an IDR or CRA picture, which are explained above, are carried out also on the quantization matrix parameter.

Further, the variable length encoding unit 13 can be constructed in such a way as to, instead of encoding the filter parameters which are used in the loop filter unit 11 as an adaptation parameter set, encode the filter parameters which are used on a per slice basis by directly using the slice data about a slice level header or the like. By doing this way, because it becomes unnecessary to encode indexes each indicating an adaptation parameter set which is to be referred to at the time of the decoding process on each slice which is one slice level header for the filter parameters which are used in the loop filter unit 11 when no redundant filter parameters exist between slices, the code amount of the indexes can be reduced and the coding efficiency can be improved.

Figure 2:
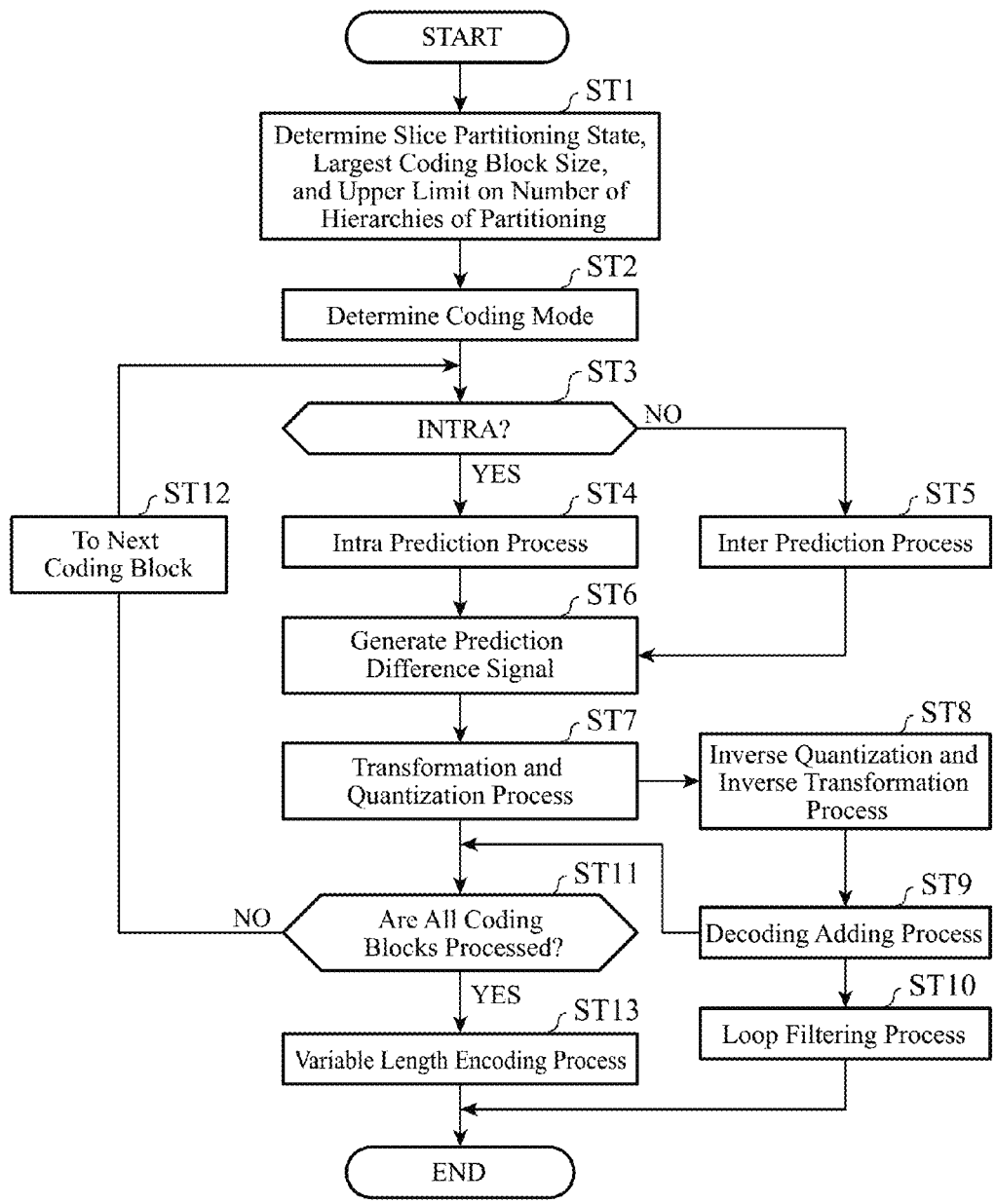
FIG. 2 is a flow chart showing a process (video encoding method) carried out by the video encoding device in accordance with Embodiment 1 of the present invention.

In the example shown in FIG. 1, the block partitioning unit 1, the encoding controlling unit 2, the select switch 3, the intra prediction unit 4, the motion-compensated prediction unit 5, the subtracting unit 6, the transformation/quantization unit 7, the inverse quantization/inverse transformation unit 8, the adding unit 9, the memory 10 for intra prediction, the loop filter unit 11, the motion-compensated prediction frame memory 12, and the variable length encoding unit 13, which are the components of the video encoding device, can consist of pieces of hardware for exclusive use (e.g., semiconductor integrated circuits in each of which a CPU is mounted, one chip microcomputers, or the like), respectively. As an alternative, the video encoding device can consist of a computer, and a program in which the processes carried out by the block partitioning unit 1, the encoding controlling unit 2, the select switch 3, the intra prediction unit 4, the motion-compensated prediction unit 5, the subtracting unit 6, the transformation/quantization unit 7, the inverse quantization/inverse transformation unit 8, the adding unit 9, the loop filter unit 11, and the variable length encoding unit 13 are described can be stored in a memory of the computer and the CPU of the computer can be made to execute the program stored in the memory. FIG. 2 is a flow chart showing the processing (video encoding method) carried out by the video encoding device in accordance with Embodiment 1 of the present invention.

Figure 3:
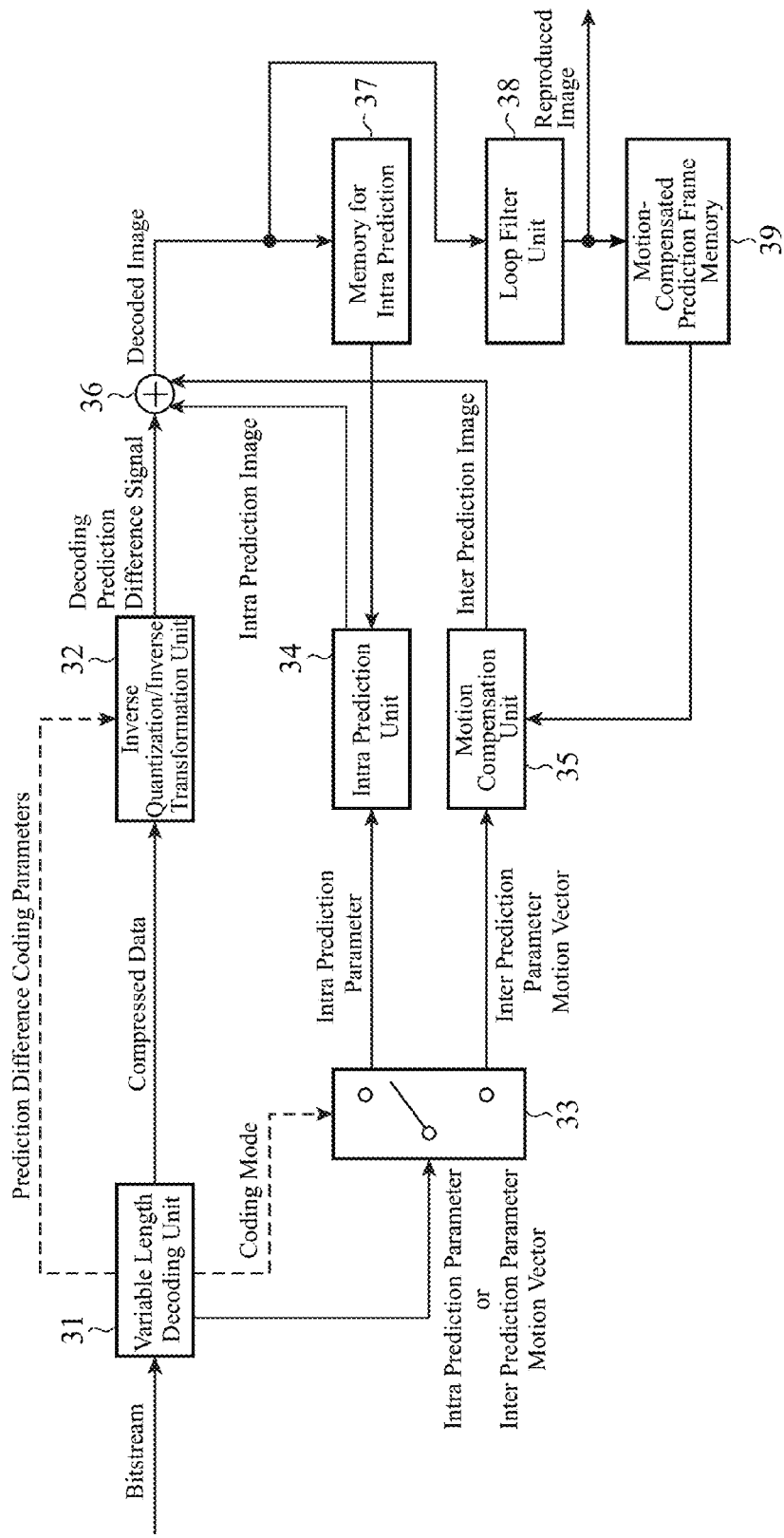
FIG. 3 is a block diagram showing a video decoding device in accordance with Embodiment 1 of the present invention.

FIG. 3 is a block diagram showing the video decoding device in accordance with Embodiment 1 of the present invention. Referring to FIG. 3, when receiving the bitstream generated by the video encoding device shown in FIG. 1, a variable length decoding unit 31 decodes each of the pieces of header information, such as sequence level headers, picture level headers, adaptation parameter sets, and slice level headers, from the bit stream, and also variable-length-decodes the block partitioning information showing the partitioning state of each of coding blocks partitioned hierarchically from the bitstream. At this time, from the quantization matrix parameter in each adaptation parameter set variable-length-decoded by the variable length decoding unit 31, the video decoding device specifies the quantization matrix of the adaptation parameter set. Concretely, for each of the chrominance signals and for each coding mode at each orthogonal transformation size, the video decoding device specifies the quantization matrix for which the quantization matrix parameter is prepared, as an initial value, in advance and in common between the video encoding device and the video decoding device. As an alternative, when the quantization matrix parameter shows that the quantization matrix is an already-decoded one (the quantization matrix is not a new one), the video decoding device specifies the quantization matrix by referring to the index information specifying which quantization matrix in the above-mentioned matrices included in the above-mentioned adaptation parameter set is the quantization matrix, and, when the quantization matrix parameter shows that a new quantization matrix is used, specifies, as a quantization matrix to be used, the quantization matrix included in the quantization matrix parameter. The variable length decoding unit 31 also carries out a process of referring to each header information to specify each largest decoding block included in slice data (a block corresponding to each "largest coding block" in the video encoding device of FIG. 1), referring to the block partitioning information to specify each decoding block which is one of units into which each largest decoding block is hierarchically partitioned and on which the video decoding device carries out a decoding process (a block corresponding to each "coding block" in the video encoding device of FIG. 1), and variable-length-decoding the compressed data, the coding mode, the intra prediction parameter (when the coding mode is an intra coding mode), the inter prediction parameter (when the coding mode is an inter coding mode), the prediction difference coding parameters, and the motion vector (when the coding mode is an inter coding mode), which are associated with each decoding block. The variable length decoding unit 31 constructs a variable length decoder.

An inverse quantization/inverse transformation unit 32 carries out a process of inverse-quantizing the compressed data variable-length-decoded by the variable length decoding unit 31 for each orthogonal transformation block by referring to the quantization parameter and the orthogonal transformation block partitioning information which are included in the prediction difference coding parameters variable-length-decoded by the variable length decoding unit 31, and also performing an inverse orthogonal transformation process on the transform coefficients which are the compressed data inverse-quantized thereby to calculate a decoded prediction difference signal which is the same as the local decoded prediction difference signal outputted from the inverse quantization/inverse transformation unit 8 shown in FIG. 1. The inverse quantization/inverse transformation unit 32 constructs a difference image generator.

In this case, when each header information variable-length-decoded by the variable length decoding unit 31 shows that the inverse quantization process is carried out on the slice currently being processed by using the quantization matrix, the inverse quantization/inverse transformation unit carries out the inverse quantization process by using the quantization matrix. Concretely, the inverse quantization/inverse transformation unit carries out the inverse quantization process by using the quantization matrix of the adaptation parameter set which is specified from each header information and which is referred to by the slice currently being processed.

A select switch 33 carries out a process of, when the coding mode variable-length-decoded by the variable length decoding unit 31 is an intra coding mode, outputting the intra prediction parameter variable-length-decoded by the variable length decoding unit 31 to an intra prediction unit 34, and, when the coding mode variable-length-decoded by the variable length decoding unit 31 is an inter coding mode, outputting the inter prediction parameter and the motion vector which are variable-length-decoded by the variable length decoding unit 31 to a motion compensation unit 35.

The intra prediction unit 34 carries out a process of, when the coding mode associated with the decoding block specified from the block partitioning information variable-length-decoded by the variable length decoding unit 31 is an intra coding mode, performing an intra prediction process (intra-frame prediction process) using the intra prediction parameter outputted from the select switch 33 on each prediction block, which is a unit for prediction process at the time of carrying out the prediction process on the decoding block, while referring to a decoded image stored in a memory 37 for intra prediction so as to generate an intra prediction image.

The motion compensation unit 35 carries out a process of, when the coding mode associated with the decoding block specified from the block partitioning information variable-length-decoded by the variable length decoding unit 31 is an inter coding mode, performing an inter prediction process (motion-compensated prediction process) using the motion vector and the inter prediction parameter which are outputted from the select switch 33 on each prediction block, which is a unit for prediction process at the time of carrying out the prediction process on the above-mentioned decoding block, while referring to a decoded image stored in a motion-compensated prediction frame memory 39 so as to generate an inter prediction image. A predictor is comprised of the intra prediction unit 34, the memory 37 for intra prediction, the motion compensation unit 35, and the motion-compensated prediction frame memory 39.

An adding unit 36 carries out a process of adding the decoded prediction difference signal calculated by the inverse quantization/inverse transformation unit 32 and the intra prediction image generated by the intra prediction unit 34 or the inter prediction image generated by the motion compensation part 35 so as to calculate the same decoded image as the local decoded image outputted from the adding unit 9 shown in FIG. 1. The adding unit 36 constructs a decoded image generator.

Figure 12:
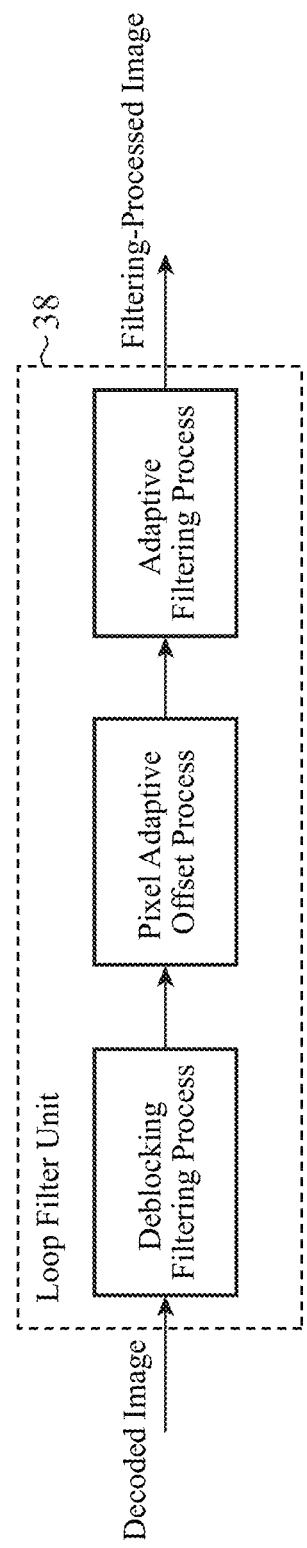
FIG. 12 is an explanatory drawing showing an example of the structure of a loop filter unit of the video decoding device in accordance with Embodiment 1 of the present invention in the case of using a plurality of loop filtering processes.

The memory 37 for intra prediction is a recording medium for storing the decoded image calculated by the adding unit 36. A loop filter unit 38 carries out a process of performing a predetermined filtering process on the decoded image calculated by the adding unit 36 so as to output the decoded image on which the filtering process is carried out. Concretely, the loop filter unit performs a filtering (deblocking filtering) process of reducing a distortion occurring at a boundary between orthogonal transformation blocks and a distortion occurring at a boundary between prediction blocks, a process (pixel adaptive offset process) of adaptively adding an offset on a per pixel basis, an adaptive filtering process of adaptively switching among linear filters, such as Wiener filters, to perform the filtering process, and so on. However, for each of the above-mentioned filtering processes including the deblocking filtering process, the pixel adaptive offset process, and the adaptive filtering process, the loop filter unit 38 specifies whether or not to carry out the process on the slice currently being processed by referring to each header information variable-length-decoded by the variable length decoding unit 31. In the case in which the video encoding device of FIG. 1 encodes the filter parameters which are used on a per slice basis by directly using slice data, instead of encoding the filter parameters which are used by the loop filter unit 38 as a part of an adaptation parameter set which is one piece of header information, the variable length decoding unit 31 decodes the filter parameters which are used by the loop filter unit 38 from the slice data. At this time, in the case in which the loop filter unit 11 of the video encoding device is constructed as shown in FIG. 11, the loop filter unit 38 is constructed as shown in FIG. 12 in the case of carrying out two or more filtering processes. The loop filter unit 38 constructs a filter.

In the deblocking filtering process, when referring to the adaptation parameter set which is to be referred to by the slice currently being processed, and there exists change information for changing the various parameters used for the selection of the intensity of a filter applied to a block boundary from their initial values, the loop filter unit carries out the deblocking filtering process on the basis of the change information. When no change information exists, the loop filter unit carries out the deblocking filtering process according to a predetermined method.

In the pixel adaptive offset process, the loop filter unit refers to the adaptation parameter set which is to be referred to by the slice currently being processed, partitions the decoded image into blocks on the basis of the block partitioning information included in the adaptation parameter set, refers to the index included in the adaptation parameter set and indicating the class classifying method of each of the blocks on a per block basis, and, when the index does not show "does not carry out the offset process", carries out a class classification on each pixel in each of the blocks according to the class classifying method indicated by the above-mentioned index on a per block basis. As candidates for the class classifying method, class classifying methods which are the same as candidates for the class classifying method of the pixel adaptive offset process carried out by the loop filter unit 11 are prepared in advance. The loop filter unit then refers to the offset information specifying the offset value calculated for each class determined on a per block basis (offset information included in the adaptation parameter set), and carries out a process of adding the offset to the brightness value of the decoded image.

However, in a case in which the pixel adaptive offset process carried out by the loop filter unit 11 of the video encoding device is constructed in such a way as to always partition the image into blocks each having a fixed size (e.g., largest coding blocks) without encoding the block partitioning information, select a class classifying method for each of the blocks, and carry out the adaptive offset process for each class, the loop filter unit 38 also carries out the pixel adaptive offset process on each block having the same fixed size as that processed by the loop filter unit 11.

In the adaptive filtering process, the loop filter unit refers to the adaptation parameter set which is to be referred to by the slice currently being processed, and, after carrying out a class classification according to the same method as that used by the video encoding device of FIG. 1, carries out the filtering process by using the filter for each class included in the adaptation parameter set on the basis of information about the class classification. However, in a case in which in the adaptive filtering process carried out by the loop filter unit 11 of the video encoding device, the above-mentioned class classification, and the filter design and the filtering process are constructed in such a way as to be carried out on, instead of the entire image, each block having a fixed size, e.g., each largest coding block, the loop filter unit 38 also decodes the filter used for each class and carries out the above-mentioned class classification and the above-mentioned filtering process on each block having a fixed size which is the same as that processed by the loop filter unit 11.

When a new sequence level header (sequence level header 2) is inserted into some midpoint in the coded bitstream because of a sequence change, as shown in FIG. 18, the variable length decoding unit 31 disables all the adaptation parameter sets already decoded when decoding the new sequence level header. Therefore, in the example shown in FIG. 18, a reference to an adaptation parameter set over a sequence level header, such as a reference to an adaptation parameter set 2 at the time of decoding picture data 30, is not made. In addition, an adaptation parameter set which is decoded when past adaptation parameter sets cannot be used at all through the above-mentioned disabling process of disabling adaptation parameter sets or the like is the one in which parameters including a quantization matrix do not refer to a past adaptation parameter set and which makes it possible to decode all the parameters by using only the adaptation parameter set in question. This restriction can prevent a decoding error from occurring as a result of, when an error occurs in a part of the coded bitstream preceding the new sequence level header, referring to an adaptation parameter set in the part of the bitstream, thereby being able to improve the error resistance. However, in the case in which the video encoding device is constructed in such a way as to have an initialization flag aps_reset_flag for each adaptation parameter set in a sequence level header, each adaptation parameter set is initialized only when its flag aps_reset_flag decoded by the variable length decoding unit 31 is set to "enable", whereas each adaptation parameter set is not initialized when its flag aps_reset_flag is set to "disable." By doing this way, the video decoding device can correctly decode the stream generated by the video encoding device that carries out the adaptive initializing process using the initialization flag aps_reset_flag for each adaptation parameter set.

In addition, in the case in which the video encoding device is constructed in such a way as to have, as a part of the parameters of each adaptation parameter set, a flag previous_aps_clear_flag for disabling already-decoded adaptation parameter sets, when a previous_aps_clear_flag decoded by the variable length decoding unit 31 is set to "enable", the variable length decoding unit 31 disables the adaptation parameter sets decoded before the adaptation parameter set, whereas when the previous_aps_clear_flag is set to "disable", the variable length decoding unit does not carry out the above-mentioned disabling process. More specifically, in the example of the coded bitstream shown in FIG. 24, when the variable length encoding unit 13 of the video encoding device has encoded the flag previous_aps_clear_flag of the adaptation parameter set 21 as "enable", the adaptation parameter sets 1 to 20 are disabled and no reference to the adaptation parameter sets 1 to 20 is made for pictures to be encoded in order after an IDR picture or a CRA picture. Therefore, random access according to the IDR picture or the CRA picture can be implemented in the decoding from the sequence level header 2 which is the head of the access unit including the picture data 31 about the IDR picture or the CRA picture.

As an alternative, in the case in which the video encoding device is constructed in such a way as to implement the disabling process of disabling adaptation parameter sets for random access by providing a flag part_aps_clear_flag for disabling some adaptation parameter sets when decoding an IDR picture or a CRA picture in a sequence level header or a NAL unit, when a flag part_aps_clear_flag decoded by the variable length decoding unit 31 at the time of decoding an IDR picture or a CRA picture is set to "enable", the variable length decoding unit 31 disables the adaptation parameter sets preceding the picture data about the picture immediately preceding the IDR picture or the CRA picture. More specifically, in the example shown in FIG. 24, when the variable length encoding unit 13 of the video encoding device has encoded the flag part_aps_clear_flag in the sequence level header 2 or the NAL unit of the picture data 31 as "enable", the adaptation parameter sets preceding the picture data 30 which is the picture data immediately preceding the picture data 31 are disabled when decoding the picture data 31. Therefore, no reference to the adaptation parameter sets 1 to 20 is made for the pictures to be decoded in order after the IDR picture or the CRA picture, and random access according to the IDR picture or the CRA picture can be implemented in the decoding from the sequence level header 2. However, in the case in which the video encoding device is constructed in such a way as to always carry out the disabling process of disabling adaptation parameter sets when encoding an IDR picture or a CRA picture without providing such a flag as above, the video decoding device can be constructed in such a way that the variable length decoding unit 31 always carries out the above-mentioned disabling process of disabling adaptation parameter sets when decoding the IDR picture or the CRA picture, thereby being able to correctly decode the coded bitstream generated by the above-mentioned video encoding device.

In addition, in the case in which the video encoding device is constructed in such a way as to have a parameter referred to as aps_group_id in each adaptation parameter set as a method of implementing the disabling process of disabling adaptation parameter sets according to an IDR picture or a CRA picture, when decoding the IDR picture or the CRA picture, the variable length decoding unit 31 of the video decoding device disables an adaptation parameter set having aps_group_id whose value differs from that of aps_group_id which another adaptation parameter set has, the other adaptation parameter set being referred to by the IDR picture or the CRA picture. For example, in the case shown in FIG. 24, when the video encoding device encodes the adaptation parameter sets in such a way as to set the parameters aps_group_id of the adaptation parameter sets 1 to 20 to zero and also set the parameters aps_group_id of the adaptation parameter set 21 and subsequent adaptation parameter sets to one, the variable length decoding unit 31 of the video decoding device disables the adaptation parameter sets 1 to 20 having parameters aps_group_id (=0) different from the parameter aps_group_id (=1) of the adaptation parameter set 21 when the picture data 31 about the IDR picture or the CRA picture refers to the adaptation parameter set 21. Therefore, the adaptation parameter sets 1 to 20 are not referred to by the picture data 31 and subsequent picture data, and the video decoding device can always and correctly decode a predetermined picture and subsequent pictures by starting the decoding from the sequence level header 2 which is the head of the access unit including the picture data 31 about the IDR picture or the CRA picture.

In accordance with the method of introducing an aps_group_id as mentioned above, when the video encoding device carries out the encoding in such a way as not to change the values of the parameters aps_group_id of the adaptation parameter sets according to an IDR picture or a CRA picture while giving a higher priority to the coding efficiency than to the error resistance, the video decoding device can also decode the adaptation parameter sets correctly without the adaptation parameter sets being disabled because, when the picture data about the IDR picture or the CRA picture refers to an adaptation parameter set, there exists no adaptation parameter set having a parameter aps_group_id whose value differs from that of the parameter aps_group_id of the adaptation parameter set which is referred to by the picture data. Further, in the case in which the video encoding device is constructed in such a way as to disable an adaptation parameter set having a parameter aps_group_id whose value differs from that of the parameter aps_group_id which is referred to also when decoding a picture other than IDR pictures or CRA pictures, the variable length decoding unit 31 of the video decoding device disables an adaptation parameter set having a parameter aps_group_id whose value differs from that of the parameter aps_group_id which is referred to when decoding a picture. By doing in this way, the video decoding device can correctly decode the stream generated by the video encoding device that implements the adaptive disabling process of disabling adaptation parameter sets by arbitrarily setting the timing with which to change the parameter aps_group_id of an adaptation parameter set.

In addition, in the case in which the variable length encoding unit 13 of the video encoding device is constructed in such a way as to, when encoding an IDR picture or a CRA picture, carry out the disabling process of disabling adaptation parameter sets according to the IDR picture or the CRA picture by using the index (aps_id) of each adaptation parameter set, as another method of implementing the disabling process of disabling adaptation parameter sets according to an IDR picture or a CRA picture, the variable length decoding unit 31 of the video decoding device disables the adaptation parameter sets having indexes smaller than the index (aps_id) of the adaptation parameter set in question when referring to the adaptation parameter set which is referred to by the IDR picture or the CRA picture. More specifically, in the case in which indexes are assigned to adaptation parameter sets in the order in which these adaptation parameter sets are encoded in the examples of FIGS. 24 and 28, when the adaptation parameter set 21 is referred to by the picture data 31 about an IDR picture or a CRA picture, the adaptation parameter sets 1 to 20 having indexes smaller than the index of the adaptation parameter set 21 are disabled. Therefore, the adaptation parameter sets 1 to 20 are not referred to by the picture data 31 and subsequent picture data, and the video decoding device can always and correctly decode a predetermined picture and subsequent pictures when starting the decoding from the access unit including the picture data 31 of the IDR picture or the CRA picture.

In addition, in the case in which the video encoding device is constructed in such a way as to, instead of encoding the quantization matrix parameter as an adaptation parameter set, encode the quantization matrix parameter in a picture level header as a parameter which can be changed on a per picture basis, the same processes as the adaptation parameter set initializing process using a sequence level header and the disabling process of disabling adaptation parameter sets according to an IDR or CRA picture, which are explained above, are carried out also on the quantization matrix parameter. The motion-compensated prediction frame memory 39 is a recording medium that stores the decoded image on which the filtering process is carried out by the loop filter unit 38. In general, a profile and a level may be defined in the video decoding device as information showing a constraint for defining circuit scales including a memory amount. The profile defines the specifications of the video decoding device (descriptions showing the structures of the variable length decoding unit, the inverse quantization/inverse transformation unit, the intra prediction unit, the motion compensation unit, the loop filter unit, etc.), and the level imposes restrictions on settings, such as a maximum input image size, the number of frame memories, and a motion vector range which the motion vector can have, which affect the required memory amount and the amount of computation of the video decoding device. On the other hand, because an optimal number of offsets per picture of the pixel adaptive offset process in the loop filter unit 38 and an optimal number of filters per picture of the adaptive filtering process increase with increase in the space resolution of the image, a maximum number of offsets per picture of the pixel adaptive offset process and a maximum number of filters per picture of the adaptive filtering process can be defined according to the maximum input image size defined by the level. By doing in this way, an appropriate maximum number of offsets and an appropriate maximum number of filters can be defined adaptively.

Figure 4:
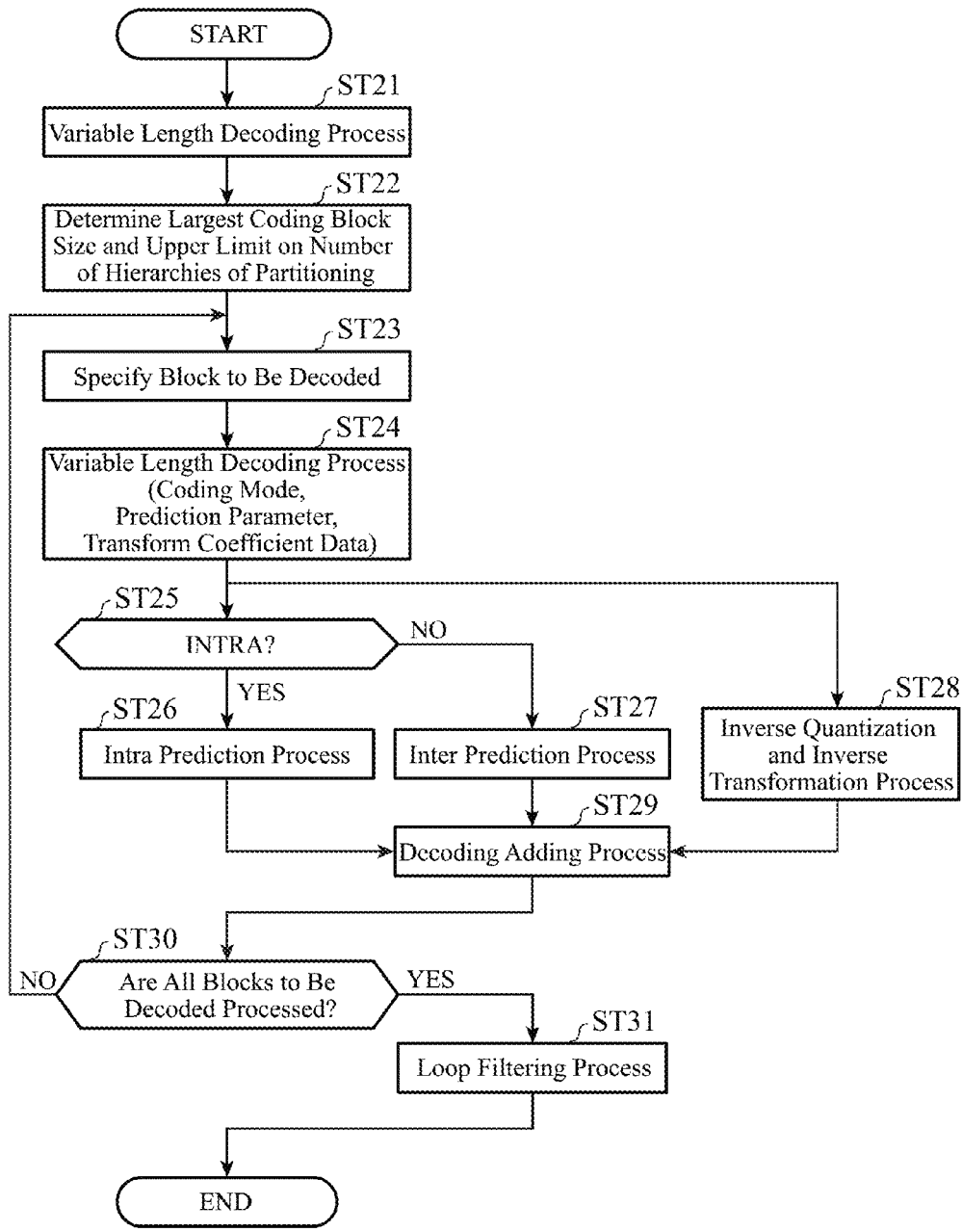
FIG. 4 is a flow chart showing a process (video decoding method) carried out by the video decoding device in accordance with Embodiment 1 of the present invention.

In the example shown in FIG. 3, the variable length decoding unit 31, the inverse quantization/inverse transformation unit 32, the select switch 33, the intra prediction unit 34, the motion compensation unit 35, the adding unit 36, the memory 37 for intra prediction, the loop filter unit 38, and the motion-compensated prediction frame memory 39, which are the components of the video decoding device, can consist of pieces of hardware for exclusive use (e.g., semiconductor integrated circuits in each of which a CPU is mounted, one chip microcomputers, or the like), respectively. As an alternative, the video decoding device can consist of a computer, and a program in which the processes carried out by the variable length decoding unit 31, the inverse quantization/inverse transformation unit 32, the select switch 33, the intra prediction unit 34, the motion compensation unit 35, the adding unit 36, and the loop filter unit 38 are described can be stored in a memory of the computer and the CPU of the computer can be made to execute the program stored in the memory. FIG. 4 is a flow chart showing the processing (video decoding method) carried out by the video decoding device in accordance with Embodiment 1 of the present invention.

Next, the operations of the video encoding and decoding devices will be explained. In this Embodiment 1, a case in which the video encoding device receives each frame image of a video as an inputted image, carries out an intra prediction from already-encoded neighborhood pixels or a motion-compensated prediction between adjacent frames, and performs a compression process with orthogonal transformation and quantization on an acquired prediction difference signal, and, after that, carries out variable length encoding so as to generate a coded bitstream, and the video decoding device decodes the coded bitstream outputted from the video encoding device will be explained.

The video encoding device shown in FIG. 1 is characterized in that the video encoding device is adapted for local changes in a space direction and in a time direction of a video signal, divides the video signal into blocks having various sizes, and carries out intra-frame and inter-frame adaptive encoding. In general, the video signal has a characteristic of its complexity locally varying in space and time. There can be a case in which a pattern having a uniform signal characteristic in a relatively large image region, such as a sky image or a wall image, or a pattern having a complicated texture pattern in a small image region, such as a person image or a picture including a fine texture, also coexists on a certain video frame from the viewpoint of space. Also from the viewpoint of time, a sky image and a wall image have a small local change in a time direction in their patterns, while an image of a moving person or object has a larger temporal change because its outline has a movement of a rigid body and a movement of a non-rigid body with respect to time.

Although a process of generating a prediction difference signal having small signal power and small entropy by using a temporal and spatial prediction, thereby reducing the whole code amount, is carried out in the encoding process, the code amount of parameters used for the prediction can be reduced as long as the parameters can be applied uniformly to as large an image signal region as possible. On the other hand, because the amount of errors occurring in the prediction increases when the same prediction parameter is applied to a large image region in an image signal pattern having a large change in time and space, the code amount of the prediction difference signal increases. Therefore, it is desirable to apply the same prediction parameter to an image region having a large change in time and space to reduce the block size of a block which is subjected to the prediction process, thereby increasing the data volume of the parameter which is used for the prediction and reducing the electric power and entropy of the prediction difference signal.

In this Embodiment 1, a structure of, in order to carry out encoding which is adapted for such the typical characteristics of a video signal, starting the prediction process and so on from a predetermined largest block size first, hierarchically partitioning each region of the video signal into blocks, and adapting the prediction process and the encoding process of encoding the prediction difference to each of the blocks partitioned is provided.

A video signal having a format which is to be processed by the video encoding device shown in FIG. 1 can be a YUV signal which consists of a luminance signal and two color difference signals or a color video image signal in arbitrary color space, such as an RGB signal, outputted from a digital image sensor, or an arbitrary video signal, such as a monochrome image signal or an infrared image signal, in which each video frame consists of a series of digital samples (pixels) in two dimensions, horizontal and vertical. The gradation of each pixel can be an 8-bit, 10-bit, or 12-bit one.

In the following explanation, for convenience' sake, a case in which the video signal of the inputted image is a YUV signal unless otherwise specified, and the two color difference components U and V which are signals having a 4:2:0 format which are subsampled with respect to the luminance component Y are handled will be described. Further, a data unit to be processed which corresponds to each frame of the video signal is referred to as a "picture." In this Embodiment 1, although an explanation will be made in which a "picture" is a video frame signal on which progressive scanning is carried out, a "picture" can be alternatively a field image signal which is a unit which constructs a video frame when the video signal is an interlaced signal.

First, the processing carried out by the video encoding device shown in FIG. 1 will be explained. First, the encoding controlling unit 2 determines the slice partitioning state of a picture (current picture) which is the target to be encoded, and also determines the size of each largest coding block which is used for the encoding of the picture and the upper limit on the number of hierarchies at the time when each largest coding block is hierarchically partitioned into blocks (step ST1 of FIG. 2). As a method of determining the size of each largest coding block, for example, there can be a method of determining the same size for all the pictures according to the resolution of the video signal of the inputted image, and a method of quantifying a variation in the complexity of a local movement of the video signal of the inputted image as a parameter and then determining a small size for a picture having a large and vigorous movement while determining a large size for a picture having a smaller movement.

As a method of determining the upper limit on the number of hierarchies of the partitioning, for example, there can be a method of determining the same number of hierarchies for all the pictures according to the resolution of the video signal of the inputted image, and a method of increasing the number of hierarchies to make it possible to detect a finer movement as the video signal of the inputted image has a larger and more vigorous movement, or decreasing the number of hierarchies as the video signal of the inputted image has a smaller movement. The encoding controlling unit can encode the above-mentioned size of each largest coding block, and the upper limit on the number of hierarchies at the time when each largest coding block is hierarchically partitioned into blocks to include the coded data in the sequence level header or the like. As an alternative, the video decoding device can also carry out the same determination process without the size and the upper limit being encoded. In the former case, because while the code amount of the header information increases, the video decoding device does not have to carry out the above-mentioned determination process, the processing load on the video decoding device can be reduced and the video encoding device can also search for their optimal values and send these values to the video decoding device. In the latter case, on the contrary, because the video decoding device carries out the above-mentioned determination process, while the processing load on the video decoding device increases, the code amount of the header information does not increase.

The encoding controlling unit 2 also selects a coding mode corresponding to each of the coding blocks into which the inputted image is hierarchically partitioned from one or more available coding modes (step ST2). More specifically, the encoding controlling unit 2 hierarchically partitions each image region having the largest coding block size into coding blocks each having a coding block size until the number of hierarchies of the partitioning reaches the upper limit on the number of hierarchies which is determined in advance, and determines a coding mode for each of the coding blocks. The coding mode can be one of one or more intra coding modes (generically referred to as "INTRA") and one or more inter coding modes (generically referred to as "INTER"), and the encoding controlling unit 2 selects a coding mode corresponding to each of the coding blocks from among all the coding modes available in the picture currently being processed or a subset of the coding modes.

Each of the coding blocks into which the inputted image is hierarchically partitioned by the block partitioning unit 1, which will be mentioned below, is further partitioned into one or more prediction blocks each of which is a unit on which a prediction process is to be carried out, and the state of the partitioning into the one or more prediction blocks is also included as information in the coding mode information. More specifically, the coding mode information is an index identifying either an intra coding mode or an inter coding mode and what type of partitioning into prediction blocks the coding mode has. Although a detailed explanation of a selection method of selecting a coding mode for use in the encoding controlling unit 2 will be omitted hereafter because the selection method is a known technique, for example, there is a method of carrying out an encoding process on each coding block by using arbitrary available coding modes to examine the coding efficiency, and selecting a coding mode having the highest degree of coding efficiency from among the plurality of available coding modes.

The encoding controlling unit 2 further determines a quantization parameter and an orthogonal transformation block partitioning state, which are used when a difference image is compressed, for each coding block, and also determines a prediction parameter (an intra prediction parameter or an inter prediction parameter) which is used when a prediction process is carried out. When each coding block is further partitioned into prediction blocks on each of which the prediction process is carried out, the encoding controlling unit can select a prediction parameter (an intra prediction parameter or an inter prediction parameter) for each of the prediction blocks. In addition, because when an intra prediction process is carried out on each prediction block in a coding block whose coding mode is an intra coding mode, already-encoded pixels adjacent to the prediction block are used, as will be described in detail, it is necessary to carry out encoding on a per prediction block basis, and therefore selectable transformation block sizes are limited to the size of the prediction block or less.

The encoding controlling unit 2 outputs the prediction difference coding parameters including the quantization parameter and the transformation block size to the transformation/quantization unit 7, the inverse quantization/inverse transformation unit 8, and the variable length encoding unit 13. The encoding controlling unit 2 also outputs the intra prediction parameter to the intra prediction unit 4 as needed. The encoding controlling unit 2 further outputs the inter prediction parameter to the motion-compensated prediction unit 5 as needed.

When receiving the video signal as the inputted image, the slice partitioning unit 14 partitions the inputted image into one or more slices which are part images according to the slice partitioning information determined by the encoding controlling unit 2. Every time when receiving each of the slices from the slice partitioning unit 14, the block partitioning unit 1 partitions the slice into coding blocks each having the largest coding block size determined by the encoding controlling unit 2, and further partitions each of the largest coding blocks, into which the inputted image is partitioned, into coding blocks hierarchically, these coding blocks being determined by the encoding controlling unit 2, and outputs each of the coding blocks.

Figure 5:
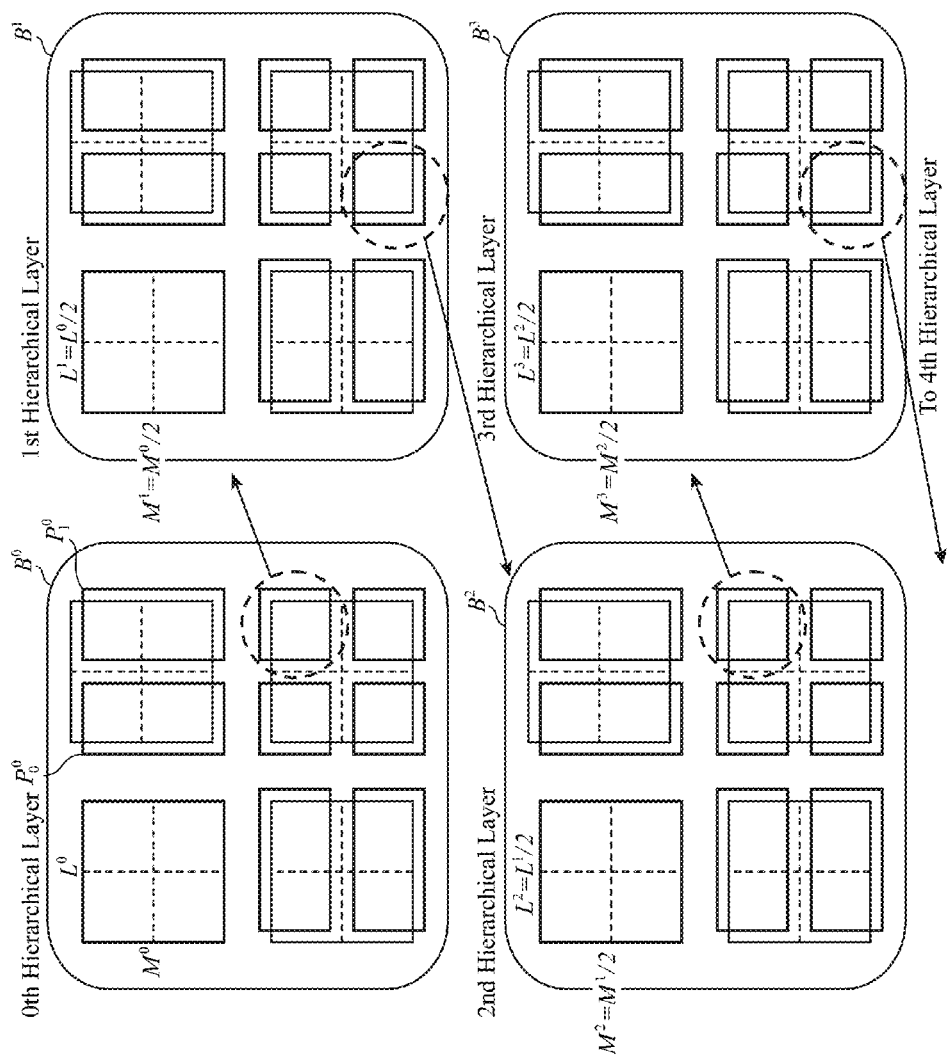
FIG. 5 is an explanatory drawing showing an example in which each largest coding block is partitioned hierarchically into a plurality of coding blocks.

FIG. 5 is an explanatory drawing showing an example in which each largest coding block is hierarchically partitioned into a plurality of coding blocks. Referring to FIG. 5, each largest coding block is a coding block whose luminance component, which is shown by "0-th hierarchical layer", has a size of $(L^0, M^0)$. By carrying out the hierarchical partitioning with each largest coding block being set as a starting point until the depth of the hierarchy reaches a predetermined depth which is set separately according to a quadtree structure, the coding blocks can be acquired. At the depth of n, each coding block is an image region having a size of $(L^n, M^n)$. In this example, although $L^n$ can be the same as or differ from $M^n$, the case of $L^n=M^n$ is shown in FIG. 5.

Hereafter, the coding block size determined by the encoding controlling unit 2 is defined as the size of $(L^n, M^n)$ in the luminance component of each coding block. Because quadtree partitioning is carried out, $(L^{n+1}, M^{n+1})=(L^n/2, M^n/2)$ is always established. In the case of a color video image signal (4:4:4 format) in which all the color components have the same sample number, such as an RGB signal, all the color components have a size of $(L^n, M^n)$, while in the case of handling a 4:2:0 format, a corresponding color difference component has a coding block size of $(L^n/2, M^n/2)$.

Hereafter, each coding block in the nth hierarchical layer is expressed as $B^n$, and a coding mode selectable for each coding block $B^n$ is expressed as $m(B^n)$. In the case of a color video signal which consists of a plurality of color components, the coding mode $m(B^n)$ can be configured in such a way that an individual mode is used for each color component, or can be configured in such a way that a common mode is used for all the color components. Hereafter, an explanation will be made by assuming that the coding mode indicates the one for the luminance component of the coding block having a 4:2:0 format in a YUV signal unless otherwise specified.

Each coding block $B^n$ is partitioned into one or more prediction blocks each showing a prediction unit by the block partitioning unit 1, as shown in FIG. 5. Hereafter, each prediction block belonging to each coding block $B^n$ is expressed as $P_i^n$ (i shows a prediction block number in the nth hierarchical layer). An example of P00 and P10 is shown in FIG. 5. How the partitioning of each coding block $B^n$ into prediction blocks is carried out is included as information in the coding mode $m(B^n)$. While a prediction process is carried out on each of all the prediction blocks $P_i^n$ according to the coding mode $m(B^n)$, an individual prediction parameter (an intra prediction parameter or an inter prediction parameter) can be selected for each prediction block $P_i^n$.

Figure 6:
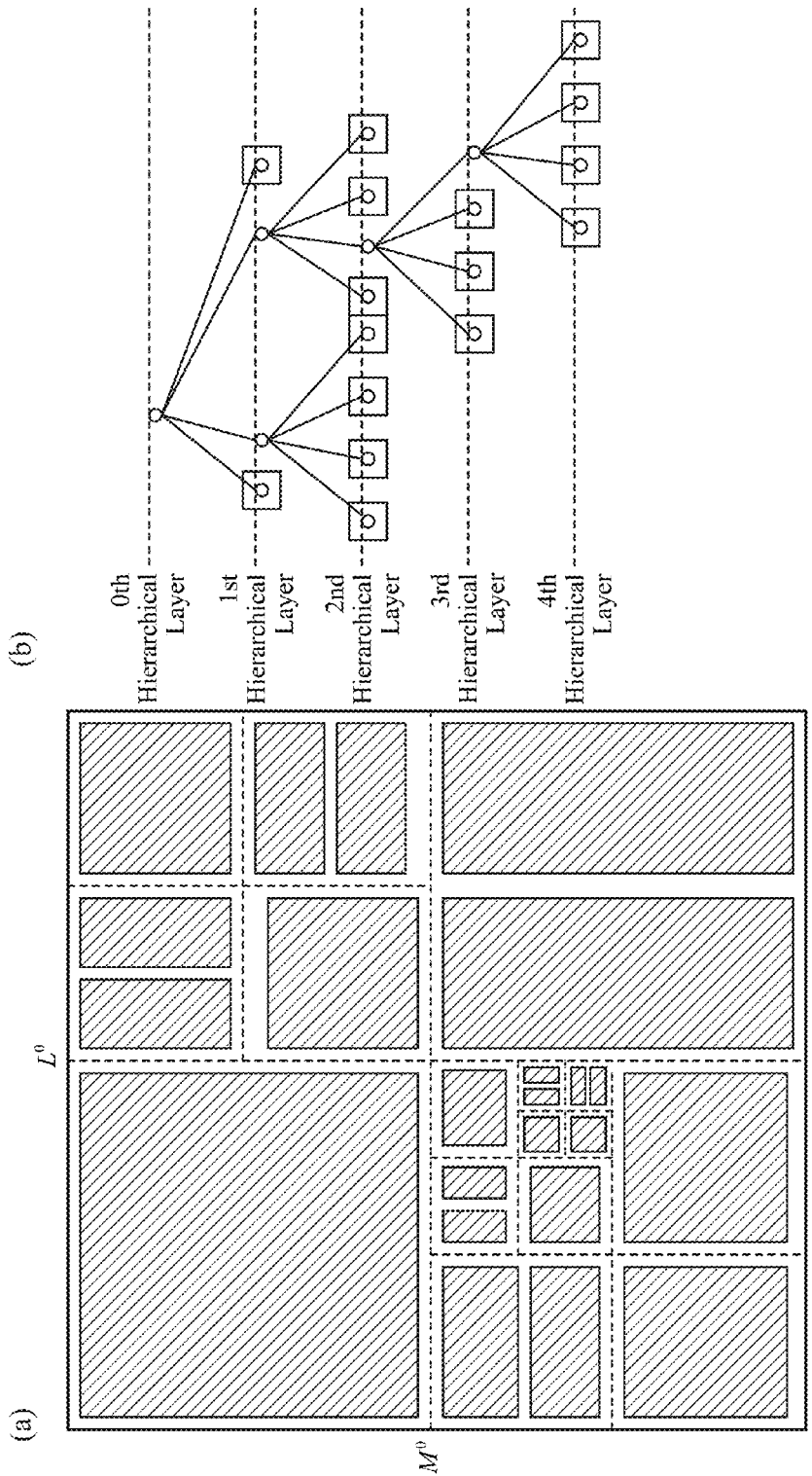
FIG. 6($a$) is an explanatory drawing showing a distribution of coding blocks and prediction blocks after the partitioning, and FIG. 6($b$) is an explanatory drawing showing a state in which a coding mode m(B") is assigned to each of the blocks through the hierarchical partitioning.

The encoding controlling unit 2 generates such a block partitioning state as shown in, for example, FIG. 6 for each largest coding block, and then specifies coding blocks. Each rectangle enclosed by a dotted line of FIG. 6(a) shows a coding block, and each block filled with hatch lines in each coding block shows the partitioning state of each prediction block. FIG. 6 (b) shows a situation where a coding mode $m(B^n)$ is assigned to each node through the hierarchical partitioning in the example of FIG. 6(a) is shown by using a quadtree graph. Each node enclosed by □ shown in FIG. 6(b) is a node (coding block) to which a coding mode $m(B^n)$ is assigned. Information about this quadtree graph is outputted from the encoding controlling unit 2 to the variable length encoding unit 13 together with the coding mode $m(B^n)$, and is multiplexed into a bitstream.

When the coding mode $m(B^n)$ determined by the encoding controlling unit 2 is an intra coding mode (in the case of $m(B^n) \in \text{INTRA}$), the select switch 3 outputs the coding block $B^n$ outputted from the block partitioning unit 1 to the intra prediction unit 4. In contrast, when the coding mode $m(B^n)$ determined by the encoding controlling unit 2 is an inter coding mode (in the case of $m(B^n) \in \text{INTER}$), the select switch outputs the coding block $B^n$ outputted from the block partitioning unit 1 to the motion-compensated prediction unit 5.

When the coding mode $m(B^n)$ determined by the encoding controlling unit 2 is an intra coding mode (in the case of $m(B^n) \in \text{INTRA}$), and the intra prediction unit 4 receives the coding block $B^n$ from the select switch 3 (step ST3), the intra prediction unit 4 carries out the intra prediction process on each prediction block $P_i^n$ in the coding block $B^n$ by using the intra prediction parameter determined by the encoding controlling unit 2 while referring to the local decoded image stored in the memory 10 for intra prediction so as to generate an intra prediction image $P_{INTRAi}^n$ (step ST4). Because the video decoding device needs to generate an intra prediction image which is completely the same as the intra prediction image $P_{INTRAi}^n$, the intra prediction parameter used for the generation of the intra prediction image $P_{INTRAi}^n$ is outputted from the encoding controlling unit 2 to the variable length encoding unit 13 and is multiplexed into the bitstream. The details of the processing carried out by the intra prediction unit 4 will be mentioned below.

When the coding mode $m(B^n)$ determined by the encoding controlling unit 2 is an inter coding mode (in the case of $m(B^n) \in \text{INTER}$), and the motion-compensated prediction unit 5 receives the coding block $B^n$ from the select switch 3 (step ST3), the motion-compensated prediction unit 5 compares each prediction block $P_i^n$ in the coding block $B^n$ with the local decoded image which is stored in the motion-compensated prediction frame memory 12 and on which the filtering process is performed to search for a motion vector, and carries out the inter prediction process on each prediction block $P_i^n$ in the coding block $B^n$ by using both the motion vector and the inter prediction parameter determined by the encoding controlling unit 2 so as to generate an inter prediction image $P_{INTERi}^n$ (step ST5). Because the video decoding device needs to generate an inter prediction image which is completely the same as the inter prediction image $P_{INTERi}^n$, the inter prediction parameter used for the generation of the inter prediction image $P_{INTERi}^n$ is outputted from the encoding controlling unit 2 to the variable length encoding unit 13 and is multiplexed into the bitstream. The motion vector which is searched for by the motion-compensated prediction unit 5 is also outputted to the variable length encoding unit 13 and is multiplexed into the bitstream.

When receiving the coding block $B^n$ from the block partitioning unit 1, the subtracting unit 6 subtracts the intra prediction image $P_{INTRAi}^n$ generated by the intra prediction unit or the inter prediction image $P_{INTERi}^n$ generated by the motion-compensated prediction unit 5 from the prediction block $P_i^n$ in the coding block $B^n$, and outputs a prediction difference signal $e_i^n$ showing a difference image which is the result of the subtraction to the transformation/quantization unit 7 (step ST6).

When receiving the prediction difference signal $e_i^n$ from the subtracting unit 6, the transformation/quantization unit 7 refers to the orthogonal transformation block partitioning information included in the prediction difference coding parameters determined by the encoding controlling unit 2, and carries out an orthogonal transformation process (e.g., a DCT (discrete cosine transform), a DST (discrete sine transform), or an orthogonal transformation process, such as a KL transform, in which bases are designed for a specific learning sequence in advance) on each orthogonal transformation block of the prediction difference signal $e_i^n$ so as to calculates transform coefficients. The transformation/quantization unit 7 also refers to the quantization parameter included in the prediction difference coding parameters to quantize the transform coefficients of each orthogonal transformation block, and outputs compressed data which are the transform coefficients quantized thereby to the inverse quantization/inverse transformation unit 8 and the variable length encoding unit 13 (step ST7). At this time, the transformation/quantization unit can carry out the quantization process by using a quantization matrix for carrying out scaling on the quantization step size calculated from the above-mentioned quantization parameter for each transform coefficient.

As the quantization matrix, a matrix which is independent for each of the chrominance signals and for each coding mode (intra encoding or inter encoding) at each orthogonal transformation size can be used, and whether or not to select, as an initial value of the quantization matrix, one quantization matrix from a quantization matrix which is prepared in advance and in common between the video encoding device and the video decoding device and an already-encoded quantization matrix, or whether or not to use, as an initial value of the quantization matrix, a new quantization matrix can be selected. Therefore, the transformation/quantization unit 7 sets, as the quantization matrix parameter to be encoded, flag information showing whether or not to use a new quantization matrix for each chrominance signal and for each coding mode at each orthogonal transformation size. In addition, when a new quantization matrix is used, each of the scaling values in a quantization matrix as shown in FIG. 10 is set as a quantization matrix parameter to be encoded. In contrast, when no new quantization matrix is used, an index specifying a matrix to be used, as an initial value, from the quantization matrix prepared in advance and in common between the video encoding device and the video decoding device and the already-encoded quantizing matrix is set as a quantization matrix parameter to be encoded. However, when no already-encoded quantization matrix which can be referred to exists, only the quantization matrix prepared in advance and in common between the video encoding device and the video decoding device can be selected. The transformation/quantization unit 7 then outputs the set quantization matrix parameters to the variable length encoding unit 13 as a part of an adaptation parameter set.

When receiving the compressed data from the transformation/quantization unit 7, the inverse quantization/inverse transformation unit 8 refers to the quantization parameter and the orthogonal transformation block partitioning information which are included in the prediction difference coding parameters determined by the encoding controlling unit 2 so as to inverse-quantize the compressed data about each orthogonal transformation block. When the transformation/quantization unit 7 uses a quantization matrix for the quantization process, the inverse quantization/inverse transformation unit carries out a corresponding inverse quantization process by referring to the quantization matrix also at the time of the inverse quantization process. The inverse quantization/inverse transformation unit 8 also carries out an inverse orthogonal transformation process (e.g., an inverse DCT, an inverse DST, an inverse KL transform, or the like) on the transform coefficients which are the compressed data inverse-quantized for each orthogonal transformation block, and calculates a local decoded prediction difference signal corresponding to the prediction difference signal $e_i''$ outputted from the subtracting unit 6 and outputs the local decoded prediction difference signal to the adding unit 9 (step ST8).

When receiving the local decoded prediction difference signal from the inverse quantization/inverse transformation unit 8, the adding unit 9 calculates a local decoded image by adding the local decoded prediction difference signal and either the intra prediction image $P_{INTRAi}''$ generated by the intra prediction unit 4 or the inter prediction image $P_{INTERi}''$ generated by the motion-compensated prediction unit 5 (step ST9). The adding unit 9 outputs the local decoded image to the loop filter unit 11 while storing the local decoded image in the memory 10 for intra prediction. This local decoded image is an encoded image signal which is used at the time of subsequent intra prediction processes.

When receiving the local decoded image from the adding unit 9, the loop filter unit 11 carries out the predetermined filtering process on the local decoded image, and stores the local decoded image filtering-processed thereby in the motion-compensated prediction frame memory 12 (step ST10). Concretely, the loop filter unit carries out a filtering (deblocking filtering) process of reducing a distortion occurring at a boundary between orthogonal transformation blocks and a distortion occurring at a boundary between prediction blocks, a process (pixel adaptive offset process) of adaptively adding an offset to each pixel, an adaptive filtering process of adaptively switching among linear filters, such as Wiener filters, and performing the filtering process, and so on.

The loop filter unit 11 determines whether or not to carry out the process for each of the above-mentioned filtering processes including the deblocking filtering process, the pixel adaptive offset process, and the adaptive filtering process, and outputs the enable flag of each of the processes, as a part of the adaptation parameter set to be encoded and a part of the slice level header, to the variable length encoding unit 13. When using two or more of the above-mentioned filtering processes, the loop filter unit carries out the filtering processes in order. FIG. 11 shows an example of the structure of the loop filter unit 11 in the case of using a plurality of filtering processes. In general, while the image quality is improved with increase in the number of types of filtering processes used, the processing load is increased with increase in the number of types of filtering processes used. More specifically, there is a trade-off between the image quality and the processing load. Further, an improvement effect of the image quality which is produced by each of the filtering processes differs depending upon the characteristics of the image which is the target for the filtering process. Therefore, what is necessary is just to determine a filtering process to be used according to the processing load acceptable in the video encoding device and the characteristics of the image which is the target for the filtering process.

In the deblocking filtering process, various parameters used for the selection of the intensity of a filter to be applied to a block boundary can be changed from their initial values. When changing a parameter, the parameter is outputted to the variable length encoding unit 13 as a part of the adaptation parameter set to be encoded.

In the pixel adaptive offset process, the image is partitioned into a plurality of blocks first, a case of not carrying out the offset process is defined as one class classifying method for each of the coding blocks, and one class classifying method is selected from among a plurality of class classifying methods which are prepared in advance. Next, by using the selected class classifying method, each pixel included in the block is classified into one of classes, and an offset value for compensating for a coding distortion is calculated for each of the classes. Finally, a process of adding the offset value to the brightness value of the local decoded image is carried out, thereby improving the image quality of the local decoded image.

As the method of carrying out the class classification, there are a method (referred to as a BO method) of classifying each pixel into one of classes according to the brightness value of the local decoded image, and a method (referred to as an EO method) of classifying each pixel into one of classes according to the state of a neighboring region around the pixel (e.g., whether or not the neighboring region is an edge portion) for each of the directions of edges. These methods are prepared in common between the video encoding device and the video decoding device. As shown in FIG. 16, the case of not carrying out the offset process is defined as one class classifying method, and an index showing which one of these methods is to be used to carry out the class classification is selected for each of the above-mentioned blocks.

Figure 13:
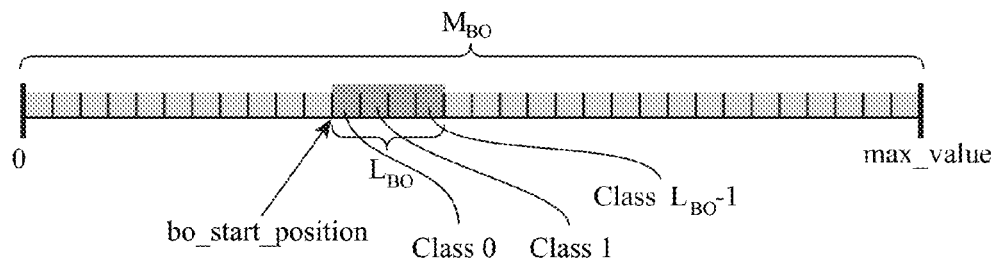
FIG. 13 is an explanatory drawing showing a BO method which is one class classifying method in the case of carrying out a pixel adaptive offset process.

FIG. 13 is an explanatory drawing showing the BO method. In accordance with the BO method, the range of brightness values which the local decoded image can have is divided into $M_{BO}$ equal groups first. $M_{BO}$ is a constant which is an integral submultiple of ((the largest one of the brightness values)−(the smallest one of the brightness values)+1), and $M_{BO}$=32 in the example shown in FIG. 13. Next, each pixel in the block is classified into a corresponding one of the $M_{BO}$ groups according to the brightness value of the pixel in question. In order to then determine the class which is the group to which the offset is to be added, bo_start_position showing the start position of the classes is determined. As shown in FIG. 13, the classes are determined as class 0, class 1, class 2, . . . , and class $L_{BO}$−1 starting from the group shown by bo_start_position. However, $L_{BO}$ is a constant showing the number of classes, and $L_{BO}$=4 in the example shown in FIG. 13.

bo_start_position is a part of the adaptation parameter set which is to be encoded, and is determined together with the offset value which is to be added to each pixel belonging to each class in such a way that the image quality improvement effect is enhanced to maximum. While the larger constant $M_{BO}$, the further-enhanced image quality improvement effect is provided because the offset can be set for each finer unit, the code amount required to encode bo_start_position increases because the range of values which bo_start_position can have becomes large. While the larger constant $L_{BO}$, the further-enhanced image quality improvement effect is provided because the number of offsets increases, the code amount required to code the offsets increases. Therefore, the values of the constants $M_{BO}$ and $L_{BO}$ are preset to appropriate values in common between the video encoding device and the video decoding device in consideration of a trade-off between the image quality improvement effect and the code amount. As an alternative, the values of the constants $M_{BO}$ and $L_{BO}$ can be set as apart of the adaptation parameter set which is to be encoded, instead of being prepared in advance and in common between the video encoding device and the video decoding device. In this case, while the image quality improvement effect is enhanced because the constants $M_{BO}$ and $L_{BO}$ can be set up adaptively, the code amount increases because the information to be encoded increases.

Figure 14:
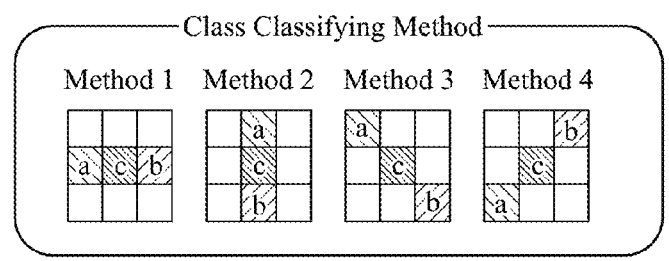
FIG. 14 is an explanatory drawing showing an EO method which is one class classifying method in the case of carrying out the pixel adaptive offset process.

Next, FIG. 14 is an explanatory drawing showing the EO method. In FIG. 14, c shows a pixel which is the target for offset process, and a and b show pixels adjacent to the pixel c. As shown in FIG. 14, four types of class classifying methods are provided according to directions in each of which the pixels a, b, and c are aligned in a line. The methods in the order of starting from the one 1 correspond to EO methods 1 to 4 shown in FIG. 16 respectively. Each of the classification methods classifies each pixel in the block into one of five types of classes according to class classification criteria shown in FIG. 14 to determine the offset value which is to be added to the pixel belonging to the class.

The offset value which is to be added to each pixel belonging to each class is determined, as illustrated in FIG. 17, by preparing a table in which the offset value calculated for each class is prepared in advance and in common between the video encoding device and the video decoding device, and selecting an index indicating a combination of offset values to be used as offset information. By doing this way, although the range of values which each offset can have is limited, a high-accuracy distortion compensation process can be implemented while the code amount required to encode the offset information can be reduced as compared with the case of encoding the offset value just as it is by appropriately setting up the combination of offset values for each class which is prepared in the above-mentioned table. By using, as a method of encoding the above-mentioned index which the variable length encoding unit 13 uses, a binarization method taking into consideration the range of values of a symbol to be encoded, such as a truncated unary code shown in FIG. 25, because the range of values which the index can have can be seen from the table prepared in advance, encoding having a high degree of efficiency can be carried out. FIG. 25 is an example in a case in which the range of values which the symbol to be encoded has is set to the one from 0 to 5.

At this time, the table which is prepared in advance can be common among all the class classifying methods, or can be different according to the class classifying methods. For example, because the processes completely differ between the BO method and the EO method, an adaptive image quality improvement can be implemented by separately preparing different tables for the BO and EO methods. In addition, because the distances among the pixels a, b, and c differ between the EO methods 1 and 2 and the EO methods 3 and 4 in the case of using the EO method, an adaptive image quality improvement can be implemented by separately preparing a table for the EO methods 1 and 2 and a table for the EO methods 3 and 4. However, the amount of memory required to hold the tables increases with increase in the number of tables prepared. Therefore, the number of tables which can be prepared is limited by the amount of memory which can be prepared in the video encoding device and the amount of memory which can be prepared in the video decoding device.

Further, although a high-accuracy image quality improvement can be implemented by increasing the number of indexes which each table has (the number of combinations of offsets for each class), the code amount required to encode the indexes increases with increase in the number of indexes selectable in the table. Therefore, the number of indexes is set up in advance and in common between the video encoding device and the video decoding device in consideration of the trade-off between the image quality improvement effect and the code amount. The table prepared in advance can be prepared for each chrominance signal. By doing in this way, an appropriate table can prepared for each of the chrominance signals having different signal characteristics, and the image quality improvement effect can be enhanced.

In addition, instead of making a table reference to all the offsets, for example, a table reference can be made to offsets according to only the EO method in the above-mentioned way, while the values themselves of offsets according to the BO method can be encoded. In general, according to the EO method, there is provided an effect of removing a slight noise in an edge portion, and an optimal offset value is easily biased toward a small value. On the other hand, according to the BO method, there is provided an effect of correcting a DC component of a signal falling within a certain brightness range, and an optimal offset value is not necessarily biased toward a small value. Therefore, a table reference is made only for a class classifying method in which an optimal offset value is biased, while an offset value itself is encoded for a class classifying method in which an optimal offset value is not biased, so that a greater image quality improvement effect is acquired. According to an encoding method of encoding the above-mentioned offset value which the variable length encoding unit 13 uses, by setting up the range of values which the offset can have in advance and in common between the video encoding device and the video decoding device, high-efficiency encoding can be carried out by using a binarization method which takes into consideration the range of values which a symbol to be encoded, such as a truncated unary code shown in FIG. 25, has. In contrast, when the range of values which the offset can have is not set up in advance, a code which can be binarized without taking into consideration the range of values of a symbol to be encoded, such as a unary code shown in FIG. 26, is used.

Figure 20:
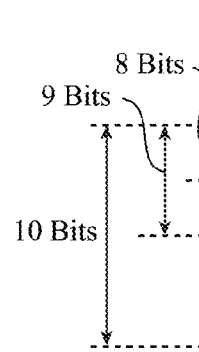
FIG. 20 is an explanatory drawing showing an example of changing the number of combinations of offsets in a single table showing combinations of offset values respectively determined for classes of the pixel adaptive offset process according to the bit depth.
Figure 21:
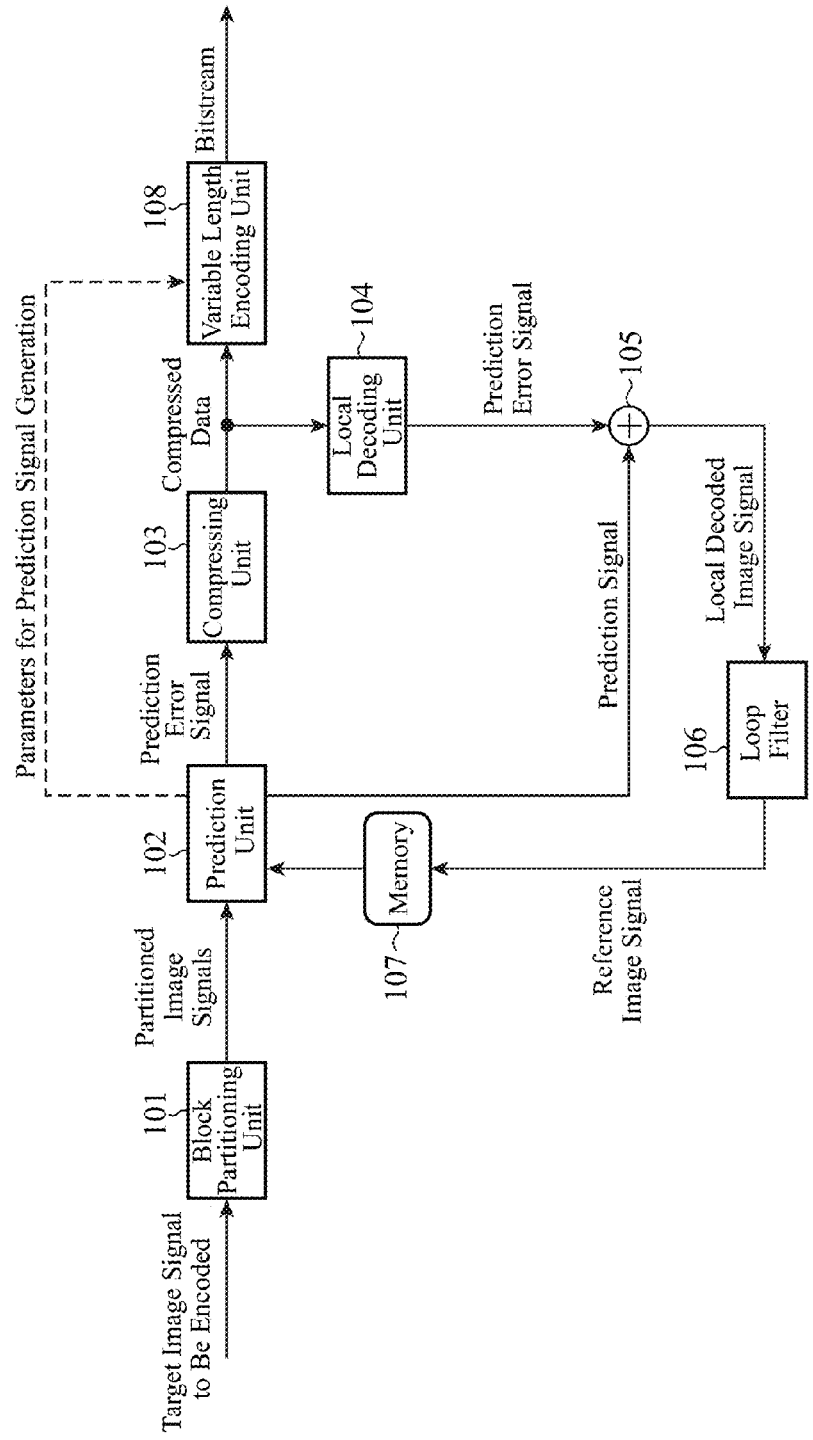
FIG. 21 is a block diagram showing a video encoding device disclosed in nonpatent reference 1.

Further, switching between tables can be carried out by using the bit depth of the signal value of the luminance signal or each color difference signal at the time of carrying out the encoding process. An offset value in the case of 9 bits corresponding to an offset value of 1 in the case of 8 bits is 2. However, there is a possibility that even when an optimal offset value in the case of 8 bits is 1, the optimal offset value in the case of 9 bits is not 2, but 1 or another value. Therefore, the image quality improvement effect can be enhanced by preparing a table for each bit depth of the signal value as shown in FIG. 19. In addition, as illustrated in FIG. 20, by using only a single table, and providing, as a choice, only an index of 0 (0 bits) in the case of 8 bits, providing, as a choice, indexes of 0 and 1 (1 bit) in the case of 9 bits, and providing, as a choice, indexes of 0 to 4 (2 bits) in the case of 10 bits, the number of tables prepared can be reduced and the amount of memory for holding the tables can be reduced. In the examples shown in FIGS. 19 and 20, because only the index of 0 is provided in the case of 8 bits, it is not necessary to encode the index. By doing in this way, the coding efficiency can be improved by a degree corresponding to the code amount required to encode the indexes.

In the pixel adaptive offset process, an optimal class classifying method and an optimal offset value are selected from the above-mentioned plurality of class classifying methods and from the combination of optimal offset values, so that an optimal distortion compensation process can be implemented.

As a result, in the pixel adaptive offset process, the block partitioning information, the index indicating the class classifying method for each block, and the offset information about each block are outputted to the variable length encoding unit 13 as a part of the adaptation parameter set to be encoded. In addition, in the pixel adaptive offset process, when the index indicating the class classifying method for each of the blocks shows the BO method, bo_start_position showing the start position of the classes is also outputted to the variable length encoding unit 13 as a part of the adaptation parameter set to be encoded. In the above-mentioned pixel adaptive offset process, for example, the image can be always partitioned into blocks each having a fixed size, such as largest coding blocks, and a class classifying method can be selected for each of the blocks and the adaptive offset process for each class can be carried out. In this case, the above-mentioned block partitioning information becomes unnecessary, and the code amount can be reduced by the code amount required for the block partitioning information.

Further, in the adaptive filtering process, a class classification is carried out on the local decoded image by using a predetermined method, a filter for compensating for a distortion piggybacked on the image is designed for each region (local decoded image) belonging to each class, and the filtering process of filtering this local decoded image is carried out by using the filter. The filter designed for each class is then outputted to the variable length encoding unit 13 as a part of the adaptation parameter set to be encoded. As the class classifying method, there are a simple method of partitioning the image into equal parts spatially and a method of performing a classification on a per block basis according to the local characteristics (a variance and so on) of the image. Further, the number of classes used in the adaptive filtering process can be preset as a value common between the video encoding device and the video decoding device, or can be preset as a part of the adaptation parameter set to be encoded. The improvement effect of the image quality in the latter case is enhanced because the number of classes used in the latter case can be set freely as compared with that in the former case, while the code amount is increased by that required for the number of classes because the number of classes is encoded.

In addition, the class classification for the adaptive filtering process, and the filter design and the filtering process can be carried out on, instead of the entire image, each block having a fixed size, e.g., each largest coding block. More specifically, the class classification can be carried out on each set of plural small blocks, into which each block having a fixed size is partitioned, according to the local characteristics (a variance and so on) of the image and filter design and the filtering process can be carried out for each class, the filter of each class can be encoded, as a part of the adaptation parameter set, for each block having a fixed size. By doing this way, a high-accuracy filtering process according to the local characteristics can be implemented as compared with the case of carrying out the class classification, the filter design, and the filtering process on the entire image.

The video encoding device repeatedly carries out the processes of steps ST3 to ST9 until the video encoding device completes the processing on all the coding blocks B$^n$ into which the inputted image is partitioned hierarchically, and, when completing the processing on all the coding blocks B$^n$, shifts to a process of step ST13 (steps ST11 and ST12).

The variable length encoding unit 13 entropy-encodes the compressed data outputted thereto from the transformation/quantization unit 7, the block partitioning information about the partitioning of each largest coding block into blocks, which is outputted from the encoding controlling unit 2 (the quadtree information which is shown in FIG. 6(*b*) as an example), the coding mode m(B$^n$) and the prediction difference coding parameters, the intra prediction parameter (when the coding mode is an intra coding mode) or the inter prediction parameter (when the coding mode is an inter coding mode) outputted from the encoding controlling unit 2, and the motion vector outputted from the motion-compensated prediction unit 5 (when the coding mode is an inter coding mode), and generates coded data showing those encoded results (step ST13).

The variable length encoding unit 13 also encodes, as the header information of a coded bitstream, the sequence level header, the picture level headers, and the adaptation parameter sets so as to generate a coded bitstream together with picture data, as illustrated in FIG. 15. Each picture data consists of one or more slice data, and each slice data is a combination of a slice level header and coded data as mentioned above in the corresponding slice.

The sequence level header is a combination of pieces of header information which are typically common on a per sequence basis, the pieces of header information including the image size, the chrominance signal format, the bit depths of the signal values of the luminance signal and the color difference signals, and the enable flag information about each of the filtering processes (the adaptive filtering process, the pixel adaptive offset process, and the deblocking filtering process) which are carried out on a per sequence basis by the loop filter unit 11. Each picture level header is a combination of pieces of header information which are set on a per picture basis, the pieces of header information including an index indicating a sequence level header to be referred to, the number of reference pictures at the time of motion compensation, and a probability table initialization flag for entropy encoding. Each slice level header is a combination of parameters which are set on a per slice basis, the parameters including position information showing at which position of the picture the corresponding slice exists, an index indicating which picture level header is to be referred to, the coding type of the slice (all intra coding, inter coding, or the like), an index indicating the adaptation parameter set which is used by the corresponding slice, and the flag information showing whether or not to carry out each of the filtering processes (the adaptive filtering process, the pixel adaptive offset process, and the deblocking filtering process) in the loop filter unit 11 using the adaptation parameter set indicated by the above-mentioned index.

Each adaptation parameter set has parameters (filter parameters) associated with the adaptive filtering process, the pixel adaptive offset process, and the deblocking filtering process and a parameter (quantization matrix parameter) associated with the quantization matrix, and also has an index (aps_id) which makes it possible for each of a plurality of adaptation parameter sets which are multiplexed into the coded bitstream to be identified from others. Each adaptation parameter set also has flags (present_flag) showing whether filter parameters respectively associated with the adaptive filtering process, the pixel adaptive offset process, and the deblocking filtering process and the quantization matrix parameter exist, respectively, and, when each present flag shows "enable", has the parameter corresponding to this present flag. Therefore, whether or not each parameter exists can be set up freely in each adaptation parameter set. Each slice has at least one index (aps_id) in its slice level header, the index indicating an adaptation parameter set which is to be referred to at the time of carrying out the decoding process on the slice. The quantization process and the inverse quantization process, and the loop filtering process are carried out on each slice by referring to the corresponding adaptation parameter set.

Further, when encoding an adaptation parameter set and multiplexing this encoded adaptation parameter set into the coded bitstream, if an adaptation parameter set having the same index (aps_id) already exists in the coded bitstream, this adaptation parameter set having the index is replaced by the above-mentioned adaptation parameter set which is the target to be encoded. Therefore, if an already-encoded adaptation parameter set is unnecessary when encoding a new adaptation parameter set, by encoding the index indicating the unnecessary adaptation parameter set, overwriting and updating of the adaptation parameter set can be carried out. Because it is not necessary to increase the number of adaptation parameter sets which must be stored, the amount of memory used can be reduced.

In addition, when encoding a new sequence level header (sequence level header 2) at the time of a sequence change, as shown in FIG. 18, the variable length encoding unit 13 disables all the adaptation parameter sets which have been encoded before this sequence level header is encoded. Therefore, in the example shown in FIG. 18, a reference to any adaptation parameter set over a sequence level header, such as a reference to an adaptation parameter set 2 for encoding of picture data 30, is prohibited. More specifically, when a parameter in an adaptation parameter set is used for a picture to be processed after a new sequence level header (sequence level header 2) is encoded, it is necessary to encode the parameter as a new adaptation parameter set. Therefore, an adaptation parameter set which is encoded newly when a past adaptation parameter set cannot be used at all because the disabling process of disabling the above-mentioned adaptation parameter set or the like is carried out is the one in which a parameter, such as a quantization matrix, does not refer to the past adaptation parameter set, and all the parameters can be decoded by using only the adaptation parameter set in question. By initializing an adaptation parameter set by using a sequence level header at the time of a sequence change this way, when an error occurs in the coded bitstream before a new sequence level header is decoded, the video decoding device can avoid a decoding error caused by a reference to an adaptation parameter set in the stream and therefore can improve the error resistance.

As an alternative, a sequence level header can be constructed in such a way as to have an initialization flag aps_reset_flag for an adaptation parameter set, thereby improving the error resistance. Concretely, only when the initialization flag aps_reset_flag is set to "enable", the adaptation parameter set is initialized, whereas when the initialization flag aps_reset_flag is set to "disable", the adaptation parameter set is not initialized. By providing an initialization flag for an adaptation parameter set as one of the parameters of a sequence level header this way, an adaptive initializing process can be carried out, and by carrying out the initialization only when it is necessary to improve the error resistance, reduction in the coding efficiency due to the initialization of an adaptation parameter set can be prevented.

In addition, when random access according to an IDR picture or a CRA picture is carried out, in order to implement a speedup of the decoding process and provide an improvement in the error resistance, a flag previous_aps_clear_flag for disabling already-encoded adaptation parameter sets is provided as a part of the parameters of each adaptation parameter set. When a flag previous_aps_clear_flag is set to "enable", the variable length encoding unit 13 disables the adaptation parameter sets encoded before the adaptation parameter set, whereas when a flag previous_aps_clear_flag is set to "disable", the variable length encoding unit 13 does not carry out the above-mentioned disabling process.

FIG. 24 shows an example of the coded bitstream showing the disabling process of disabling some adaptation parameter sets. It is assumed that for picture data 31 shown in FIG. 24, an encoding (decoding) process is carried out by referring to a sequence level header 2, a picture level header 3, and an adaptation parameter set 21. In general, a unit for picture access which is a combination of picture data and the header information associated with the picture data, which is formed in the above-mentioned way, is referred to as an access unit. The adaptation parameter sets 1 to 20, which are included in the adaptation parameter sets shown in FIG. 24, are disabled by setting the flag previous_aps_clear_flag of only the adaptation parameter set 21 to "enable", a reference to any of the adaptation parameter sets 1 to 20 cannot be made for pictures to be encoded in order after the IDR picture or the CRA picture. Therefore, when carrying out random access according to the IDR picture or the CRA picture, what is necessary is just to carry out decoding from the sequence level header 2 shown in FIG. 24. On the other hand, when a high-speed decoding process at the time of random access and a high degree of error resistance are not required, what is necessary is just to always set the flag previous_aps_clear_flag to "disable" so as not to disable the adaptation parameter sets. Therefore, an adaptive process of disabling adaptation parameter sets by using a flag previous_aps_clear_flag can be implemented.

In the above-mentioned example, an adaptive process of disabling adaptation parameter sets for random access is implemented by using the flag previous_aps_clear_flag in an adaptation parameter set. As an alternative, an adaptive process of disabling adaptation parameter sets for random access can be implemented by providing a flag part_aps_clear_flag for disabling some adaptation parameter sets when encoding (decoding) an IDR picture or a CRA picture in a sequence level header or a NAL unit. Concretely, if a flag part_aps_clear_flag is set to "enable" when encoding an IDR picture or a CRA picture, the variable length encoding unit 13 implements an adaptive disabling process of disabling adaptation parameter sets for random access, which is the same as that in the case of using a flag previous_aps_clear_flag, by disabling the adaptation parameter sets preceding the picture data about the picture immediately preceding the IDR picture or the CRA picture. More specifically, in the example shown in FIG. 24, by setting the flag part_aps_clear_flag in the sequence level header 2 or the NAL unit of the picture data 31 to "enable", the adaptation parameter sets preceding the picture data 30 which is the one immediately preceding the picture data 31 are disabled when encoding the picture data 31. Therefore, for pictures to be encoded in order after the IDR picture or the CRA picture, a reference to any one of the adaptation parameter sets 1 to 20 cannot be made. More specifically, the adaptation parameter sets preceding the access unit including the picture data about the IDR picture or the CRA picture are disabled, and no reference can be made. Therefore, when carrying out random access according to the IDR picture or the CRA picture, what is necessary is just to carry out decoding from the sequence level header 2 shown in FIG. 24.

In the above-mentioned explanation, the disabling process of disabling adaptation parameter sets is carried out when a flag part_aps_clear_flag is set to "enable." As an alternative, instead of disposing a flag as mentioned above, the disabling process of disabling adaptation parameter sets can be always carried out when encoding an IDR picture or a CRA picture. By doing this way, the code amount is reduced by the code amount required to encode a flag as mentioned above. Further, the process of referring to a flag as mentioned above when performing the encoding process becomes unnecessary, and the video encoding device is simplified.

In addition, as another method of implementing the disabling process of disabling adaptation parameter sets according to an IDR picture or a CRA picture, there can be provided a method of constructing a video encoding device that provides a parameter aps_group_id in each adaptation parameter set. In the above-mentioned video encoding device, as shown in FIG. 27, the above-mentioned parameter is disposed in each adaptation parameter set, and, when encoding an IDR picture or a CRA picture, the variable length encoding unit 13 disables an adaptation parameter set having aps_group_id whose value differs from that of aps_group_id which another adaptation parameter set has, the other adaptation parameter set being referred to by the IDR picture or the CRA picture. For example, in the case shown in FIG. 24, by setting the parameters aps_group_id of the adaptation parameter sets 1 to 20 to zero, and also setting the parameters aps_group_id of the adaptation parameter set 21 and subsequent adaptation parameter sets to one, the variable length encoding unit disables the adaptation parameter sets 1 to 20 whose parameters aps_group_id (=0) differ from the parameter aps_group_id (=1) of the adaptation parameter set 21 when the adaptation parameter set 21 is referred to by the picture data 31 about the IDR picture or the CRA picture. Therefore, the adaptation parameter sets 1 to 20 are not referred to by the picture data 31 and subsequent picture data.

By thus carrying out the encoding in such a way as to change the value of the parameter aps_group_id of an adaptation parameter set according to an IDR picture or a CRA picture, the reference to adaptation parameter sets is limited, and the video decoding device is enabled to correctly decode a predetermined picture and subsequent pictures when starting the decoding from an access unit including the picture data about the IDR picture or the CRA picture. Aps_group_id can be alternatively a flag having only a value of 0 or 1. In this case, a similar disabling process of disabling adaptation parameter sets can be implemented by switching the value of the above-mentioned flag which an adaptation parameter set has according to an IDR picture or a CRA picture from 0 to 1 or from 1 to 0.

By using a method of introducing aps_group_id as mentioned above, the decoding can be carried out correctly even when the order of data in the coded bitstream which is received by the video decoding device has changed from the order of the data encoded by the video encoding device from the reason for transmitting the coded bitstream while distributing the coded bitstream among a plurality of lines, or the like. Concretely, even in a case in which the coded bitstream in which the data are encoded in the order of FIG. 24 has been changed to the one in which the adaptation parameter sets 21 and 22 are to be decoded before the picture data 30 when reaching the video decoding device, as shown in FIG. 28, the adaptation parameter sets 1 to 20 whose parameters aps_group_id (=0) differ from that of the adaptation parameter set 21 can be disabled appropriately when the adaptation parameter set 21 is referred to by the picture data 31 about the IDR picture or the CRA picture. In accordance with the method of introducing aps_group_id as mentioned above, when a higher priority is given to the coding efficiency than to the error resistance, the reduction in the coding efficiency due to restrictions imposed on adaptation parameter sets which can be referred to can be prevented because adaptation parameter sets do not need to be disabled by carrying out the encoding in such a way that the values of the parameters aps_group_id of the adaptation parameter sets are not changed according to an IDR picture or a CRA picture. Further, the video encoding device that has a parameter aps_group_id in each adaptation parameter set can be constructed in such a way as to disable an adaptation parameter set whose parameter aps_group_id has a value different from that of a parameter aps_group_id which is to be referred to also when a picture other than IDR pictures and CRA pictures is decoded. By doing this way, the video encoding device can carry out an adaptive disabling process of disabling adaptation parameter sets by arbitrarily setting the timing with which to change the parameter aps_group_id of an adaptation parameter set, and can implement an adaptive process having error resistance.

In addition, the video encoding device can be constructed in such a way that when encoding an IDR picture or a CRA picture, the variable length encoding unit 13 disables the adaptation parameter sets having indexes smaller than the index (aps_id) of an adaptation parameter which is to be referred to by the IDR picture or the CRA picture, as another method of implementing the disabling process of disabling adaptation parameter sets according to an IDR picture or a CRA picture. More specifically, in a case in which indexes are assigned to adaptation parameter sets in the order in which these adaptation parameter sets are encoded in the examples of FIGS. 24 and 28, when the adaptation parameter set 21 is referred to by the picture data 31 about an IDR picture or a CRA picture, the adaptation parameter sets 1 to 20 having indexes smaller than the index of the adaptation parameter set 21 are disabled. Therefore, the adaptation parameter sets 1 to 20 are not referred to by the picture data 31 and subsequent picture data, and the video decoding device can always and correctly decode a predetermined picture and subsequent pictures when starting the decoding from the access unit including the picture data 31 about the IDR picture or the CRA picture.

In addition, the variable length encoding unit 13 can be can be constructed in such a way as to, instead of encoding the quantization matrix parameter as an adaptation parameter set, encode the quantization matrix parameter in a picture level header as a parameter which can be changed on a per picture basis. By doing this way, the variable length encoding unit can encode the quantization matrix parameter and the filter parameters in independent units respectively. In this case, the same processes as the adaptation parameter set initializing process using a sequence level header and the disabling process of disabling adaptation parameter sets according to an IDR or CRA picture, which are explained above, are carried out also on the quantization matrix parameter.

Further, the variable length encoding unit 13 can be constructed in such a way as to, instead of encoding the filter parameters which are used in the loop filter unit 11 as an adaptation parameter set, encode the filter parameters which are used on a per slice basis by directly using the slice data about a slice level header or the like. By doing this way, because it becomes unnecessary to encode indexes each indicating an adaptation parameter set which is to be referred to at the time of the decoding process on each slice which is one slice level header for the filter parameters which are used in the loop filter unit 11 when no redundant filter parameters exist between slices, the code amount of the indexes can be reduced and the coding efficiency can be improved.

Figure 7:
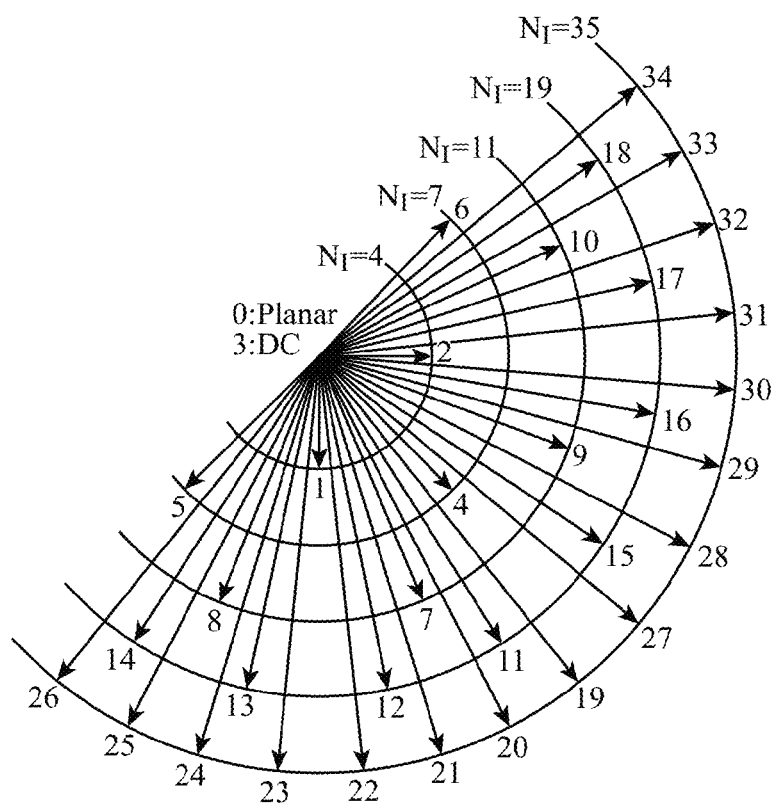
FIG. 7 is an explanatory drawing showing an example of an intra prediction parameter (intra prediction mode) which can be selected for each prediction block $P_i^n$ in a coding block B"

Next, the processing carried out by the intra prediction unit 4 will be explained in detail. FIG. 7 is an explanatory drawing showing an example of intra prediction modes each of which is an intra prediction parameter which can be selected for each prediction block $P_i''$ in the coding block $B''$. In the figure, NI shows the number of intra prediction modes. In FIG. 7, the index values of the intra prediction modes and prediction direction vectors represented by each of the intra prediction modes are shown. In the example of FIG. 7, it is designed that a relative angle between prediction direction vectors becomes small with increase in the number of selectable intra prediction modes.

The intra prediction unit 4 carries out the intra prediction process on each prediction block $P_i''$ by referring to the intra prediction parameter of the prediction block $P_i''$ to generate an intra prediction image $P_{INTRAi}''$, as mentioned above. Hereafter, an intra process of generating an intra prediction signal of a prediction block $P_i''$ in the luminance signal will be explained.

Figure 8:
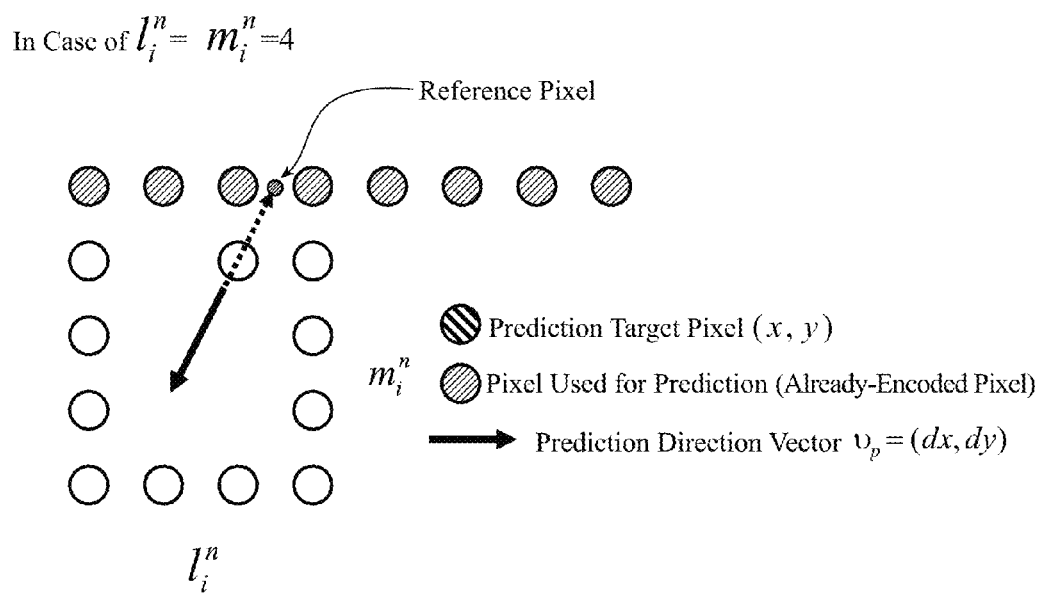
FIG. 8 is an explanatory drawing showing an example of pixels which are used when generating a predicted value of each pixel in a prediction block $P_i^n$ in the case of $l_i^n = m_i^n = 4$.

It is assumed that the size of the prediction block $P_i''$ is $l_i'' \times m_i''$ pixels. FIG. 8 is an explanatory drawing showing an example of pixels which are used when generating a predicted value of each pixel in the prediction block $P_i''$ in the case of $l_i''=m_i''=4$. Although $(2 \times l_i''+1)$ already-encoded pixels located above the prediction block $P_i''$ and $(2 \times m_i'')$ already-encoded pixels located to the left of the prediction block $P_i''$ are set as the pixels used for prediction in the example of FIG. 8, a larger or smaller number of pixels than the pixels shown in FIG. 8 can be used for prediction. Further, although one row or column of pixels adjacent to the prediction block $P_i''$ are used for prediction in the example shown in FIG. 8, two or more rows or columns of pixels adjacent to the prediction block $P_i''$ can be alternatively used for prediction.

When the index value indicating the intra prediction mode for the prediction block $P_i''$ is 0 (planar prediction), the intra prediction unit uses already-encoded pixels adjacent to the top of the prediction block $P_i''$ and already-encoded pixels adjacent to the left of the prediction block $P_i''$ so as to determine a value interpolated according to the distance between these pixels and the target pixel to be predicted in the prediction block $P_i''$ as a predicted value and generate a prediction image. Further, when the index value indicating the intra prediction mode for the prediction block $P_i''$ is 2 (average (DC) prediction), the intra prediction unit determines the average of the already-encoded pixels adjacent to the top of the prediction block $P_i''$ and the already-encoded pixels adjacent to the left of the prediction block $P_i''$ as the predicted value of each pixel in the prediction block $P_i''$ so as to generate a prediction image.

Figure 9:
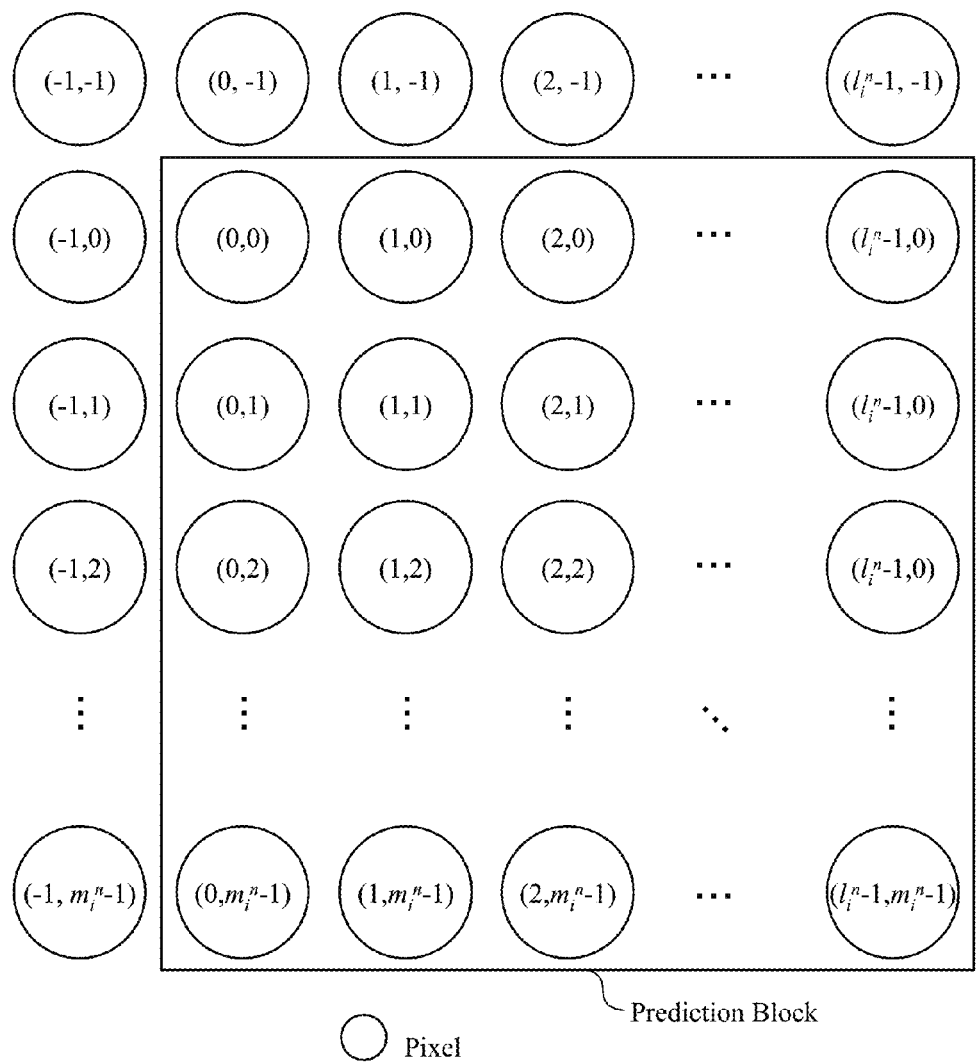
FIG. 9 is an explanatory drawing showing relative coordinates of each pixel in the prediction block $P_i^n$ which are determined with the pixel at the upper left corner of the prediction block $P_i^n$ being defined as the point of origin.

When the index value indicating the intra prediction mode is other than 0 (planar prediction) and 2 (average prediction), the intra prediction unit generates a predicted value of each pixel in the prediction block $P_i''$ on the basis of a prediction direction vector $u_p=(dx, dy)$ shown by the index value. As shown in FIG. 9, when the relative coordinates of each pixel in the prediction block $P_i''$ are expressed as (x, y) with the pixel at the upper left corner of the prediction block $P_i''$ being defined as the point of origin, each reference pixel which is used for prediction is located at a point of intersection of L shown below and an adjacent pixel.

$$L = \begin{pmatrix} x \\ y \end{pmatrix} + k v_p \quad (1)$$

where k is a negative scalar value.

When a reference pixel is at an integer pixel position, the value of the corresponding integer pixel is determined as the predicted value of the target pixel to be predicted, whereas when a reference pixel is not at an integer pixel position, the value of an interpolation pixel generated from the integer pixels which are adjacent to the reference pixel is determined as the predicted value of the target pixel to be predicted. In the example shown in FIG. 8, because a reference pixel is not located at an integer pixel position, the predicted value is interpolated from the values of two pixels adjacent to the reference pixel. The intra prediction unit can use not only the adjacent two pixels but also one or more adjacent pixels to generate an interpolation pixel and determine the value of this interpolation pixel as the predicted value. While the increase in the number of pixels used for the interpolation process provides an advantage of improving the accuracy of interpolation of an interpolation pixel, because the degree of complexity of computations required for the interpolation process increases with the increase in the number of pixels used for the interpolation process, it is preferable to generate an interpolation pixel from a larger number of pixels in a case in which the video encoding device requires high coding performance even if the arithmetic load is large.

Through the process described above, the intra prediction unit generates prediction pixels for all the pixels of the luminance signal in the prediction block $P_i''$, and outputs an intra prediction image $P_{INTRAi}''$. The intra prediction parameter (intra prediction mode) used for the generation of the intra prediction image $P_{INTRAi}''$ is outputted to the variable length encoding unit 13 in order to multiplex the intra prediction parameter into the bitstream.

Like in the case of performing a smoothing process on a reference image at the time of carrying out an intra prediction on an 8×8-pixel block in an image which complies with MPEG-4 AVC/H.264 explained previously, even in a case in which an already-encoded pixel adjacent to the prediction block $P_i''$ on which a smoothing process is carried out is provided as the reference pixel at the time of generating an intermediate prediction image of the prediction block $P_i''$, the intra prediction unit 4 can carry out the filtering process which is the same as the above-mentioned example on the intermediate prediction image.

The intra prediction unit also carries out an intra prediction process based on the intra prediction parameter (intra prediction mode) on each of the color difference signals of the prediction block $P_i''$ according to the same procedure as that according to which the intra prediction unit carries out the intra prediction process on the luminance signal, and outputs the intra prediction parameter used for the generation of the intra prediction image to the variable length encoding unit 13. However, selectable intra prediction parameters (intra prediction modes) for each of the color difference signals can differ from those for the luminance signal. For example, in the case of a YUV 4:2:0 format, each of the color difference signals (U and V signals) is the one whose resolution is reduced to one-half that of the luminance signal (Y signal) both in a horizontal direction and in a vertical direction, and the complexity of each of the color difference signals is lower than that of the luminance signal and hence a prediction can be carried out on each of the color difference signals more easily than on the luminance signal. Therefore, by reducing the number of selectable intra prediction parameters (intra prediction modes) for each of the color difference signals to be smaller than that for the luminance signal, a reduction in the code amount required to encode the intra prediction parameter (intra prediction mode) and a reduction in the amount of computations required to carry out the prediction process can be implemented.

Next, the processing carried out by the video decoding device shown in FIG. 3 will be explained concretely. When receiving the bitstream generated by the video encoding device shown in FIG. 1, the variable length decoding unit 31 carries out a variable length decoding process on the bitstream (step ST21 of FIG. 4) and decodes the header information (sequence level header) about each sequence consisting of one or more frames of pictures, such as the information about the frame size, the header information about each picture (picture level header), and the filter parameters for use in the loop filter unit 38 and the quantization matrix parameter, which are encoded as an adaptation parameter set. At this time, from the quantization matrix parameter in each adaptation parameter set variable-length-decoded by the variable length decoding unit 31, the video decoding device specifies the quantization matrix of the adaptation parameter set. Concretely, for each of the chrominance signals and for each coding mode at each orthogonal transformation size, the video decoding device specifies the quantization matrix for which the quantization matrix parameter is prepared, as an initial value, in advance and in common between the video encoding device and the video decoding device. As an alternative, when the quantization matrix parameter shows that the quantization matrix is an already-decoded one (the quantization matrix is not a new one), the video decoding device specifies the quantization matrix by referring to the index information specifying which quantization matrix in the above-mentioned matrices included in the above-mentioned adaptation parameter set is the quantization matrix, and, when the quantization matrix parameter shows that a new quantization matrix is used, specifies, as a quantization matrix to be used, the quantization matrix included in the quantization matrix parameter. The video decoding device then decodes the header information (slice level header) about each slice, such as the slice partitioning information, from each slice data which constructs the data about each picture, and decodes the coded data about each slice. At this time, the video decoding device specifies the adaptation parameter set which is to be used for each slice by referring to the index (aps_id) of the adaptation parameter set existing in the slice level header. In the case in which the video encoding device shown in FIG. 1 encodes the filter parameters which are used on a per slice basis by directly using slice data, instead of encoding the filter parameters which are used by the loop filter unit 38 as an adaptation parameter set, the video decoding device decodes the filter parameters which are used by the loop filter unit 38 from the slice data.

The variable length decoding unit 31 also determines the largest coding block size and the upper limit on the number of hierarchies of the partitioning which are determined by the encoding controlling unit 2 of the video encoding device shown in FIG. 1 according to the same procedure as that according to which the video encoding device does (step ST22). For example, when the largest coding block size and the upper limit on the number of hierarchies of the partitioning are determined according to the resolution of the video signal, the variable length decoding unit determines the largest coding block size on the basis of the decoded frame size information and according to the same procedure as that according to which the video encoding device does. When the largest coding block size and the upper limit on the number of hierarchies of the partitioning are multiplexed into the sequence level header by the video encoding device, the variable length decoding unit uses the values decoded from the above-mentioned header. Hereafter, the above-mentioned largest coding block size is referred to as the largest decoding block size, and a largest coding block is referred to as a largest decoding block in the video decoding device. The variable length decoding unit 31 decodes the partitioning state of a largest decoding block as shown in FIG. 6 for each determined largest decoding block. The variable length decoding unit hierarchically specifies decoding blocks (i.e., blocks corresponding to "coding blocks" which are processed by the video encoding device shown in FIG. 1) on the basis of the decoded partitioning state (step ST23).

The variable length decoding unit 31 then decodes the coding mode assigned to each decoding block. The variable length decoding unit partitions each decoding block into one or more prediction blocks each of which is a unit for prediction process on the basis of the information included in the decoded coding mode, and decodes the prediction parameter assigned to each of the one or more prediction blocks (step ST24).

More specifically, when the coding mode assigned to a decoding block is an intra coding mode, the variable length decoding unit 31 decodes the intra prediction parameter for each of the one or more prediction blocks which are included in the decoding block and each of which is a unit for prediction process. In contrast, when the coding mode assigned to a decoding block is an inter coding mode, the variable length decoding unit decodes the inner prediction parameter and the motion vector for each of the one or more prediction blocks which are included in the decoding block and each of which is a unit for prediction process (step ST24).

The variable length decoding unit 31 further decodes the compressed data (transformed and quantized transform coefficients) of each orthogonal transformation block on the basis of the orthogonal transformation block partitioning information included in the prediction difference coding parameters (step ST24).

When the coding mode m(B") variable-length-decoded by the variable length decoding unit 31 is an intra coding mode (when m(B")∈INTRA), the select switch 33 outputs the intra prediction parameter of each prediction block, which is variable-length-decoded by the variable length decoding unit 31, to the intra prediction unit 34. In contrast, when the coding mode m(B") variable-length-decoded by the variable length decoding unit 31 is an inter coding mode (when m(B") ∈INTER), the select switch outputs the inter prediction parameter and the motion vector of each prediction block, which are variable-length-decoded by the variable length decoding unit 31, to the motion compensation unit 35.

When the coding mode m(B") variable-length-decoded by the variable length decoding unit 31 is an intra coding mode (m(B") ∈INTRA) (step ST25), the intra prediction unit 34 receives the intra prediction parameter of each prediction block outputted from the select switch 33, and carries out an intra prediction process on each prediction block $P_i^n$ in the decoding block $B^n$ using the above-mentioned intra prediction parameter while referring to the decoded image stored in the memory 37 for intra prediction to generate an intra prediction image $P_{INTRAi}^n$ according to the same procedure as that which the intra prediction unit 4 shown in FIG. 1 uses (step ST26).

When the coding mode m(B") variable-length-decoded by the variable length decoding unit 31 is an inter coding mode (m(B") ∈INTER) (step ST25), the motion compensation unit 35 receives the motion vector and the inter prediction parameter of each prediction block which are outputted from the select switch 33, and carries out an inter prediction process on each prediction block $P_i^n$ in the decoding block $B^n$ using the above-mentioned motion vector and the above-mentioned inter prediction parameter while referring to the decoded image stored in the motion-compensated prediction frame memory 39 and on which the filtering process is carried out to generate an inter prediction image $P_{INTERi}^n$ (step ST27).

When receiving the compressed data and the prediction difference coding parameters from the variable length decoding unit 31, the inverse quantization/inverse transformation unit 32 inverse-quantizes the compressed data about each orthogonal transformation block by referring to the quantization parameter and the orthogonal transformation block partitioning information which are included in the prediction difference coding parameters according to the same procedure as that according to which the inverse quantization/inverse transformation unit 8 shown in FIG. 1 does. At this time, the inverse quantization/inverse transformation unit refers to each header information variable-length-decoded by the variable length decoding unit 31, and, when this header information shows that the inverse quantization process is carried out on the corresponding slice by using the quantization matrix, carries out the inverse quantization process by using the quantization matrix.

At this time, the inverse quantization/inverse transformation unit specifies the quantization matrix which is to be used for each of the chrominance signals and for each coding mode (intra encoding or inter encoding) at each orthogonal transformation size by referring to each header information variable-length-decoded by the variable length decoding unit 31. Concretely, the quantization matrix, which is specified from the slice level header, for the adaptation parameter set which is referred to by the slice currently being processed is set as the quantization matrix to be used for the slice. The inverse quantization/inverse transformation unit 32 also carries out an inverse orthogonal transformation process on the transform coefficients of each orthogonal transformation block which are the compressed data which the inverse quantization/inverse transformation unit inverse-quantizes to calculate a decoded prediction difference signal which is the same as the local decoded prediction difference signal outputted from the inverse quantization/inverse transformation unit 8 shown in FIG. 1 (step ST28).

The adding unit 36 adds the decoded prediction difference signal calculated by the inverse quantization/inverse transformation unit 32 and either the intra prediction image $P_{INTRAi}^n$ generated by the intra prediction unit 34 or the inter prediction image $P_{INTERi}^n$ generated by the motion compensation unit 35 to calculate a decoded image and output the decoded image to the loop filter unit 38, and also stores the decoded image in the memory 37 for intra prediction (step ST29). This decoded image is a decoded image signal which is used at the time of subsequent intra prediction processes.

When completing the processes of steps ST23 to ST29 on all the decoding blocks B" (step ST30), the loop filter unit 38 carries out a predetermined filtering process on the decoded image outputted from the adding unit 36, and stores the decoded image filtering-processed thereby in the motion-compensated prediction frame memory 39 (step ST31). Concretely, the loop filter unit carries out a filtering (deblocking filtering) process of reducing a distortion occurring at a boundary between orthogonal transformation blocks and a distortion occurring at a boundary between prediction blocks, a process (pixel adaptive offset process) of adaptively adding an offset to each pixel, an adaptive filtering process of adaptively switching among linear filters, such as Wiener filters, and performing the filtering process, and so on. However, for each of the above-mentioned filtering processes including the deblocking filtering process, the pixel adaptive offset process, and the adaptive filtering process, the loop filter unit 38 specifies whether or not to carry out the process on the slice currently being processed by referring to each header information variable-length-decoded by the variable length decoding unit 31. At this time, in the case in which the loop filter unit 11 of the video encoding device is constructed as shown in FIG. 11, the loop filter unit 38 is constructed as shown in FIG. 12 in the case of carrying out two or more filtering processes.

In the deblocking filtering process, when referring to the adaptation parameter set which is to be referred to by the slice currently being processed, and there exists change information for changing the various parameters used for the selection of the intensity of a filter applied to a block boundary from their initial values, the loop filter unit carries out the deblocking filtering process on the basis of the change information. When no change information exists, the loop filter unit carries out the deblocking filtering process according to a predetermined method.

In the pixel adaptive offset process, the loop filter unit refers to the adaptation parameter set which is to be referred to by the slice currently being processed, partitions the decoded image into blocks on the basis of the block partitioning information included in the adaptation parameter set, refers to the index included in the adaptation parameter set and indicating the class classifying method of each of the blocks on a per block basis, and, when the index does not show "does not carry out the offset process", carries out a class classification on each pixel in each of the blocks according to the class classifying method indicated by the above-mentioned index on a per block basis. As candidates for the class classifying method, class classifying methods which are the same as candidates for the class classifying method of the pixel adaptive offset process carried out by the loop filter unit 11 are prepared in advance.

The loop filter unit 38 then refers to the offset information specifying the offset calculated for each class determined on a per block basis and included in the adaptation parameter set, and carries out a process of adding the offset to the brightness value of the decoded image. However, in a case in which the pixel adaptive offset process carried out by the loop filter unit 11 of the video encoding device is constructed in such a way as to always partition the image into blocks each having a fixed size (e.g., largest coding blocks) without encoding the block partitioning information, select a class classifying method for each of the blocks, and carry out the adaptive offset process for each class, the loop filter unit 38 also carries out the pixel adaptive offset process on each block having the same fixed size as that processed by the loop filter unit 11.

In the adaptive filtering process, the loop filter unit refers to the adaptation parameter set which is to be referred to by the slice currently being processed, and, after carrying out a class classification according to the same method as that used by the video encoding device of FIG. 1, carries out the filtering process by using the filter for each class included in the adaptation parameter set on the basis of information about the class classification. However, in a case in which in the adaptive filtering process carried out by the loop filter unit 11 of the video encoding device, the above-mentioned class classification, and the filter design and the filtering process are constructed in such a way as to be carried out on, instead of the entire image, each block having a fixed size, e.g., each largest coding block, the loop filter unit 38 also decodes the filter used for each class and carries out the above-mentioned class classification and the above-mentioned filtering process on each block having a fixed size which is the same as that processed by the loop filter unit 11. The decoded image on which the filtering process is carried out by this loop filter unit 38 is a reference image for motion-compensated prediction, and is also a reproduced image.

When a new sequence level header (sequence level header 2) is inserted into some midpoint in the coded bitstream because of a sequence change, as shown in FIG. 18, the variable length decoding unit 31 disables all the adaptation parameter sets already decoded when decoding the new sequence level header. Therefore, in the example shown in FIG. 18, a reference to an adaptation parameter set over a sequence level header, such as a reference to an adaptation parameter set 2 at the time of decoding picture data 30, is not made. In addition, an adaptation parameter set which is decoded when past adaptation parameter sets cannot be used at all through the above-mentioned disabling process of disabling adaptation parameter sets or the like is the one in which parameters including a quantization matrix do not refer to a past adaptation parameter set and which makes it possible to decode all the parameters by using only the adaptation parameter set in question. This restriction can prevent a decoding error from occurring as a result of, when an error occurs in a part of the coded bitstream preceding the new sequence level header, referring to an adaptation parameter set in the part of the bitstream, thereby being able to improve the error resistance. However, in the case in which the video encoding device is constructed in such a way as to have an initialization flag aps_reset_flag for each adaptation parameter set in a sequence level header, each adaptation parameter set is initialized only when its flag aps_reset_flag decoded by the variable length decoding unit 31 is set to "enable", whereas each adaptation parameter set is not initialized when its flag aps_reset_flag is set to "disable." By doing this way, the video decoding device can correctly decode the stream generated by the video encoding device that carries out the adaptive initializing process using the initialization flag aps_reset_flag for each adaptation parameter set.

In addition, in the case in which the video encoding device is constructed in such a way as to have, as a part of the parameters of each adaptation parameter set, a flag previous_aps_clear_flag for disabling already-decoded adaptation parameter sets, when a previous_aps_clear_flag decoded by the variable length decoding unit 31 is set to "enable", the variable length decoding unit 31 disables the adaptation parameter sets decoded before the adaptation parameter set, whereas when the previous_aps_clear_flag is set to "disable", the variable length decoding unit does not carry out the above-mentioned disabling process. More specifically, in the example of the coded bitstream shown in FIG. 24, when the variable length encoding unit 13 of the video encoding device has encoded the flag previous_aps_clear_flag of the adaptation parameter set 21 as "enable", the adaptation parameter sets 1 to 20 are disabled and no reference to the adaptation parameter sets 1 to 20 is made for pictures to be encoded in order after an IDR picture or a CRA picture. Therefore, random access according to the IDR picture or the CRA picture can be implemented in the decoding from the sequence level header 2 which is the head of the access unit including the picture data 31 about the IDR picture or the CRA picture.

As an alternative, in the case in which the video encoding device is constructed in such a way as to implement the disabling process of disabling adaptation parameter sets for random access by providing a flag part_aps_clear_flag for disabling some adaptation parameter sets when decoding an IDR picture or a CRA picture in a sequence level header or a NAL unit, when a flag part_aps_clear_flag decoded by the variable length decoding unit 31 at the time of decoding an IDR picture or a CRA picture is set to "enable", the variable length decoding unit 31 disables the adaptation parameter sets preceding the picture data about the picture immediately preceding the IDR picture or the CRA picture. More specifically, in the example shown in FIG. 24, when the variable length encoding unit 13 of the video encoding device has encoded the flag part_aps_clear_flag in the sequence level header 2 or the NAL unit of the picture data 31 as "enable", the adaptation parameter sets preceding the picture data 30 which is the picture data immediately preceding the picture data 31 are disabled when decoding the picture data 31. Therefore, no reference to the adaptation parameter sets 1 to 20 is made for the pictures to be decoded in order after the IDR picture or the CRA picture, and random access according to the IDR picture or the CRA picture can be implemented in the decoding from the sequence level header 2. However, in the case in which the video encoding device is constructed in such a way as to always carry out the disabling process of disabling adaptation parameter sets when encoding an IDR picture or a CRA picture without providing such a flag as above, the video decoding device can be constructed in such a way that the variable length decoding unit 31 always carries out the above-mentioned disabling process of disabling adaptation parameter sets when decoding the IDR picture or the CRA picture, thereby being able to correctly decode the coded bitstream generated by the above-mentioned video encoding device.

In addition, in the case in which the video encoding device is constructed in such a way as to have a parameter referred to as aps_group_id in each adaptation parameter set as a method of implementing the disabling process of disabling adaptation parameter sets according to an IDR picture or a CRA picture, when decoding the IDR picture or the CRA picture, the variable length decoding unit 31 of the video decoding device disables an adaptation parameter set having aps_group_id whose value differs from that of aps_group_id which another adaptation parameter set has, the other adaptation parameter set being referred to by the IDR picture or the CRA picture. For example, in the case shown in FIG. 24, when the video encoding device encodes the adaptation parameter sets in such a way as to set the parameters aps_group_id of the adaptation parameter sets 1 to 20 to zero and also set the parameters aps_group_id of the adaptation parameter set 21 and subsequent adaptation parameter sets to one, the variable length decoding unit 31 of the video decoding device disables the adaptation parameter sets 1 to 20 having parameters aps_group_id (=0)

different from the parameter aps_group_id (=1) of the adaptation parameter set 21 when the picture data 31 about the IDR picture or the CRA picture refers to the adaptation parameter set 21. Therefore, the adaptation parameter sets 1 to 20 are not referred to by the picture data 31 and subsequent picture data, and the video decoding device can always and correctly decode a predetermined picture and subsequent pictures by starting the decoding from the sequence level header 2 which is the head of the access unit including the picture data 31 about the IDR picture or the CRA picture.

In accordance with the method of introducing an aps_group_id as mentioned above, when the video encoding device carries out the encoding in such a way as not to change the values of the parameters aps_group_id of the adaptation parameter sets according to an IDR picture or a CRA picture while giving a higher priority to the coding efficiency than to the error resistance, the video decoding device can also decode the adaptation parameter sets correctly without the adaptation parameter sets being disabled because, when the picture data about the IDR picture or the CRA picture refers to an adaptation parameter set, there exists no adaptation parameter set having a parameter aps_group_id whose value differs from that of the parameter aps_group_id of the adaptation parameter set which is referred to by the picture data. Further, in the case in which the video encoding device is constructed in such a way as to disable an adaptation parameter set having a parameter aps_group_id whose value differs from that of the parameter aps_group_id which is referred to also when decoding a picture other than IDR pictures or CRA pictures, the variable length decoding unit 31 of the video decoding device disables an adaptation parameter set having a parameter aps_group_id whose value differs from that of the parameter aps_group_id which is referred to when decoding a picture. By doing in this way, the video decoding device can correctly decode the stream generated by the video encoding device that implements the adaptive disabling process of disabling adaptation parameter sets by arbitrarily setting the timing with which to change the parameter aps_group_id of an adaptation parameter set.

In addition, in the case in which the variable length encoding unit 13 of the video encoding device is constructed in such a way as to, when encoding an IDR picture or a CRA picture, carry out the disabling process of disabling adaptation parameter sets according to the IDR picture or the CRA picture by using the index (aps_id) of each adaptation parameter set, as another method of implementing the disabling process of disabling adaptation parameter sets according to an IDR picture or a CRA picture, the variable length decoding unit 31 of the video decoding device disables the adaptation parameter sets having indexes smaller than the index (aps_id) of the adaptation parameter set in question when referring to the adaptation parameter set which is referred to by the IDR picture or the CRA picture. More specifically, in the case in which indexes are assigned to adaptation parameter sets in the order in which these adaptation parameter sets are encoded in the examples of FIGS. 24 and 28, when the adaptation parameter set 21 is referred to by the picture data 31 about an IDR picture or a CRA picture, the adaptation parameter sets 1 to 20 having indexes smaller than the index of the adaptation parameter set 21 are disabled. Therefore, the adaptation parameter sets 1 to 20 are not referred to by the picture data 31 and subsequent picture data, and the video decoding device can always and correctly decode a predetermined picture and subsequent pictures when starting the decoding from the access unit including the picture data 31 of the IDR picture or the CRA picture.

In addition, in the case in which the video encoding device is constructed in such a way as to, instead of encoding the quantization matrix parameter as an adaptation parameter set, encode the quantization matrix parameter in a picture level header as a parameter which can be changed on a per picture basis, the same processes as the adaptation parameter set initializing process using a sequence level header and the disabling process of disabling adaptation parameter sets according to an IDR or CRA picture, which are explained above, are carried out also on the quantization matrix parameter.

As can be seen from the above description, because the video encoding device according to this Embodiment 1 is constructed in such a way that the loop filter unit 11 partitions the local decoded image into a plurality of blocks, selects a classification method of carrying out a class classification on a per block basis, carries out a class classification on each pixel within a block currently being processed by using the classification method, and also refers to the table showing the indexes respectively corresponding to the combinations of offset values respectively calculated for classes so as to specify the index corresponding to the combination of offset values one of which is to be added to the pixel value of each pixel on which the class classification is carried out while carrying out the pixel adaptive offset process of adding the offset value to the above-mentioned pixel value, and the variable length encoding unit 13 encodes the index indicating the classification method of carrying out a class classification on a per block basis, which is selected by the loop filter unit 11, and the index corresponding to the combination of offset values specified by the loop filter unit 11 as filter parameters, there is provided an advantage of being able to implement a high-accuracy distortion compensation process while reducing the code amount required to encode the offset information.

Further, because the video decoding device according to this Embodiment 1 has the table for specifying an offset value for each class of the pixel adaptive offset process carried out by the loop filter unit 38 thereof, and specifies the offset value from the decoded table index information and the above-mentioned table, there is provided an advantage of being able to correctly decode the bitstream encoded by the video encoding device in which the offset value for each class of the pixel adaptive offset process carried out by the loop filter unit 11 is tablized.

Embodiment 2.

Although the high-accuracy distortion compensation process of reducing the code amount required to encode the offset information by tablizing the combination of offsets calculated respectively for the classes of the pixel adaptive offset process carried out by the loop filter unit 11 is explained in above-mentioned Embodiment 1, a method of reducing the code amount required to encode the offset information without using any table will be explained in this Embodiment 2.

Because this Embodiment 2 differs from Embodiment 1 only in a method of calculating an offset to be added to each pixel belonging to each class in the pixel adaptive offset processes carried out by the loop filter unit 11 and the loop filter unit 38 according to above-mentioned Embodiment 1, and offset information to be encoded, only the difference will be explained.

An offset calculation process for each class according to an EO method is defined as follows.

$OFFSET_0=0$
$OFFSET_1=X$
$OFFSET_2=[X/2]$
$OFFSET_3=-[X/2]$
$OFFSET_4=-X$ where $OFFSET_z$ shows an offset value for a class z, X shows a parameter determining the offset value, and [n] shows the integral part of a real number n.

By defining the offset calculation process this way, it is not necessary to encode the offset value for each class, and what is necessary is just to encode the parameter X as offset information. Therefore, the code amount can be reduced. In addition, there is an advantage of eliminating the necessity to provide a memory required to store the table as compared with the case, as shown in above-mentioned Embodiment 1, of using the table showing the combinations of offsets calculated respectively for classes. Also for a BO method, an offset for each class can be similarly defined by using one parameter. An example of setting the number $L_{BO}$ of classes to three will be shown below.

$OFFSET_0=[Y/2]$
$OFFSET_1=Y$
$OFFSET_2=[Y/2]$ where Y shows a parameter determining an offset value, and [n] shows the integral part of a real number n. At this time, according to an encoding method of encoding the above-mentioned parameters X and Y which the variable length encoding unit 13 uses, by setting up the range of values which each of the parameters can have in advance and in common between the video encoding device and the video decoding device, high-efficiency encoding can be carried out by using a binarization method which takes into consideration the range of values which a symbol to be encoded, such as a truncated unary code shown in FIG. 25, has. In contrast, when the range of values which each of the parameters can have is not set up in advance, a code which can be binarized without taking into consideration the range of values of a symbol to be encoded, such as a unary code shown in FIG. 26, is used.

Although the offset for each class is defined by using only one parameter for both the EO method and the BO method in the above-mentioned example, the offset itself for each class can be encoded as offset information for either one of the methods. At this time, according to an encoding method of encoding the above-mentioned offset value which the variable length encoding unit 13 uses, by setting up the range of values which the offset can have in advance and in common between the video encoding device and the video decoding device, high-efficiency encoding can be carried out by using a binarization method which takes into consideration the range of values which a symbol to be encoded, such as a truncated unary code shown in FIG. 25, has. In contrast, when the range of values which the offset can have is not set up in advance, a code which can be binarized without taking into consideration the range of values of a symbol to be encoded, such as a unary code shown in FIG. 26, is used. In general, while the EO method has an effect of smoothing noise occurring in an edge portion of the image, and has a high correlation between the offset values for classes on the basis of a relationship among pixels a, b, and c of each class shown in FIG. 14, the BO method does not have a clear correlation between classes which is substantially the same as that which the EO method has. Therefore, there is a case in which it is more appropriate to define an offset by using the parameter X only for the EO method, while encoding the offset value itself for each class as offset information for the BO method because a high image quality improvement effect is acquired while the code amount required to encode the offset information increases. A calculation expression for calculating an offset for each class can be prepared for each of the chrominance signals. By doing this way, an appropriate calculation expression for calculating an offset for each class can be prepared for each of the chrominance signal signals having different signal characteristics, and the image quality improvement effect can be enhanced.

Further, candidates for the above-mentioned parameters X and Y can be prepared by using a table. By doing this way, the range of values which each of the parameters X and Y can have is limited. However, when candidate values prepared in the table can be set up appropriately, a high-accuracy distortion compensation process can be implemented while the code amount required to encode the parameters X and Y is reduced. In addition, the methods according to both the embodiments can be combined. For example, the EO method is applied to the offset calculation method and the encoding according to above-mentioned Embodiment 1, while the BO method is applied to the offset calculation method and the encoding according to above-mentioned Embodiment 2 (as an alternative, the EO method is applied to the offset calculation method and the encoding according to above-mentioned Embodiment 2, while the BO method is applied to the offset calculation method and the encoding according to above-mentioned Embodiment 1).

As can be seen from the above description, because the video encoding device according to this Embodiment 2 is constructed in such a way that the loop filter unit 11 partitions the local decoded image into a plurality of blocks, selects a classification method of carrying out a class classification on a per block basis, carries out a class classification on each pixel within a block currently being processed by using the classification method, and also determines a parameter for calculating an offset value to be added to the pixel value of each pixel on which the class classification is carried out while calculating the offset value from the parameter and carrying out the pixel adaptive offset process of adding the offset value to the above-mentioned pixel value, and the variable length encoding unit 13 encodes the index indicating the classification method of carrying out a class classification on a per block basis, which is selected by the loop filter unit 11, and the parameter for calculating an offset value, which is determined by the loop filter unit 11, as filter parameters, there is provided an advantage of being able to implement a high-accuracy distortion compensation process while reducing the code amount required to encode the offset information.

Further, because the video decoding device according to this Embodiment 2 specifies the offset value for each class of the pixel adaptive offset process carried out by the loop filter unit 38 thereof from the single parameter, there is provided an advantage of being able to correctly decode the bitstream encoded by the video encoding device in which the offset value for each class of the pixel adaptive offset process carried out by the loop filter unit 11 is defined by the single parameter.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The present invention is suitable for a system that needs to implement a high-accuracy distortion compensation process while reducing the code amount required to encode the offset information.

EXPLANATIONS OF REFERENCE NUMERALS

1 block partitioning unit (block partitioner), 2 encoding controlling unit (coding parameter determinator), 3 select switch, 4 intra prediction unit (predictor), 5 motion-compensated prediction unit (predictor), 6 subtracting unit (difference image generator), 7 transformation/quantization unit (image compressor), 8 inverse quantization/inverse transformation unit (local decoded image generator), 9 adding unit (local decoded image generator), 10 memory for intra prediction (predictor), 11 loop filter unit (filter), 12 motion-compensated prediction frame memory (predictor), 13 variable length encoding unit (variable length encoder), 14 slice dividing unit (slice partitioner), 31 variable length decoding unit (variable length decoder), 32 inverse quantization/inverse transformation unit (difference image generator), 33 select switch, 34 intra prediction unit (predictor), 35 motion compensation unit (predictor), 36 adding unit (decoded image generator), 37 memory for intra prediction (predictor), 38 loop filter unit (filter), 39 motion-compensated prediction frame memory (predictor), 101 block partitioning unit, 102 prediction unit, 103 compressing unit, 104 local decoding unit, 105 adding unit, 106 loop filter, 107 memory, 108 variable length encoding unit.

The invention claimed is:

1. An image encoding device comprising:
a filter that carries out a filtering process on a decoded image which is a result of addition of a difference image decoded from compressed data and a prediction image;
an encoder that encodes said compressed data and a filter parameter used when the filtering process is carried out, and generates a bitstream;
a slice partitioner that partitions an inputted image into slices which are a plurality of part images;
a coding parameter determinator that determines the largest size of a coding block which is a unit to be processed when an encoding process is carried out and determines an upper limit on a number of hierarchies when a coding block having the largest size is partitioned hierarchically, and that assigns a coding mode to each of the coding blocks which are partitioned hierarchically;
a block partitioner that partitions a slice which is partitioned by said slice partitioner into coding blocks each having the largest size determined by said coding parameter determinator, and that can partition each of said coding blocks hierarchically into blocks until its number of hierarchies reaches the upper limit on the number of hierarchies which is determined by said coding parameter determinator;
a predictor that carries out a prediction process according to the coding mode assigned by said coding parameter determinator on each of the coding blocks which are partitioned by said block partitioner to generate a prediction image;
a difference image generator that generates a difference image between each of the coding blocks which are partitioned by said block partitioner and the prediction image generated by said predictor;
an image compressor that carries out a transformation process on the difference image generated by said difference image generator and quantizes transform coefficients of said difference image, and that outputs the transform coefficients quantized as compressed data; and
a decoded image generator that decodes the difference image from the compressed data outputted from said image compressor, and adds the difference image decoded and the prediction image generated by said predictor to generate a decoded image, wherein
said filter
determines a classification method of a class on a coding block having a largest size,
carries out a classification on each pixel within said coding block having a largest size by using said classification method,
calculates an offset value for each class for said coding block having largest size, and
carries out a pixel adaptive offset process by which said offset value is added to a pixel value of a pixel belonging to a corresponding class; and
said encoder
encodes an index indicating the classification method determined by said filter,
encodes a parameter about the offset value for each class on a basis of a binarization process using a truncated unary code, and
encodes header information of each slice including information about the partitioning into the slices by said slice partitioner, an index indicating an adaptation parameter set used by a corresponding slice, the compressed data outputted from said image compressor, the coding mode assigned by said coding parameter determinator, a quantization matrix parameter for generating a quantization matrix used when the transform coefficients are quantized by said image compressor, and the filter parameter used when the filtering process is carried out by said filter to generate a coded bitstream into which coded data about said header information, the coded data about said compressed data, coded data about said coding mode, coded data about said quantization matrix parameter, and the coded data about said filter parameter are multiplexed;
the coding parameter determinator determines both a quantization parameter used when the difference image is compressed and a transformation block partitioning state for each of the coding blocks, and determines an intra prediction parameter or an inter prediction parameter used when the prediction process is carried out for each prediction block of said coding block;
the predictor carries out an intra-frame prediction process by using said intra prediction parameter when an intra coding mode is assigned by said coding parameter determinator and carries out a motion-compensated prediction process by using said inter prediction parameter when an inter coding mode is assigned by said coding parameter determinator; and
the image compressor carries out the transformation process on the difference image generated by the difference image generator for each transformation block determined by said coding parameter determinator, and quantizes the transform coefficients of said difference image by using the quantization parameter and the quantization matrix parameter which are determined by said coding parameter determinator and outputs the transform coefficients quantized as the compressed data about said difference image, and, when encoding said compressed data, the coding mode, said quantization matrix parameter, the filter parameter, and the header information of each slice, the encoder encodes the intra prediction parameter or the inter prediction parameter, which is determined by said coding parameter determinator, and transformation block partitioning information to generate the coded bitstream into which the coded data about said compressed data, the coded data about said coding mode, the coded data about said quantization matrix parameter, the coded data about said filter parameter, the coded data about said header information, coded data about said intra prediction parameter or said inter prediction parameter, and coded data about said transformation block partitioning information are multiplexed.

2. The image encoding device according to claim 1, wherein said adaption parameter set includes a flag showing whether or not a parameter associated with a deblocking filtering process exists, and
when said flag shows said parameter exists, said adaptation parameter set further includes said parameter associated with the deblocking filtering process.

3. An image decoding device comprising:
a decoder that decodes compressed data and a filter parameter from coded data multiplexed into a bitstream and decodes header information about each slice, a quantization matrix parameter, and a filter parameter from the coded data multiplexed into the coded bitstream, and that decodes compressed data and a coding mode associated with each of coding blocks which are hierarchically partitioned from said coded data;
a filter that carries out a filtering process on a decoded image decoded from the compressed data by using the filter parameter;
a predictor that carries out a prediction process according to the coding mode decoded by said decoder and associated with the coding block to generate a prediction image;
a difference image generator that inverse-quantizes transform coefficients which are compressed data decoded by said decoder and associated with the coding block by using a quantization parameter and said quantization matrix parameter which are decoded by said decoder, and that inverse-transforms the transform coefficients inverse-quantized to generate a difference image before compression; and
a decoded image generator that adds the difference image generated by said difference image generator and the prediction image generated by said predictor to generate a decoded image, wherein
said decoder
decodes, as a filter parameter, an index indicating a classification method of a class on a coding block having a largest size, and
decodes a parameter about an offset value for each class on which a binarization process using a truncated unary code is performed;
said filter
specifies the classification method of a class on the coding block having the largest size by using the index,
carries out a classification on each pixel by using the classification method, and
carries out a pixel adaptive offset process by which said offset value is added to a pixel value of a pixel belonging to a corresponding class;
when decoding the compressed data, the coding mode, and an adaptation parameter set from the coded data multiplexed into the coded bitstream, the decoder decodes an intra prediction parameter or an inter prediction parameter, and transformation block partitioning information,
when the coding mode decoded by said decoder and associated with the coding block is an intra coding mode, the predictor carries out the intra-frame prediction process by using said intra prediction parameter, and
when the coding mode decoded by said decoder and associated with the coding block is an inter coding mode, carries out the motion-compensated prediction process by using said inter prediction parameter, and the difference image generator inverse-transforms the transform coefficients inverse-quantized for each of transformation blocks acquired from the transformation block partitioning information decoded by said decoder to generate a difference image before compression.

4. The image decoding device according to claim 3, wherein said adaption parameter set includes a flag showing whether or not a parameter associated with a deblocking filtering process exists, and
when said flag shows said parameter exists, said adaptation parameter set further includes said parameter associated with the deblocking filtering process.

5. An image encoding method comprising:
carrying out a filtering process on a decoded image which is a result of addition of a difference image decoded from compressed data about an image and a prediction image;
carrying out an encoding process including encoding said compressed data and a filter parameter used when the filtering process is carried out to generate a bitstream;
partitioning an inputted image into slices which are a plurality of part images;
determining the largest size of a coding block which is a unit to be processed when an encoding process is carried out and determining an upper limit on a number of hierarchies when a coding block having the largest size is partitioned hierarchically, and assigning a coding mode to each of the coding blocks which are partitioned hierarchically;
partitioning a slice which is partitioned into coding blocks each having the largest size, and that can partition each of said coding blocks hierarchically into blocks until its number of hierarchies reaches the upper limit on the number of hierarchies;
carrying out a prediction process according to the assigned coding mode on each of the partitioned coding blocks to generate a prediction image;
generating a difference image between each of the partitioned coding blocks and the generated prediction image;
carrying out a transformation process on the generated difference image and quantizing transform coefficients of said difference image, and outputting the quantizing transform coefficients as compressed data; and
decoding the difference image from the outputted compressed data, and adding the decoded difference image and the generated prediction image to generate a decoded image, wherein said filtering process includes
    determining a classification method of a class on a coding block having a largest size,
    carrying out a classification on each pixel within the coding block having the largest size by using said classification method,
    calculating an offset value for each class, and
    carrying out a pixel adaptive offset process by which said offset value is added to a pixel value of a pixel belonging to a corresponding class,
said encoding process includes
    encoding an index indicating the classification method of carrying out a class classification on each coding block having the largest size, the classification method being determined by said filtering process,
    encoding a parameter about the offset value for each class on a basis of a binarization process using a truncated unary code,
    encoding header information of each slice including information about the partitioning into the slices, an index indicating an adaptation parameter set used by a corresponding slice, the compressed data outputted from said image compressor, the assigned coding mode, a quantization matrix parameter for generating a quantization matrix used when the transform coefficients are quantized by said image compressor, and the filter parameter used when the filtering process is carried out to generate a coded bitstream into which coded data about said header information, the coded data about said compressed data, coded data about said coding mode, coded data about said quantization matrix parameter, and the coded data about said filter parameter are multiplexed;
    determining both a quantization parameter used when the difference image is compressed and a transformation block partitioning state for each of the coding blocks, and determining an intra prediction parameter or an inter prediction parameter used when the prediction process is carried out for each prediction block of said coding block; and
    carrying out an intra-frame prediction process using said intra prediction parameter when an intra coding mode is assigned and carrying out a motion-compensated prediction process using said inter prediction parameter when an inter coding mode is assigned; and
said transformation process includes using the quantization parameter and the quantization matrix parameter which are determined and outputting the transform coefficients quantized as the compressed data about said difference image, and
when encoding said compressed data, the coding mode, said quantization matrix parameter, the filter parameter, and the header information of each slice, the encoder encodes the intra prediction parameter or the inter prediction parameter, and transformation block partitioning information to generate the coded bitstream into which the coded data about said compressed data, the coded data about said coding mode, the coded data about said quantization matrix parameter, the coded data about said filter parameter, the coded data about said header information, coded data about said intra prediction parameter or said inter prediction parameter, and coded data about said transformation block partitioning information are multiplexed.

6. An image decoding method comprising:
    decoding compressed data and a filter parameter from coded data multiplexed into a bitstream;
    decoding header information about each slice, a quantization matrix parameter, and a filter parameter from the coded data multiplexed into the coded bitstream;
    decoding compressed data and a coding mode associated with each of coding blocks which are hierarchically partitioned from said coded data;
    carrying out a filtering process on a decoded image decoded from the compressed data decoded in said decoding process by using the filter parameter decoded in said decoding process,
    decoding, as a filter parameter, an index indicating a classification method of a class on a coding block having a largest size;
    decoding a parameter about an offset value for each class on which a binarization process using a truncated unary code is performed;
    carrying out a prediction process according to the coding mode decoded by said decoder and associated with the coding block to generate a prediction image;
    inverse-quantizing transform coefficients which are compressed data decoded by said decoder and associated with the coding block by using a quantization parameter and said quantization matrix parameter which are decoded by said decoder, and inverse-transforming the transform coefficients inverse-quantized to generate a difference image before compression; and
    adding the generated difference image and the generated prediction image to generate a decoded image, wherein
said filtering process includes
    specifying the classification method of a class on the coding block having the largest size by using the index,
    carrying out a class classification on each pixel by using the classification method specified for each coding block having said largest size, and
    carrying out a pixel adaptive offset process by which said offset value is added to a pixel value of a pixel belonging to a corresponding class,
when decoding the compressed data, the coding mode, and an adaptation parameter set from the coded data multiplexed into the coded bitstream, an intra prediction parameter or an inter prediction parameter, and transformation block partitioning information are decoded,
when the decoded coding mode associated with the coding block is an intra coding mode, carrying out the intra-frame prediction process using said intra prediction parameter, and
when the decoded coding mode associated with the coding block is an inter coding mode, carrying out the motion-compensated prediction process using said inter prediction parameter, and inverse-transforming the transform coefficients inverse-quantized for each of transformation blocks acquired from the decoded transformation block partitioning information to generate a difference image before compression.

7. The image decoding method according to claim 6, wherein said adaption parameter set includes a flag showing whether or not a parameter associated with a deblocking filtering process exists, and
    when said flag shows said parameter exists, said adaptation parameter set further includes said parameter associated with the deblocking filtering process.

* * * * *